US012736137B2

(12) United States Patent
Barnett et al.

(10) Patent No.: US 12,736,137 B2
(45) Date of Patent: Sep. 15, 2026

(54) HYBRID PRESSURE SEAL

(71) Applicant: Kerr Machine Co., Sulphur, OK (US)

(72) Inventors: Christopher Todd Barnett, Stratford, OK (US); Micheal Cole Thomas, Azle, TX (US); John Keith, Ardmore, OK (US); Nicholas Son, Davis, OK (US); Kelcy Jake Foster, Sulphur, OK (US)

( * ) Notice: Subject to any disclaimer, the term of this patent is extended or adjusted under 35 U.S.C. 154(b) by 0 days.

(21) Appl. No.: 18/665,161

(22) Filed: May 15, 2024

(65) Prior Publication Data

US 2024/0384795 A1 Nov. 21, 2024

Related U.S. Application Data

(60) Provisional application No. 63/564,070, filed on Mar. 12, 2024, provisional application No. 63/611,305, filed on Dec. 18, 2023, provisional application No. 63/588,353, filed on Oct. 6, 2023, provisional application No. 63/578,314, filed on Aug. 23, 2023, provisional application No. 63/502,437, filed on May 16, 2023.

(51) Int. Cl.
*F16J 15/3284* (2016.01)

(52) U.S. Cl.
CPC ................................ *F16J 15/3284* (2013.01)

(58) Field of Classification Search
CPC ........ F16J 15/3284; F16J 15/18; F16J 15/182; F16J 15/183
See application file for complete search history.

(56) References Cited

U.S. PATENT DOCUMENTS

| | | | |
|---|---|---|---|
| 1,316,539 | A | 9/1919 | Ford |
| 1,822,682 | A | 9/1931 | Weiger |
| 2,713,522 | A | 7/1955 | Petch |
| 2,756,960 | A | 7/1956 | Church |
| 2,856,857 | A | 10/1958 | Saalfrank |
| 3,053,500 | A | 9/1962 | Atknison |
| 3,146,724 | A | 9/1964 | Cornelsen |
| 3,173,648 | A | 3/1965 | McGuire et al. |
| 3,179,121 | A | 4/1965 | Bredtschneider et al. |
| 3,257,952 | A | 6/1966 | McCormick |
| 3,373,695 | A | 3/1968 | Yohpe |
| 3,427,988 | A | 2/1969 | Redman et al. |
| 3,474,808 | A | 10/1969 | Elliott |
| 3,589,387 | A | 6/1971 | Raymond |
| 3,679,332 | A | 7/1972 | Yohpe |

(Continued)

OTHER PUBLICATIONS

U.S. Patent and Trademark Office File History for U.S. Pat. No. 10,591,070, 168 pages, Alexandria, VA.

(Continued)

*Primary Examiner* — Gilbert Y Lee

(57) ABSTRACT

A hybrid pressure seal for use in a plunger bore or a stuffing box used in a plunger bore. The hybrid seal has a first, inner seal made of a first, durable material. The inner seal has a cut-out formed in its outer surface in which an outer seal is placed. The inner seal may have features on its inner surface such as V-shaped protrusions or a D-shaped surface. The outer seal is elastomeric. One or more hybrid seals of different configurations may be used in a packing, disposed between a junk ring and a lantern ring. The lantern ring may be integral with and made of the same material as an adjacent hybrid seal.

30 Claims, 84 Drawing Sheets

(56) References Cited

U.S. PATENT DOCUMENTS 4,047,850 A 9/1977 Berthelot
4,170,214 A 10/1979 Gill et al.
4,328,972 A * 5/1982 Albertson ............ F16J 15/3208 277/560
4,363,463 A 12/1982 Moon, Jr.
4,388,050 A 6/1983 Schuller
4,467,703 A 8/1984 Redwine et al.
4,470,771 A 9/1984 Hall et al.
4,520,837 A 6/1985 Cole et al.
4,572,519 A * 2/1986 Cameron .............. F04B 53/164 277/516
4,618,154 A * 10/1986 Freudenthal ......... F16J 15/3236 277/556
4,768,933 A 9/1988 Stachowiak
4,771,801 A 9/1988 Crump et al.
4,773,833 A 9/1988 Wilkinson et al.
4,778,347 A 10/1988 Mize
4,861,241 A 8/1989 Gamboa et al.
4,878,815 A 11/1989 Stachowiak
4,948,349 A 8/1990 Koiwa
4,984,970 A 1/1991 Eickmann
5,059,101 A 10/1991 Valavaara
5,073,096 A 12/1991 King et al.
5,145,340 A 9/1992 Allard
5,207,242 A 5/1993 Daghe et al.
5,226,445 A 7/1993 Surjaatmadja
5,362,215 A 11/1994 King
5,370,148 A 12/1994 Shafer
5,507,219 A 4/1996 Stogner
5,524,902 A 6/1996 Cornette
D383,053 S 9/1997 Schrader et al.
6,045,136 A * 4/2000 White .................. F16J 15/3228 264/281
6,164,318 A 12/2000 Dixon
6,257,626 B1 7/2001 Campau et al.
6,382,940 B1 5/2002 Blume
6,419,459 B1 7/2002 Sibbing
6,544,012 B1 4/2003 Blume
6,641,112 B2 11/2003 Antoff et al.
6,910,871 B1 6/2005 Blume
7,140,211 B2 11/2006 Tremblay
7,168,440 B1 1/2007 Blume
7,186,097 B1 3/2007 Blume
7,290,560 B2 11/2007 Orr et al.
7,296,591 B2 11/2007 Moe et al.
7,335,002 B2 2/2008 Vicars
7,506,574 B2 3/2009 Jensen et al.
7,513,759 B1 4/2009 Blume
D616,966 S 6/2010 Angell
7,789,133 B2 9/2010 McGuire
7,828,053 B2 11/2010 McGuire et al.
7,845,413 B2 12/2010 Shampine et al.
D631,142 S 1/2011 Angell
7,963,502 B2 6/2011 Lovell et al.
8,100,407 B2 1/2012 Stanton et al.
8,317,498 B2 11/2012 Gambier et al.
8,360,094 B2 1/2013 Steinbock et al.
8,528,462 B2 9/2013 Pacht
8,528,585 B2 9/2013 McGuire
8,701,546 B2 4/2014 Pacht
9,010,412 B2 4/2015 McGuire
D731,035 S 6/2015 Lo Cicero
D737,497 S 8/2015 Burgess et al.
9,188,121 B1 11/2015 Dille
D748,228 S 1/2016 Bayyouk et al.
9,260,933 B2 2/2016 Artherholt et al.
9,328,745 B2 5/2016 Bartlok et al.
9,371,919 B2 6/2016 Forrest et al.
9,416,887 B2 8/2016 Blume
9,435,454 B2 9/2016 Blume
9,534,473 B2 1/2017 Morris et al.
9,631,739 B2 4/2017 Belshan et al.
D787,029 S 5/2017 Bayyouk et al.
9,732,746 B2 8/2017 Chandrasekaran et al.
9,822,894 B2 11/2017 Bayyouk et al.
D806,241 S 12/2017 Swinney et al.
10,184,470 B2 1/2019 Barnett, Jr.
10,941,765 B2 3/2021 Nowell et al.
11,434,901 B2 9/2022 Nowell et al.
2002/0166588 A1 11/2002 Dean
2004/0170507 A1 9/2004 Vicars
2004/0234404 A1 11/2004 Vicars
2006/0002806 A1 1/2006 Baxter et al.
2006/0027779 A1 2/2006 McGuire et al.
2007/0013143 A1* 1/2007 Schroeder ............ F16J 15/3236 277/551
2008/0006089 A1 1/2008 Adnan et al.
2008/0008605 A1 1/2008 Bauer et al.
2008/0093361 A1 4/2008 Kennedy et al.
2008/0279706 A1 11/2008 Gambier et al.
2010/0243255 A1 9/2010 Luharuka et al.
2011/0079302 A1 4/2011 Hawes
2011/0173814 A1 7/2011 Patel
2011/0189040 A1 8/2011 Vicars
2011/0206547 A1 8/2011 Kim et al.
2012/0063936 A1 3/2012 Baxter et al.
2012/0141308 A1 6/2012 Saini et al.
2012/0187321 A1 7/2012 Small
2013/0020521 A1 1/2013 Byrne
2013/0112074 A1 5/2013 Small
2013/0202458 A1 8/2013 Byrne et al.
2013/0319220 A1 12/2013 Luharuka et al.
2014/0127062 A1 5/2014 Buckley et al.
2014/0196883 A1 7/2014 Artherholt et al.
2014/0348677 A1 11/2014 Moeller et al.
2015/0084335 A1 3/2015 Farrell et al.
2015/0132157 A1 5/2015 Whaley et al.
2015/0144826 A1 5/2015 Bayyouk et al.
2016/0123313 A1 5/2016 Simmons
2016/0160848 A1 6/2016 Toppings et al.
2017/0002947 A1 1/2017 Bayyouk et al.
2017/0089473 A1 3/2017 Nowell et al.
2017/0204852 A1 7/2017 Barnett, Jr.
2017/0211565 A1 7/2017 Morreale
2018/0017173 A1 1/2018 Nowell et al.
2018/0313456 A1 11/2018 Bayyouk et al.
2019/0011051 A1 1/2019 Yeung
2019/0128104 A1 5/2019 Graham et al.
2021/0270087 A1* 9/2021 Brunet .................... F16C 35/02
2022/0163032 A1* 5/2022 Chase ...................... F16J 15/20
2022/0397107 A1 12/2022 Thomas et al.

OTHER PUBLICATIONS

Exhibit B—Gradner Denver, Well Servicing Pump, Model GD-3000 Operating and Service Manual, dated Apr. 2011, (GD-3000), 44 pages.
Exhibit C—National Oilwell Varco 267Q-6M Quintuplex Plunger Pump Parts List, issued Sep. 6, 2000 and revised Jul. 21, 2008 (NOV-267Q), 13 pages.
Exhibit D (Part 1)—Declaration of William D. Marscher, PE, 209 pages.
Exhibit D (Part 2)—Declaration of William D. Marscher, PE, 124 pages.
Exhibit E—U.S. Patent and Trademark Office File History for U.S. Appl. No. 62/234,483, 45 pages, Alexandria, VA.
Exhibit F—U.S. Patent and Trademark Office File History for U.S. Appl. No. 62/315,343, 41 pages, Alexandria, VA.
Exhibit G—U.S. Patent and Trademark Office File History for U.S. Appl. No. 62/318,542, 44 pages, Alexandria, VA.
Exhibit H—U.S. Patent and Trademark Office File History for U.S. Appl. No. 62/346,915, 41 pages, Alexandria, VA.
U.S. Patent and Trademark Office File History for U.S. Pat. No. 10,591,070, 353 pages, Alexandria, VA.
U.S. Patent and Trademark Office File History for U.S. Appl. No. 15/719,124, 183 pages, Alexandria, VA.
Exhibit K—Susan Woods, Groove Milling, Cutting Tool Engineering, published Aug. 1, 2012, 11 pages.
Exhibit L—"Weir SPM General Catalog" (2009), 40 pages.
Exhibit M—Groovex, "Groove Milling, High Precision Tools for Groove Milling" brochure, Edition 04, dated Dec. 2012, 24 pages.

(56) References Cited

OTHER PUBLICATIONS

Exhibit N—Ricky Smith & R. Keith Mobley, Rules of Thumb for Maintenance and Reliability Engineers, 239-250 (2008), 15 pages.
Exhibit O—Ross Mackay, "Process engineering: Properly seal that pump", Chemical Processing, dated May 17, 2005, 11 pages.
Exhibit P—Vargus Ltd., "Groovex Groove milling", Youtube (Dec. 12, 2011, https://www.youtube.com/watch?v=vrFzHJUXjvk, 68 pages.
Exhibit Q—Paresh Girdhar, Octo Moniz, & Steve Mackay, Centrifugal Pump Design, "Plant and Process Engineering 360°", 521-536 (2004), 21 pages.
Exhibit R—Paresh Girdhar, Octo Moniz, & Steve Mackay, Centrifugal Pump Design and Construction, Practical "Centrifugal Pumps: Design, Operation and Maintenance", 18-47 (2005), 33 pages.
Exhibit S—Gardner Denver, "Well Servicing Pump", Model HD-2250 Operating and Service Manual, dated Jan. 2005, 44 pages.
Exhibit T—Robert Crosier, "Flush Free Sealing Benefits", Empowering Pumps & Equipment, dated Oct. 3, 2011, 5 pages.
Exhibit U—Cat "Quintuplex Well Stimulation Pump", WS255 (2013), 2 pages.
Exhibit V—Oxford "Dictionary of Mechanical Engineering", excerpted (2013), 10 pages.
Exhibit W—United States Patent and Trademark Office, Before the Patent Trial and Appeal Board, "*Cizion, Llc d/b/a Vulcan Industrial Manufacturing*, Petitioner v. *Kerr Maching Co*., Patent Owner" Case PGR2020-00065 U.S. Pat. No. 10,591,070, Petition for Post-Grant Review of U.S. Pat. No. 10,591,070 Under 35 U.S.C. Section 321-329 and 37 C.F.R. Section 42.200 Et Seq.—197 pages.
International Search Authority "PCT International Search Report", Mar. 31, 2020, 3 pages, Korean Intellectual Property Office, Republic of Korea.
Exhibits X-AA include photos of a power end and fluid end known in the are prior to Dec. 11, 2017, 4 pages.
Exhibit AB includes cross-sectional views of fluid end assemblies known in the art prior to Sep. 29, 2015, 4 pages.
Exhibit AC includes side views of valve seats known in the art prior to Sep. 29, 2015, 2 pages.
Exhibit AD is a cross-sectional view of a plunger end of a fluid assembly known in the art prior to Sep. 29, 2015, 1 page.
Exhibit AE includes an engineering drawing and pictures of a mud pump known in the art prior to Sep. 29, 2015, 4 pages.
Exhibit AF is a photograph of a fluid end offered for sale in the United States more than one year prior to Dec. 10, 2018, and also includes patent drawing of a fluid end similar to that shown in the photograph. The drawing was included in U.S. Appl. No. 62/532,574, filed Jul. 14, 2017, 2 pages.
Wikipedia, Washer (hardware), 2017, first page.

* cited by examiner

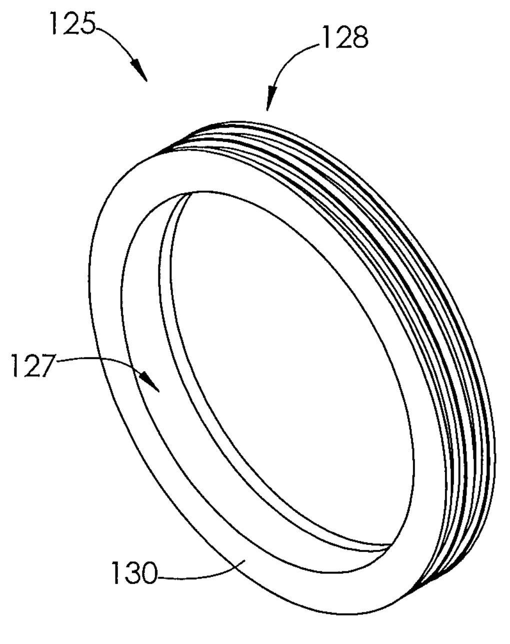
FIG. 50
FIG. 51
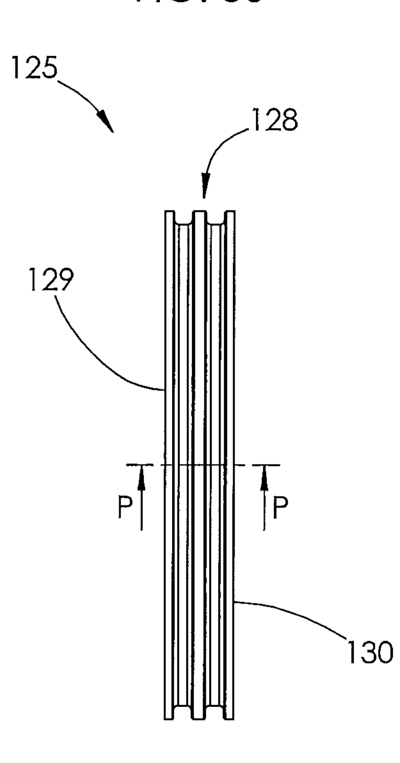
FIG. 52
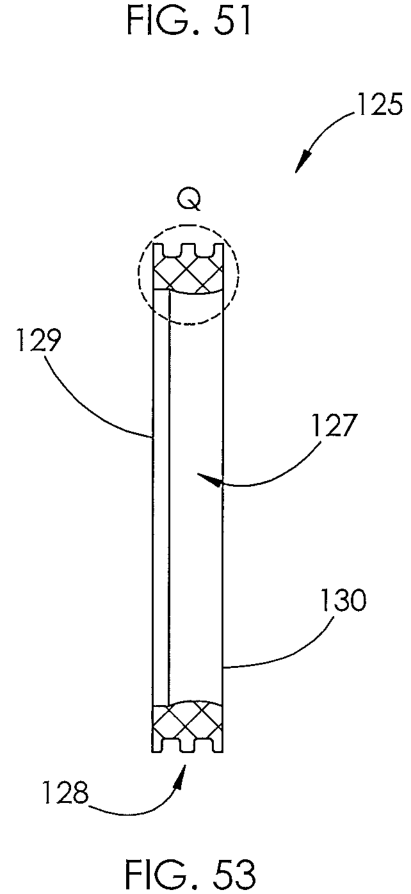
FIG. 53

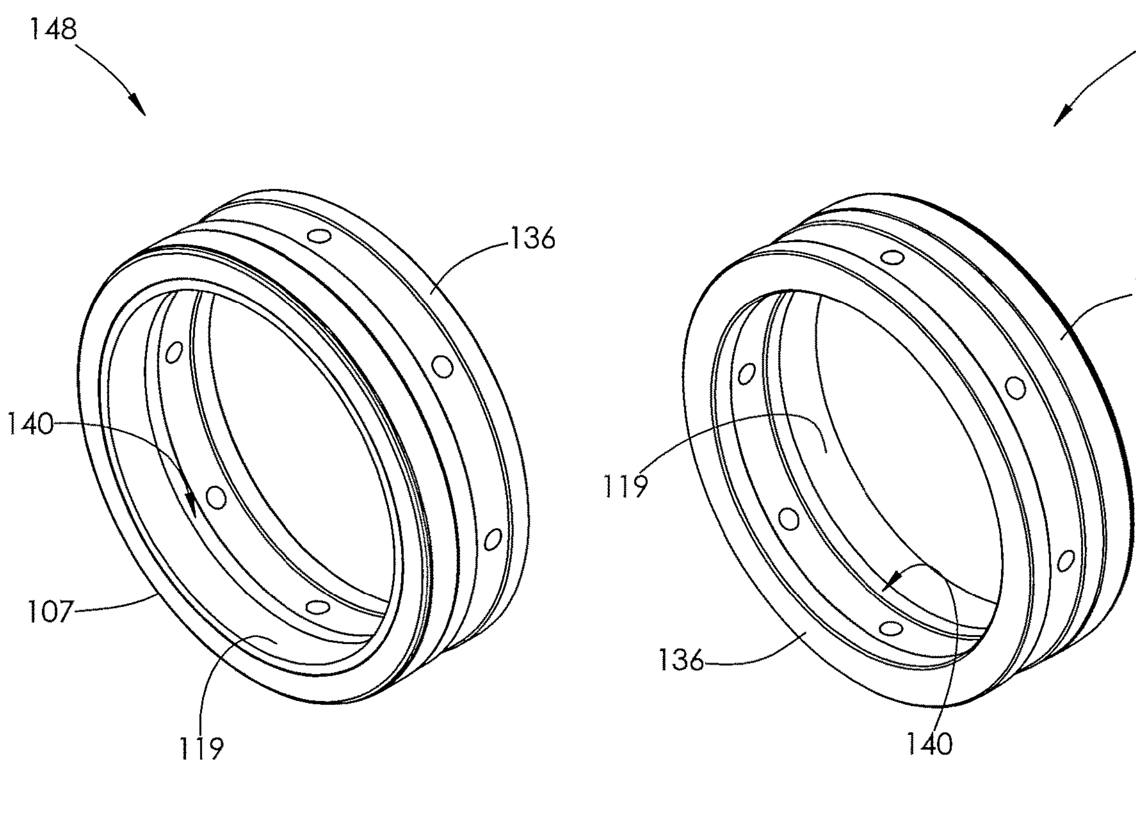
FIG. 72
FIG. 73
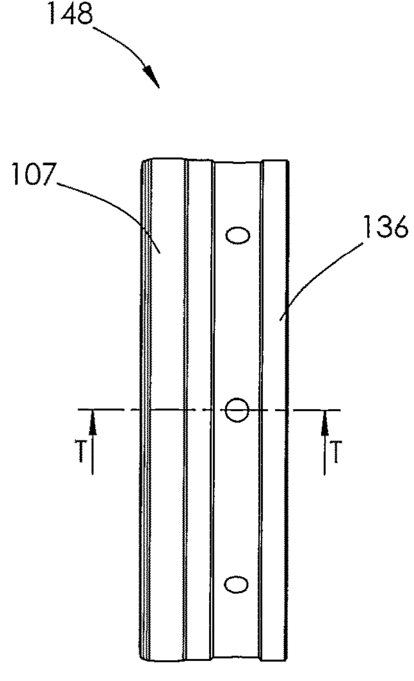
FIG. 74
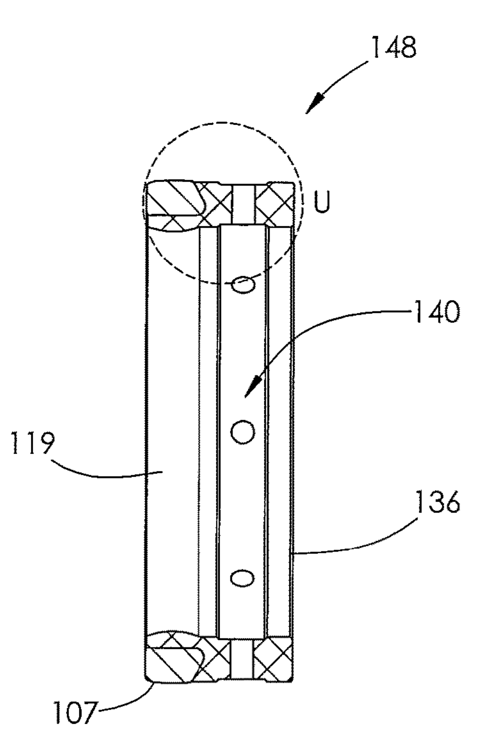
FIG. 75

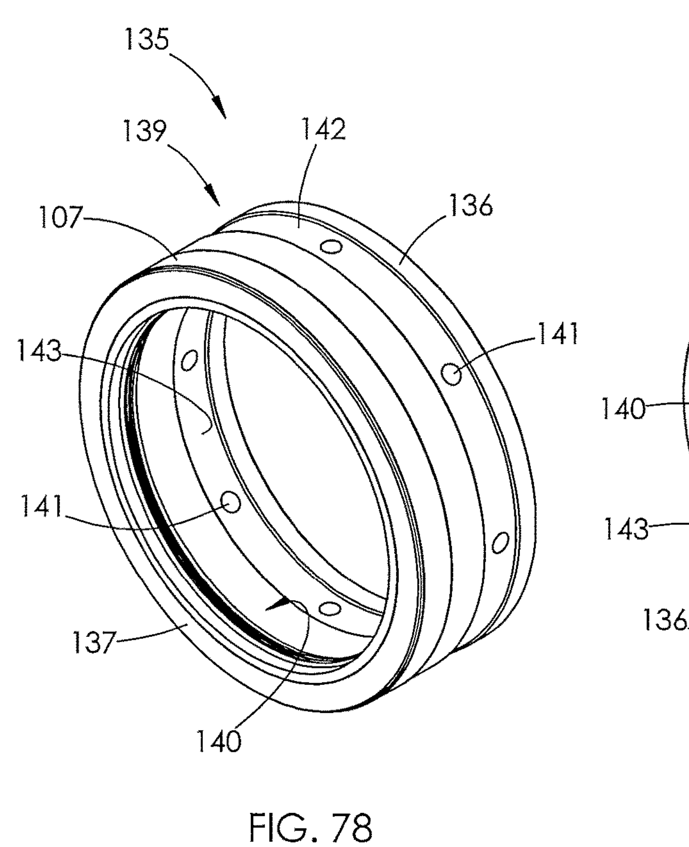
FIG. 78
135
139
142
107
140
143
136
141
138
141
141
FIG. 79
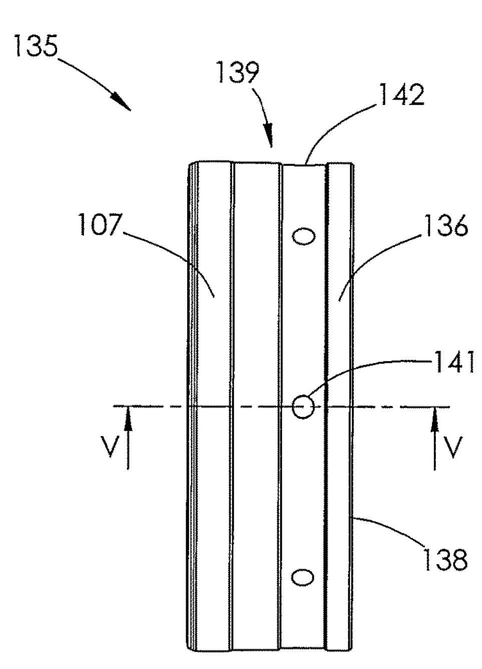
FIG. 80
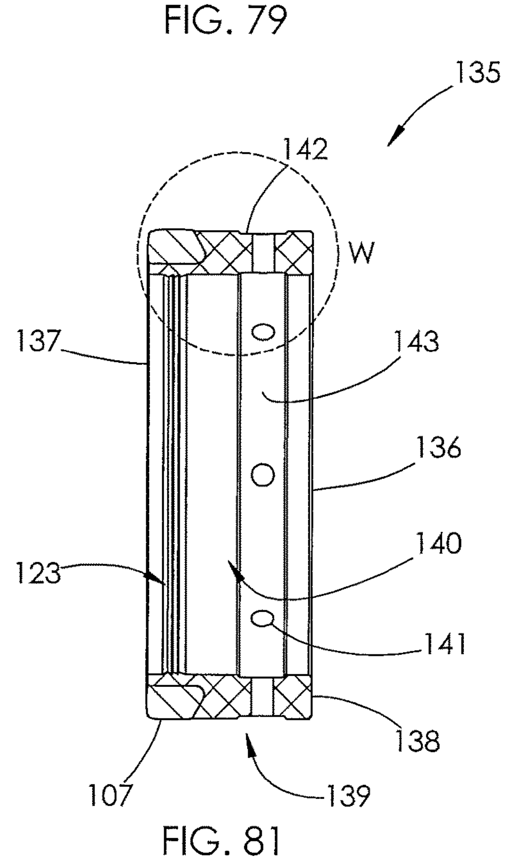
FIG. 81

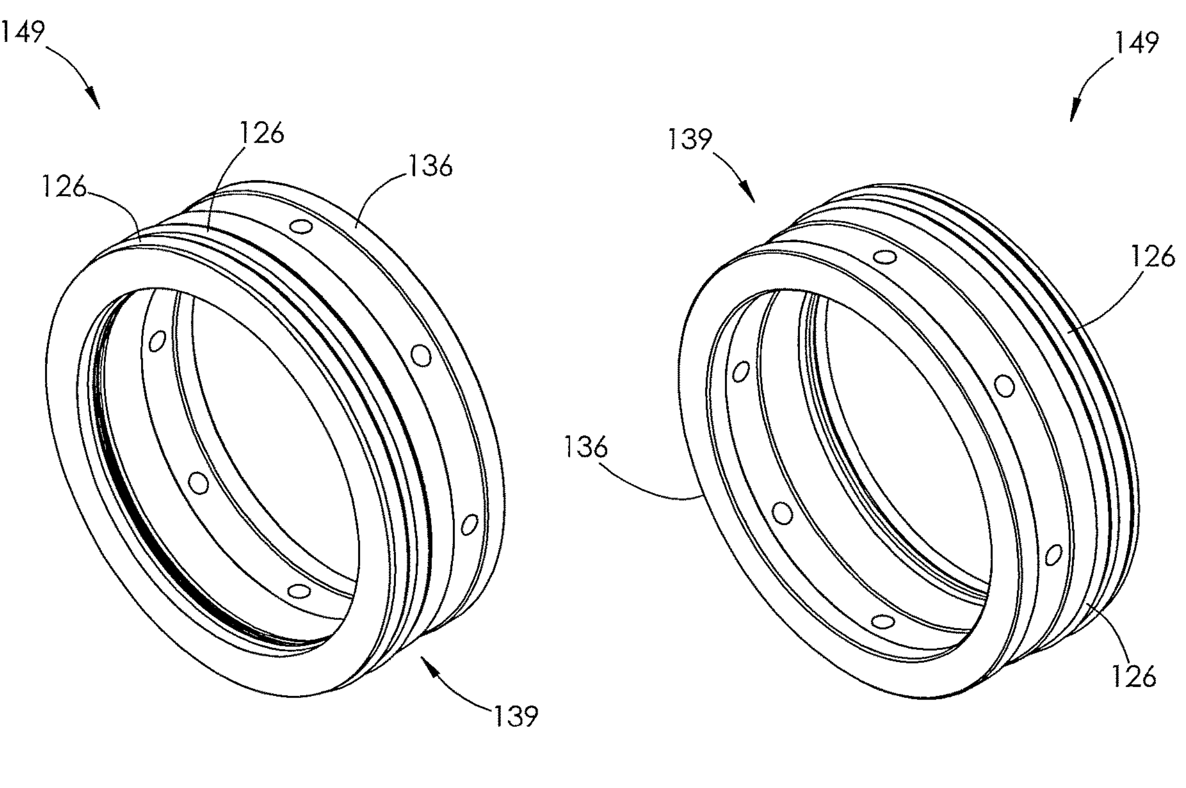
FIG. 90
FIG. 91
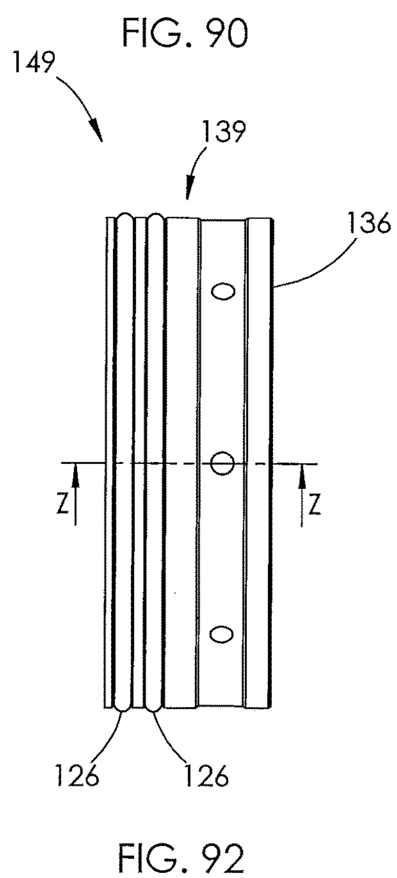
FIG. 92
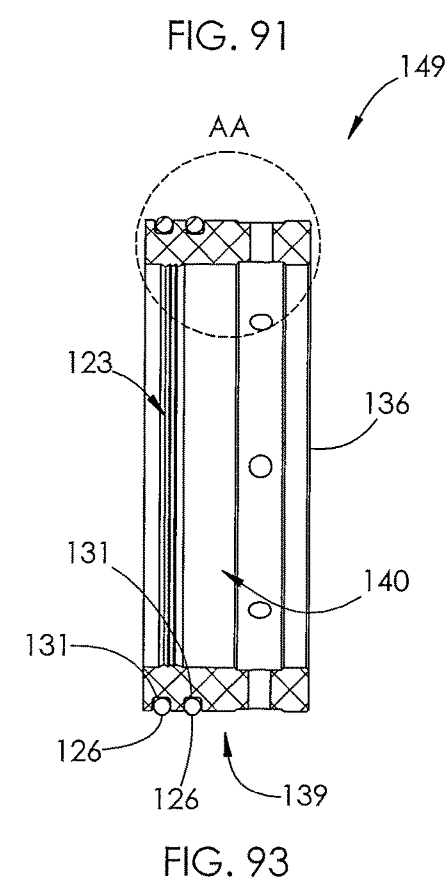
FIG. 93

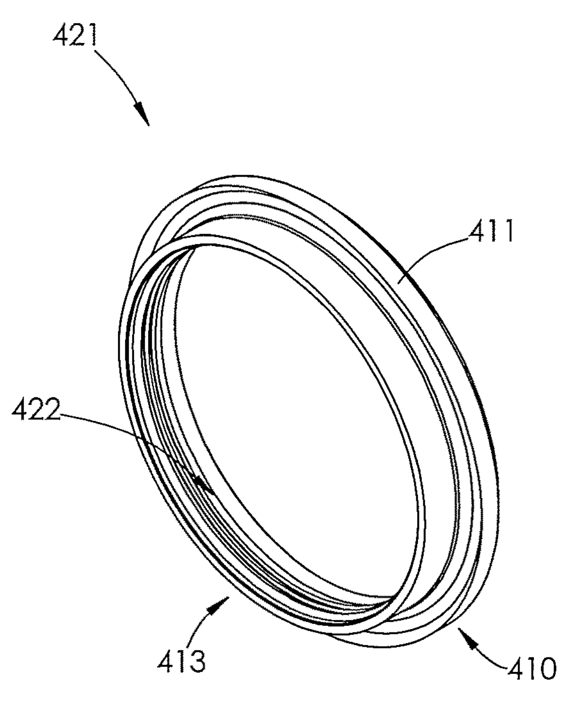
FIG. 119
421
411
422
412
410
FIG. 120
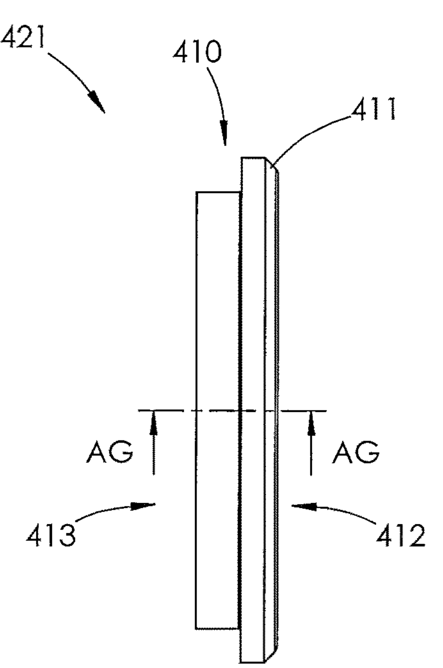
FIG. 121
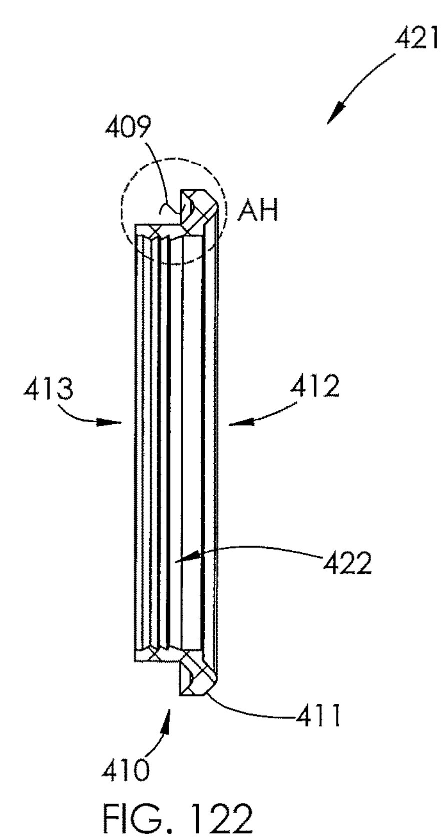
FIG. 122

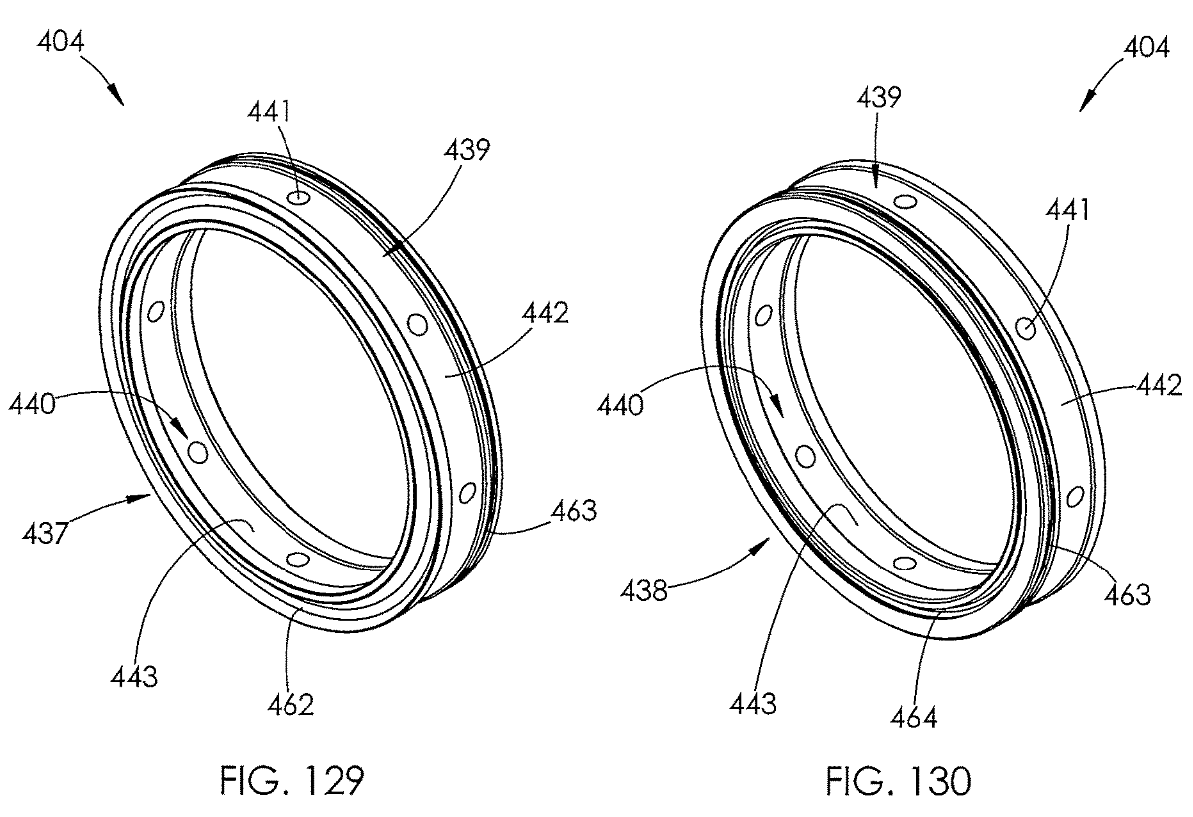
FIG. 129
FIG. 130
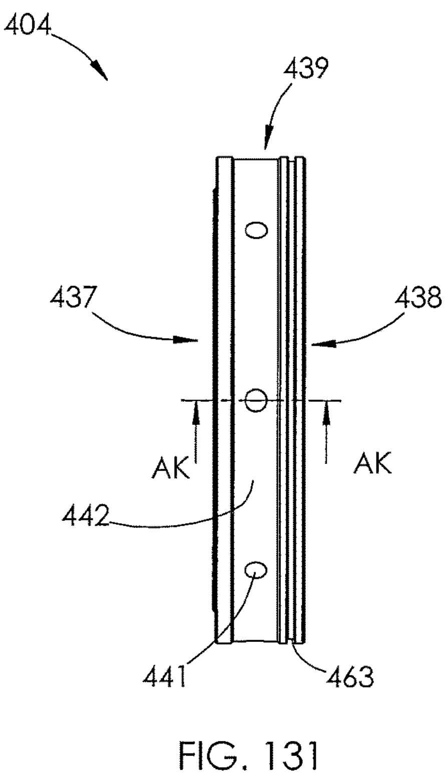
FIG. 131
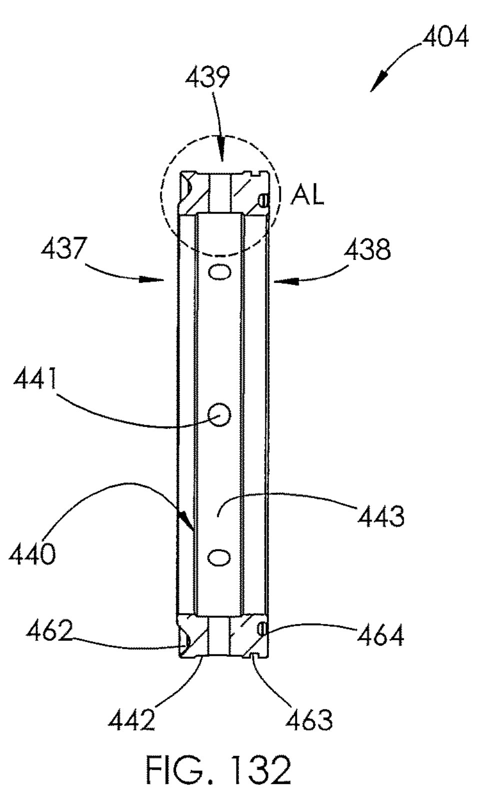
FIG. 132

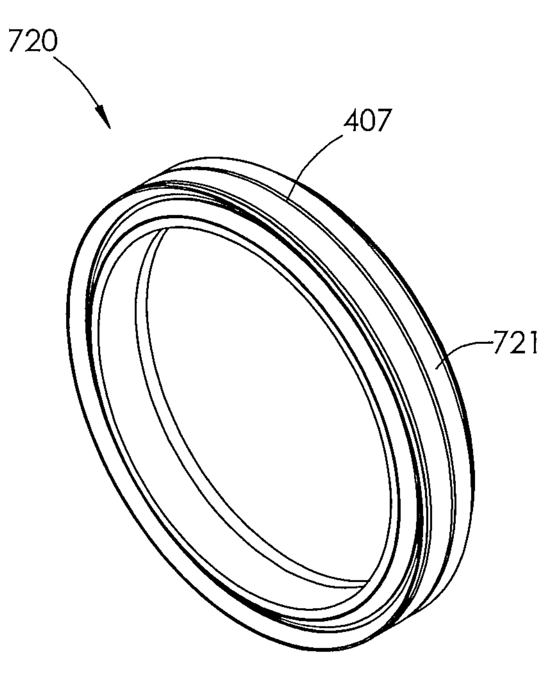
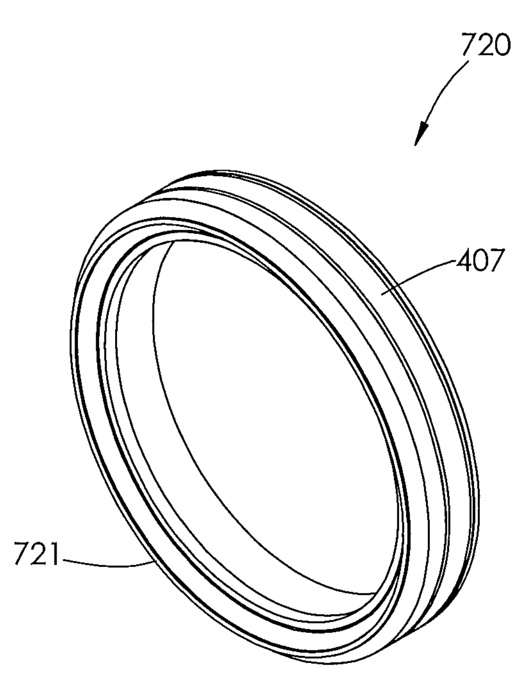
FIG. 158
FIG. 159
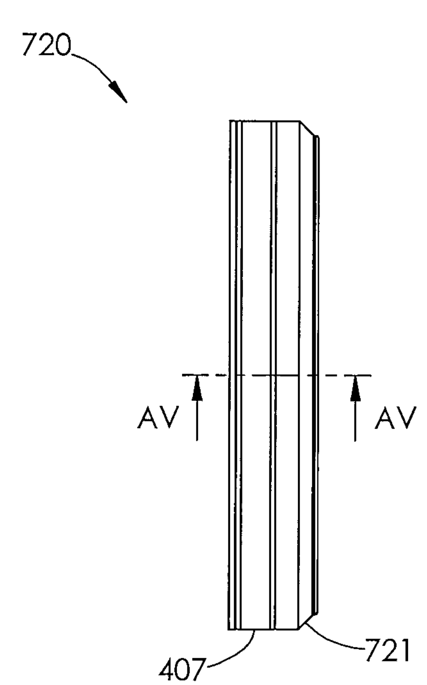
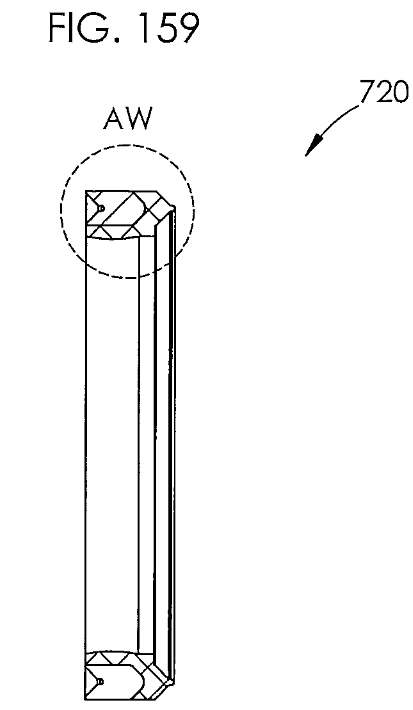
FIG. 160
FIG. 161

HYBRID PRESSURE SEAL

SUMMARY

The present invention is directed to a plunger packing. The plunger packing comprises a lantern ring, a junk ring, and at least one hybrid seal. The at least one hybrid seal is positioned between the junk ring and the lantern ring. The at least one hybrid seal comprises an inner seal and an outer seal.

The inner seal has an outwardly facing annular cutout. The outer seal is disposed in the outwardly-facing annular cutout of the inner seal. The outer seal is comprised of a different material than the inner seal.

BRIEF DESCRIPTION OF THE DRAWINGS

FIG. 50 is a front perspective view of the inner seal used with the hybrid pressure seal shown in FIG. 44.

FIG. 51 is a rear perspective view of the inner seal shown in FIG. 50.

FIG. 52 is a side elevational view of the inner seal shown in FIG. 50.

FIG. 53 is a cross-sectional view of the inner seal shown in FIG. 52, taken along line P-P.

FIG. 72 is a front perspective view of another embodiment of a hybrid pressure seal used with the plunger packing shown in FIGS. 15-17.

FIG. 73 is a rear perspective view of the hybrid pressure seal shown in FIG. 72.

FIG. 74 is a side elevational view of the hybrid pressure seal shown in FIG. 72.

FIG. 75 is a cross-sectional view of the hybrid pressure seal shown in FIG. 74, taken along line T-T.

FIG. 78 is a front perspective view of another embodiment of a hybrid pressure seal used with the plunger packing shown in FIGS. 15-17.

FIG. 79 is a rear perspective view of the hybrid pressure seal shown in FIG. 78.

FIG. 80 is a side elevational view of the hybrid pressure seal shown in FIG. 78.

FIG. 81 is a cross-sectional view of the hybrid pressure seal shown in FIG. 80, taken along line V-V.

FIG. 90 is a front perspective view of another embodiment of a hybrid pressure seal used with the plunger packing shown in FIGS. 15-17.

FIG. 91 is a rear perspective view of the hybrid pressure seal shown in FIG. 90.

FIG. 92 is a side elevational view of the hybrid pressure seal shown in FIG. 90.

FIG. 93 is a cross-sectional view of the hybrid pressure seal shown in FIG. 92, taken along line Z-Z.

FIG. 119 is a front perspective view of the inner seal shown in FIG. 108.

FIG. 120 is a rear perspective view of the inner seal shown in FIG. 119.

FIG. 121 is a top plan view of the inner seal shown in FIG. 119.

FIG. 122 is a cross-sectional view of the inner seal shown in FIG. 121, taken along line AG-AG.

FIG. 124 is a front perspective view of the junk ring shown in FIG. 107.

FIG. 125 is a rear perspective view of the junk ring shown in FIG. 124.

FIG. 126 is a top plan view of the junk ring shown in FIG. 124.

FIG. 127 is a cross-sectional view of the junk ring shown in FIG. 126, taken along the line AI-AI.

FIG. 128 is an enlarged view of area AJ, shown in FIG. 127.

FIG. 129 is a front perspective view of the lantern ring shown in FIG. 107.

FIG. 130 is a rear perspective view of the lantern ring shown in FIG. 129.

FIG. 131 is a top plan view of the lantern ring shown in FIG. 129.

FIG. 132 is a cross-sectional view of the lantern ring shown in FIG. 131, taken along line AK-AK.

FIG. 133 is an enlarged view of area AL, shown in FIG. 132.

FIGS. 134-138 are alternate versions of FIGS. 108-112, respectively, but with a D-shaped seal rather than protrusions. FIG. 137 is taken along line AM-AM of FIG. 136, and FIG. 138 is an enlarged view of area AN from FIG. 137.

FIG. 139 is the cross-sectional view of the stuffing box and retainer shown in FIG. 16, but another embodiment of the plunger packing is shown installed therein.

Figure 139:
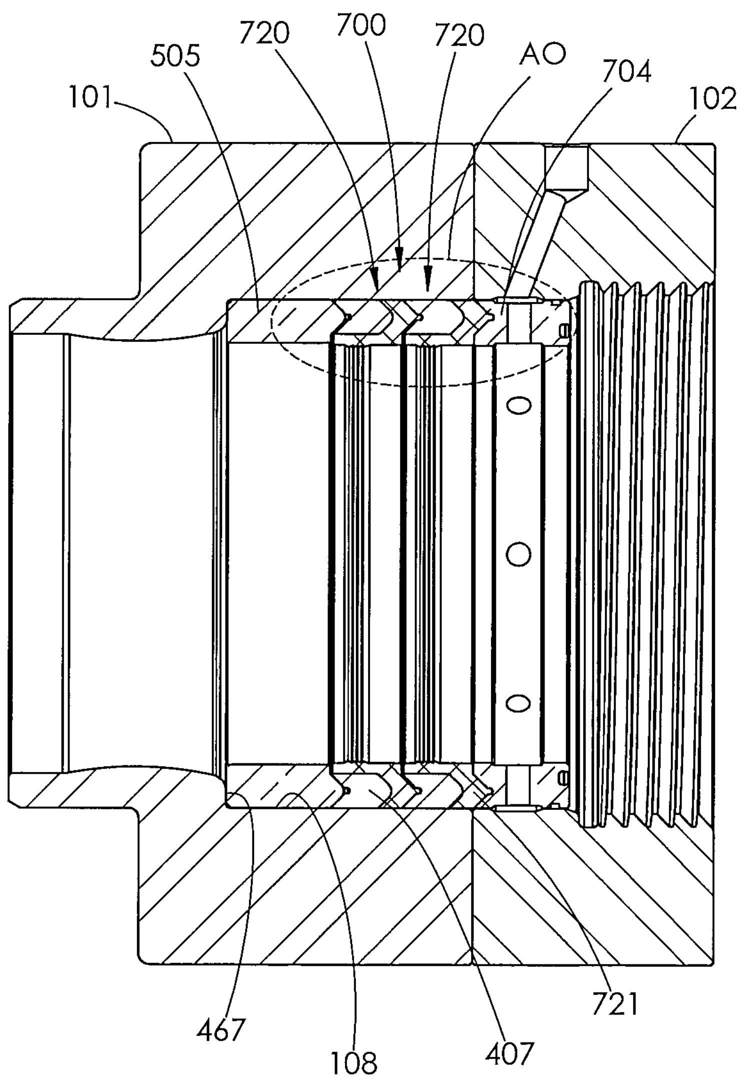
Figure 140:
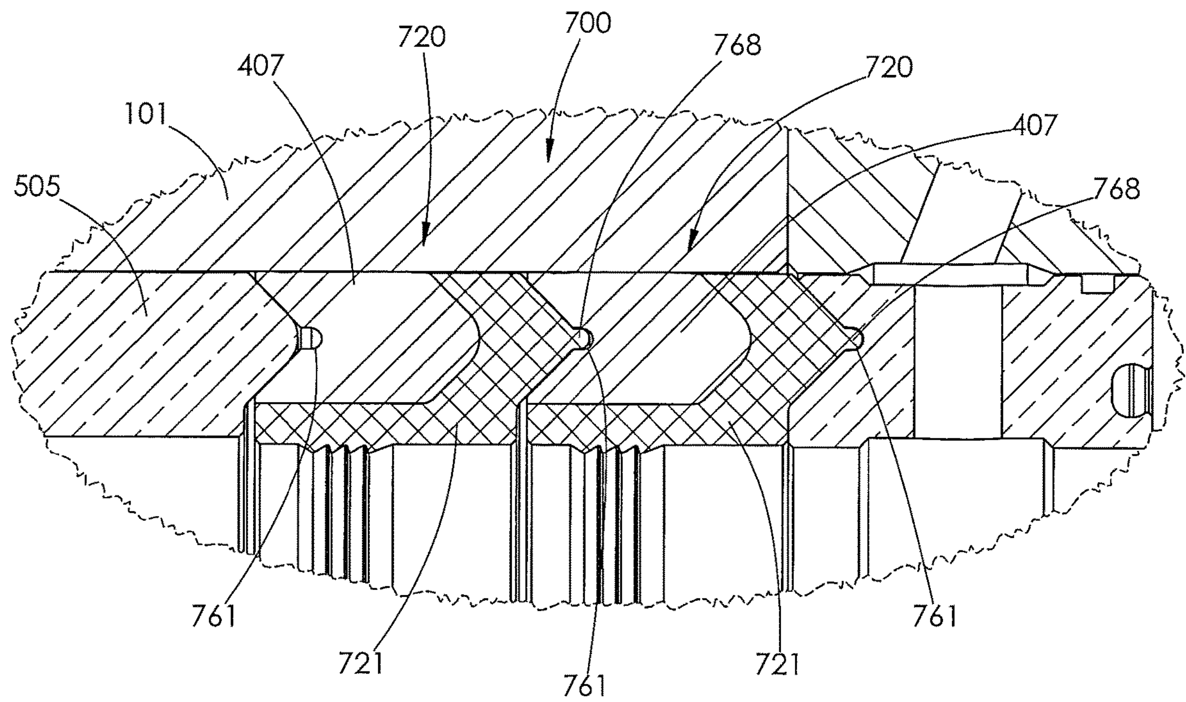

FIG. 140 is an enlarged view of area AO, shown in FIG. 139.

Figure 141:
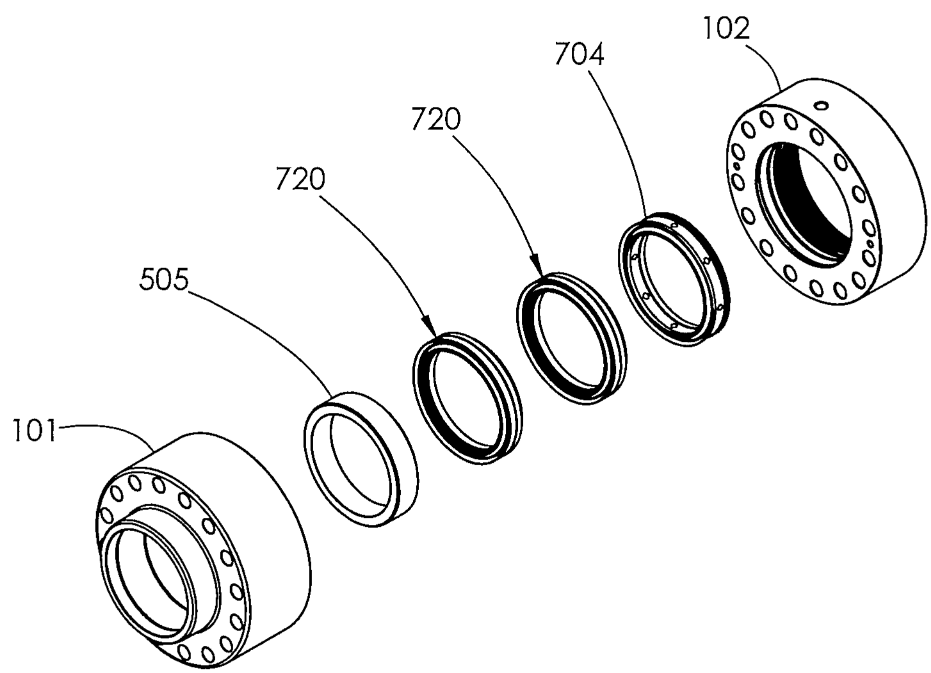

FIG. 141 is a front perspective and exploded view of the stuffing box, retainer, and plunger packing shown in FIG. 139.

Figure 142:
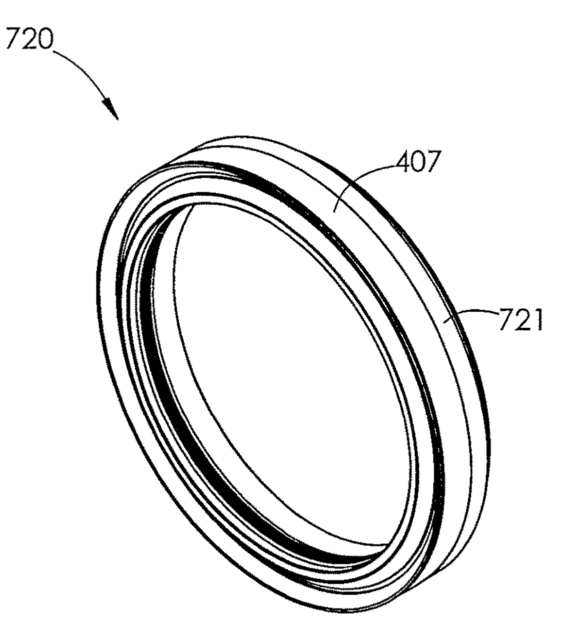

FIG. 142 is a front perspective view of the hybrid pressure seal shown in FIG. 139.

Figure 143:
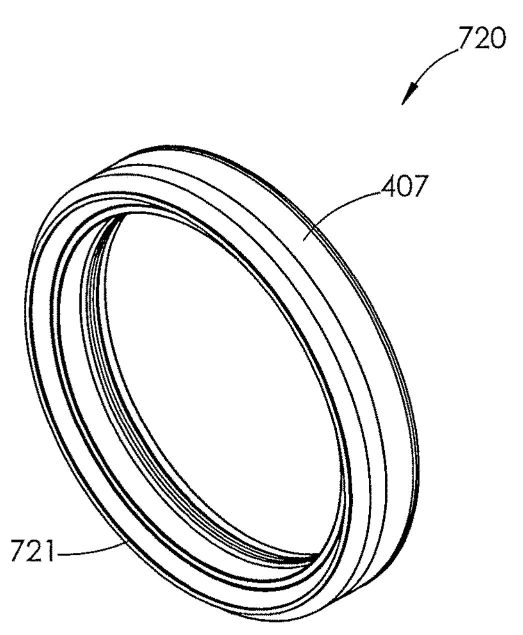

FIG. 143 is a rear perspective view of the hybrid pressure seal shown in FIG. 142.

Figure 144:
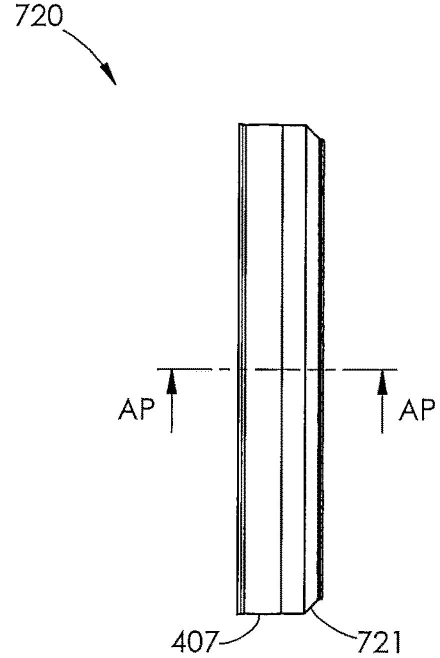

FIG. 144 is a top plan view of the hybrid pressure seal shown in FIG. 142.

Figure 145:
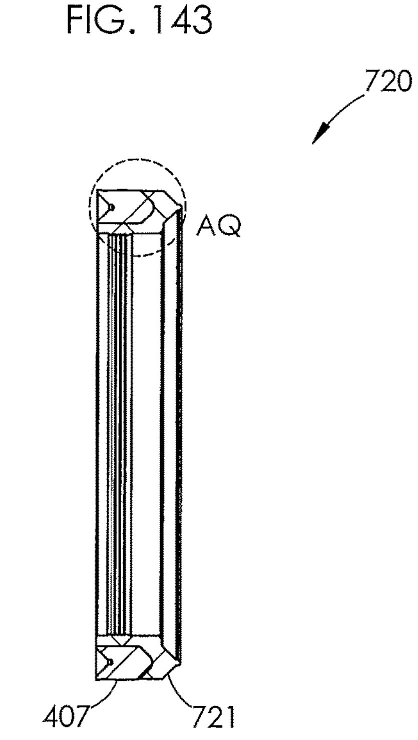

FIG. 145 is a cross-sectional view of the hybrid pressure seal shown in FIG. 144, taken along line AP-AP.

Figure 146:
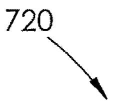
Figure 146:
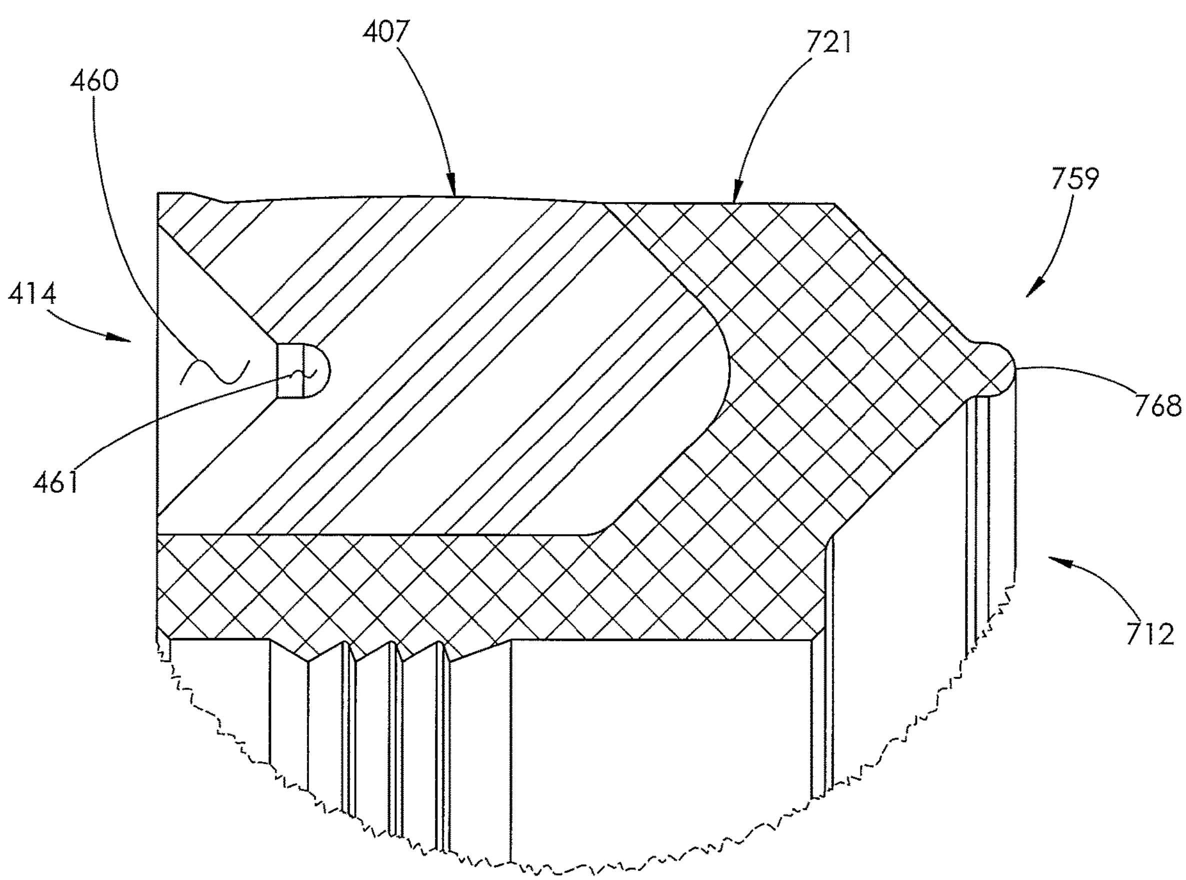

FIG. 146 is an enlarged view of area AQ, shown in FIG. 145.

Figure 147:
Figure 147:
Figure 147:
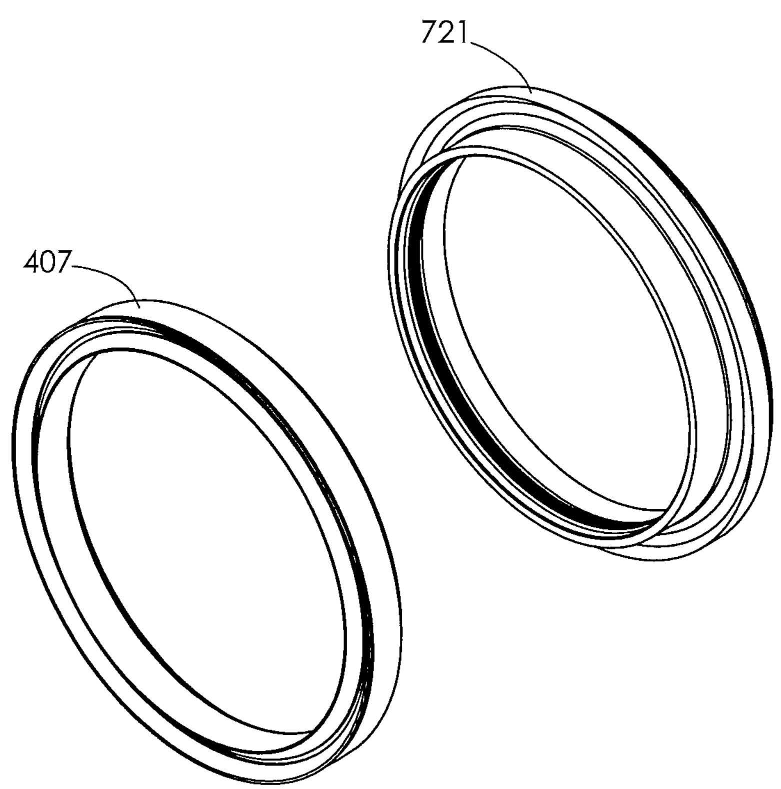

FIG. 147 is a front perspective and exploded view of the hybrid pressure seal shown in FIG. 142.

Figure 148:
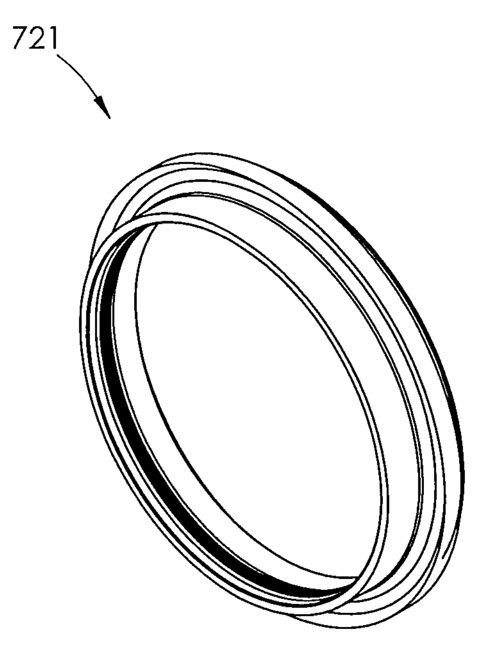

FIG. 148 is a front perspective view of the inner seal shown in FIG. 142.

Figure 149:
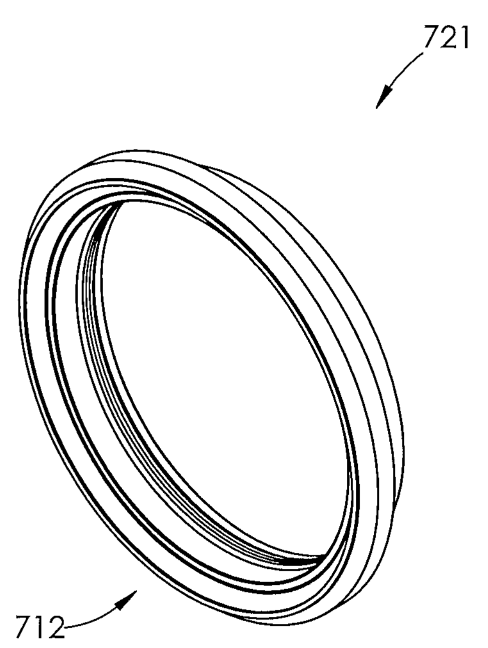

FIG. 149 is a rear perspective view of the inner seal shown in FIG. 148.

Figure 150:
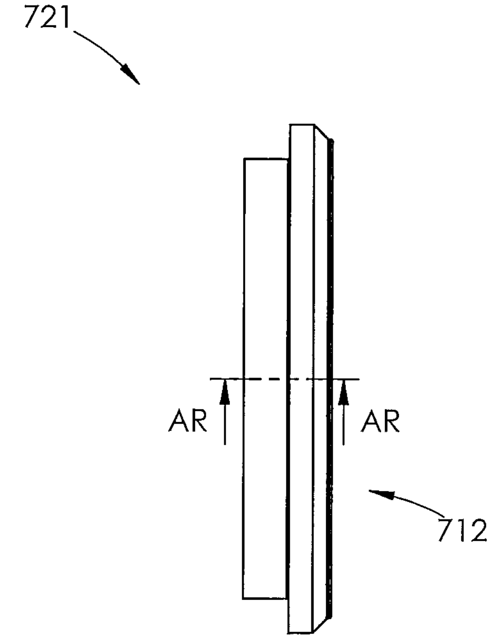

FIG. 150 is a top plan view of the inner seal shown in FIG. 148.

Figure 151:
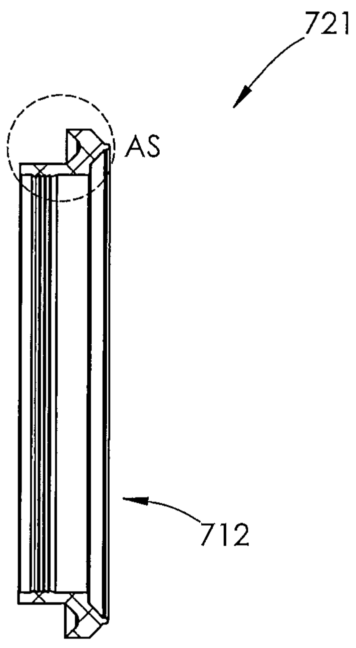

FIG. 151 is a cross-sectional view of the inner seal shown in FIG. 150, taken along line AR-AR.

Figure 152:
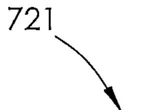
Figure 152:
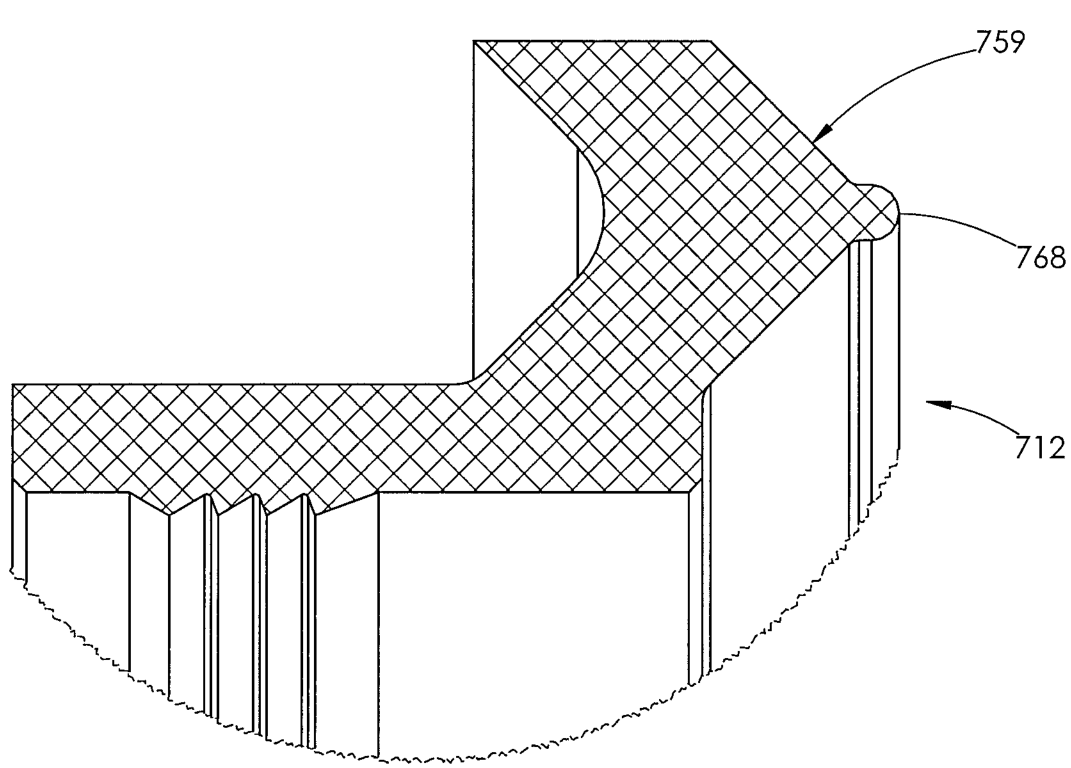

FIG. 152 is an enlarged view of area AS, shown in FIG. 151.

Figure 153:
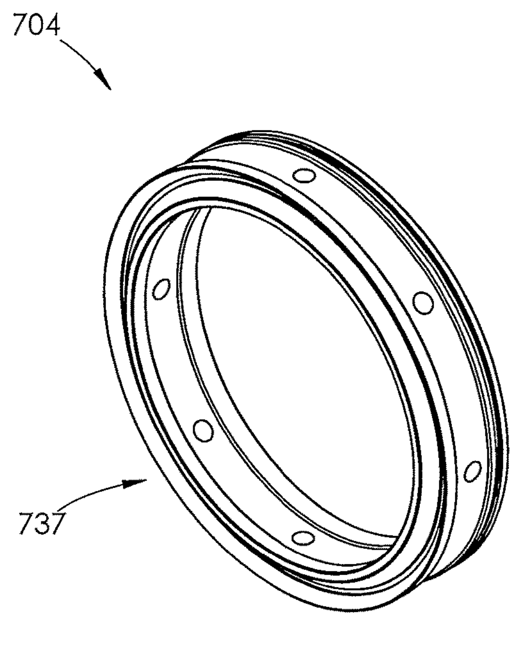

FIG. 153 is a front perspective view of the lantern ring shown in FIG. 139.

Figure 154:
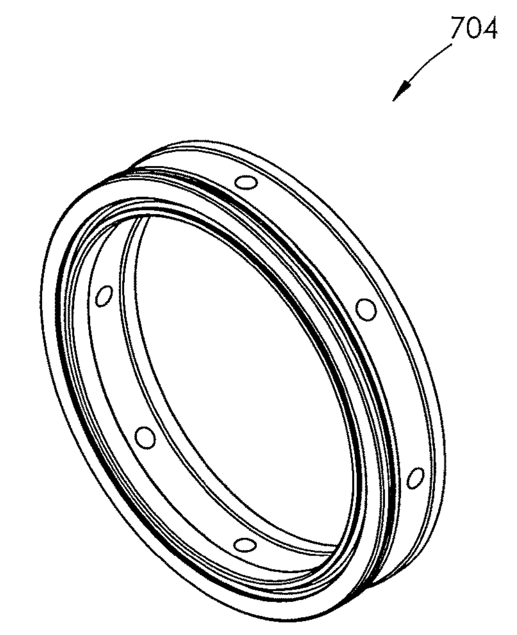

FIG. 154 is a rear perspective view of the lantern ring shown in FIG. 153.

Figure 155:
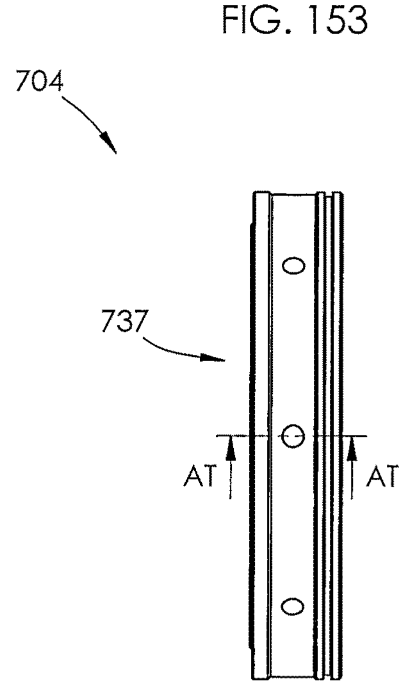

FIG. 155 is a top plan view of the lantern ring shown in FIG. 153.

Figure 156:
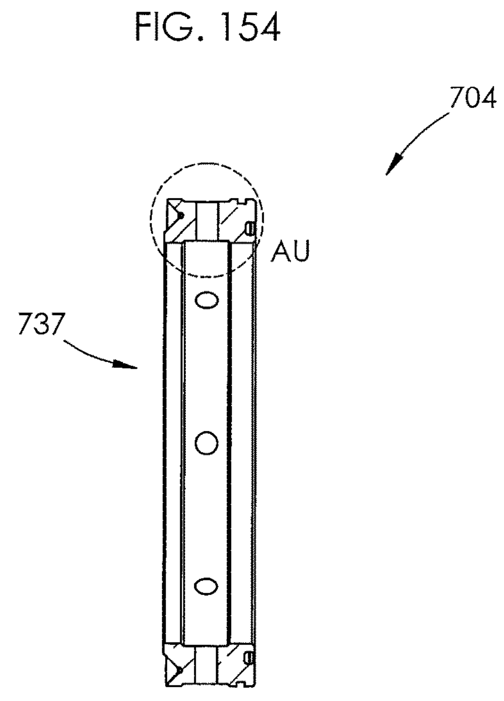

FIG. 156 is a cross-sectional view of the lantern ring shown in FIG. 155, taken along line AT-AT.

Figure 157:
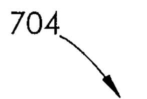
Figure 157:
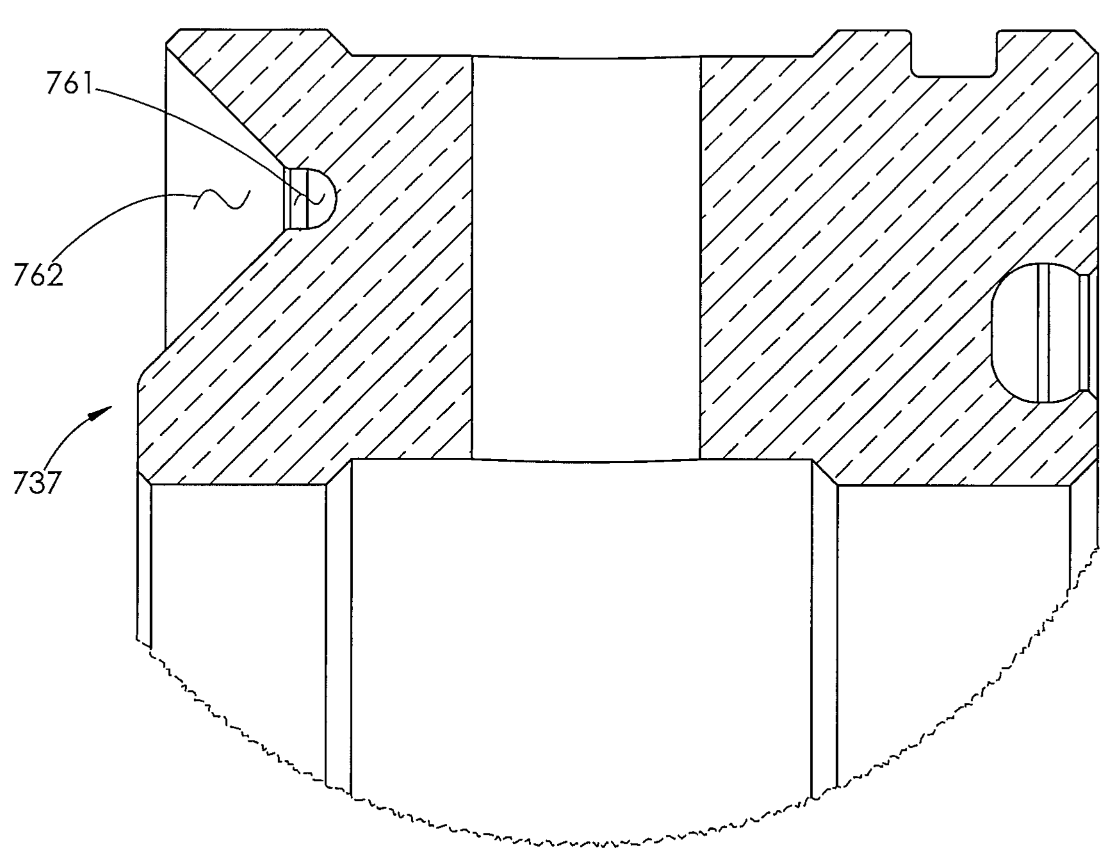

FIG. 157 is an enlarged view of area AU, shown in FIG. 156.

Figure 162:
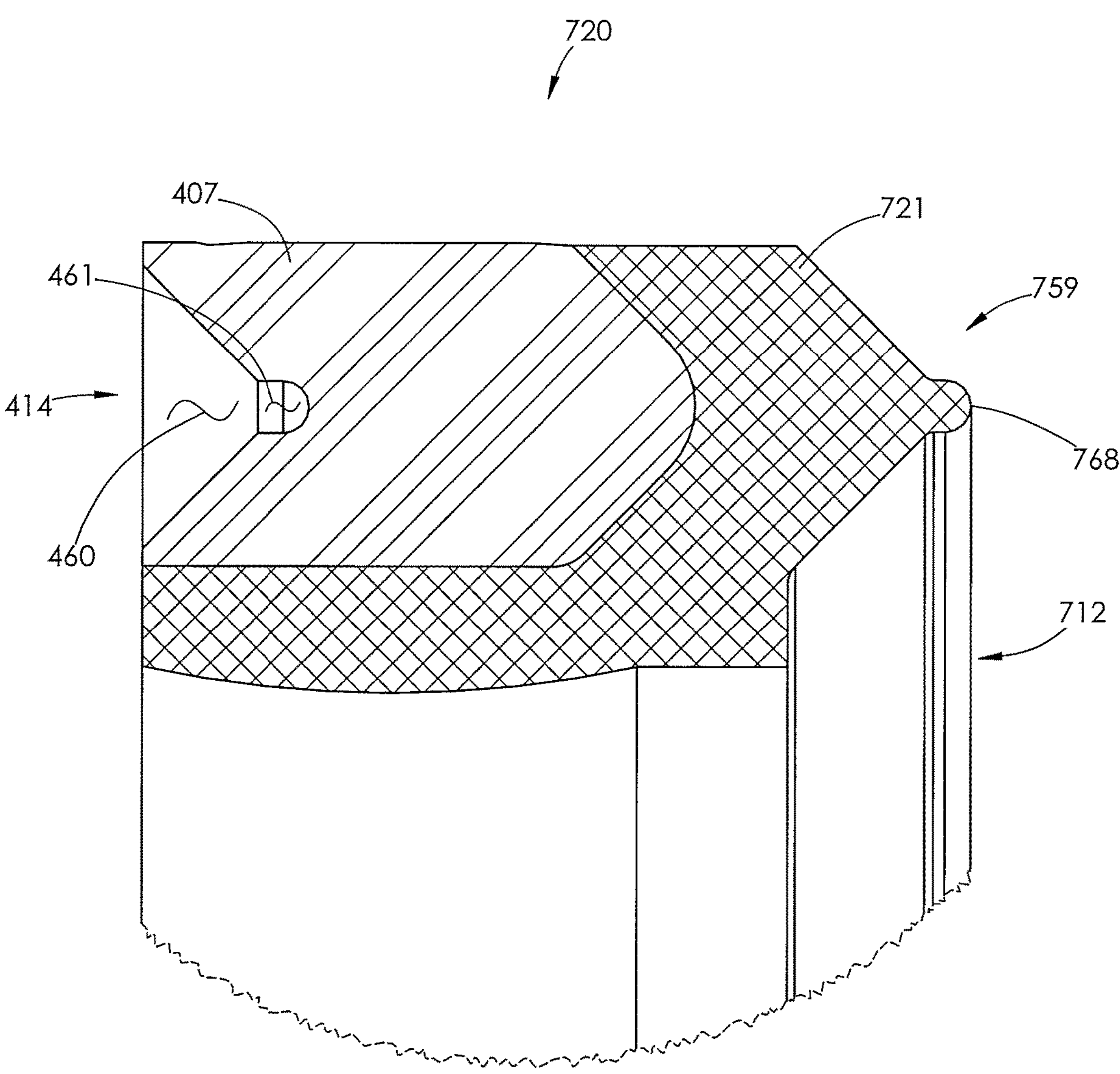

FIGS. 158-162 are alternate versions of FIGS. 142-146, respectively, but with a D-shaped seal rather than protrusions. FIG. 161 is taken along line AV-AV of FIG. 160, and FIG. 162 is an enlarged view of area AW from FIG. 161.

DETAILED DESCRIPTION

Figure 1:
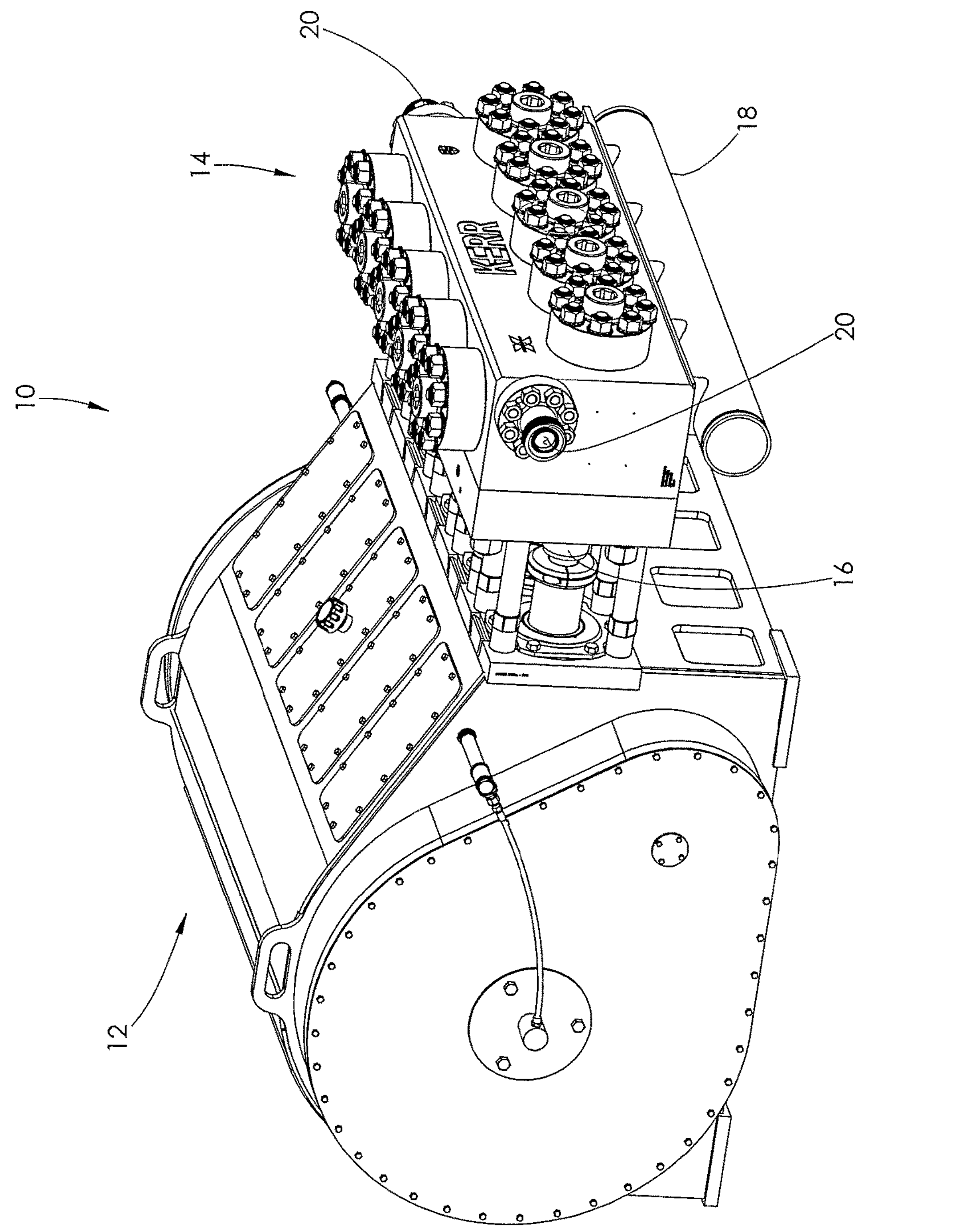
FIG. 1 is a left front top perspective of a pump including a power end and fluid end assembly in accordance with prior solutions.
Figure 2:
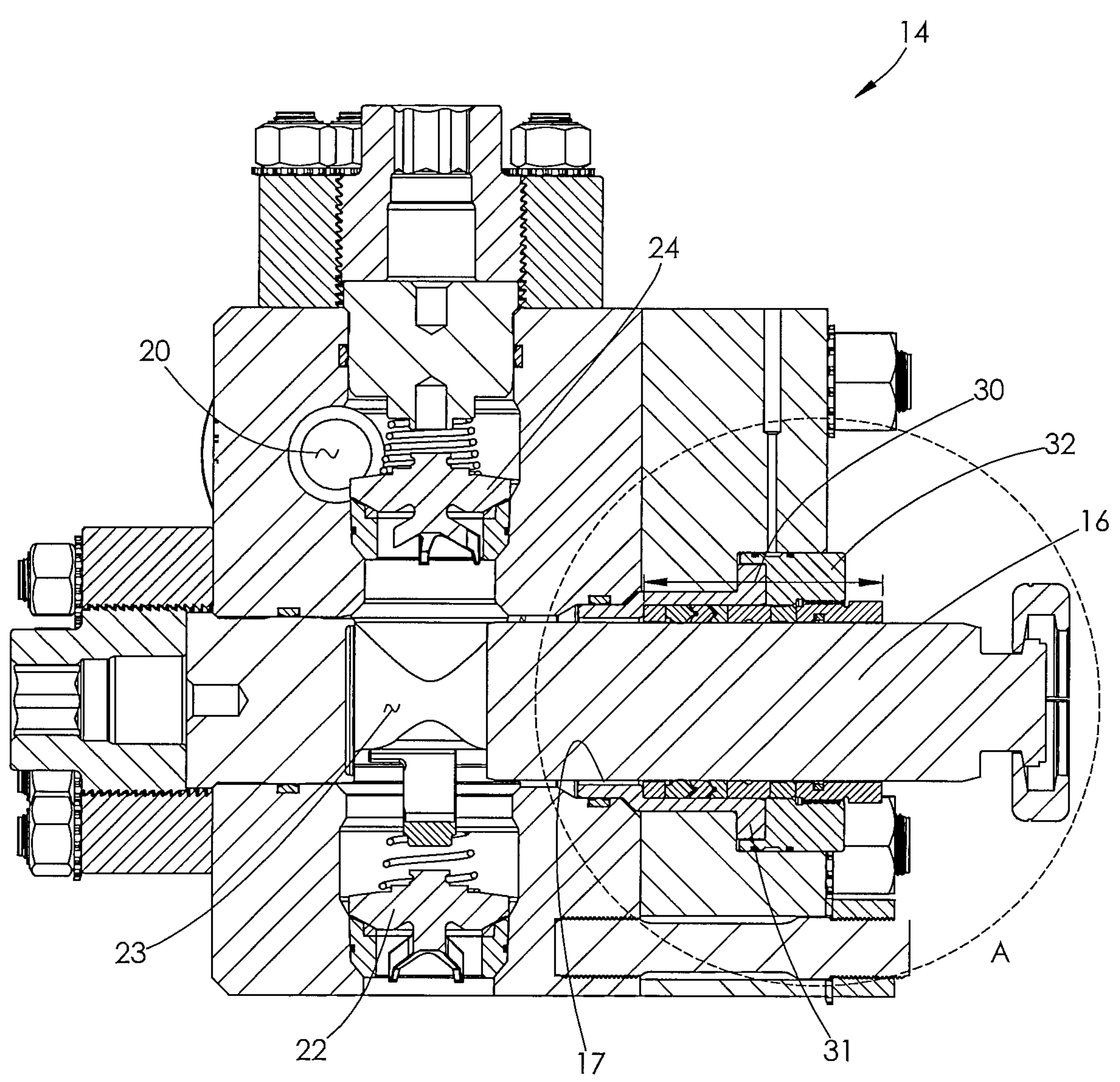
FIG. 2 is a cross-sectional side view of a fluid end assembly taken along a plunger bore thereof.
Figure 3:
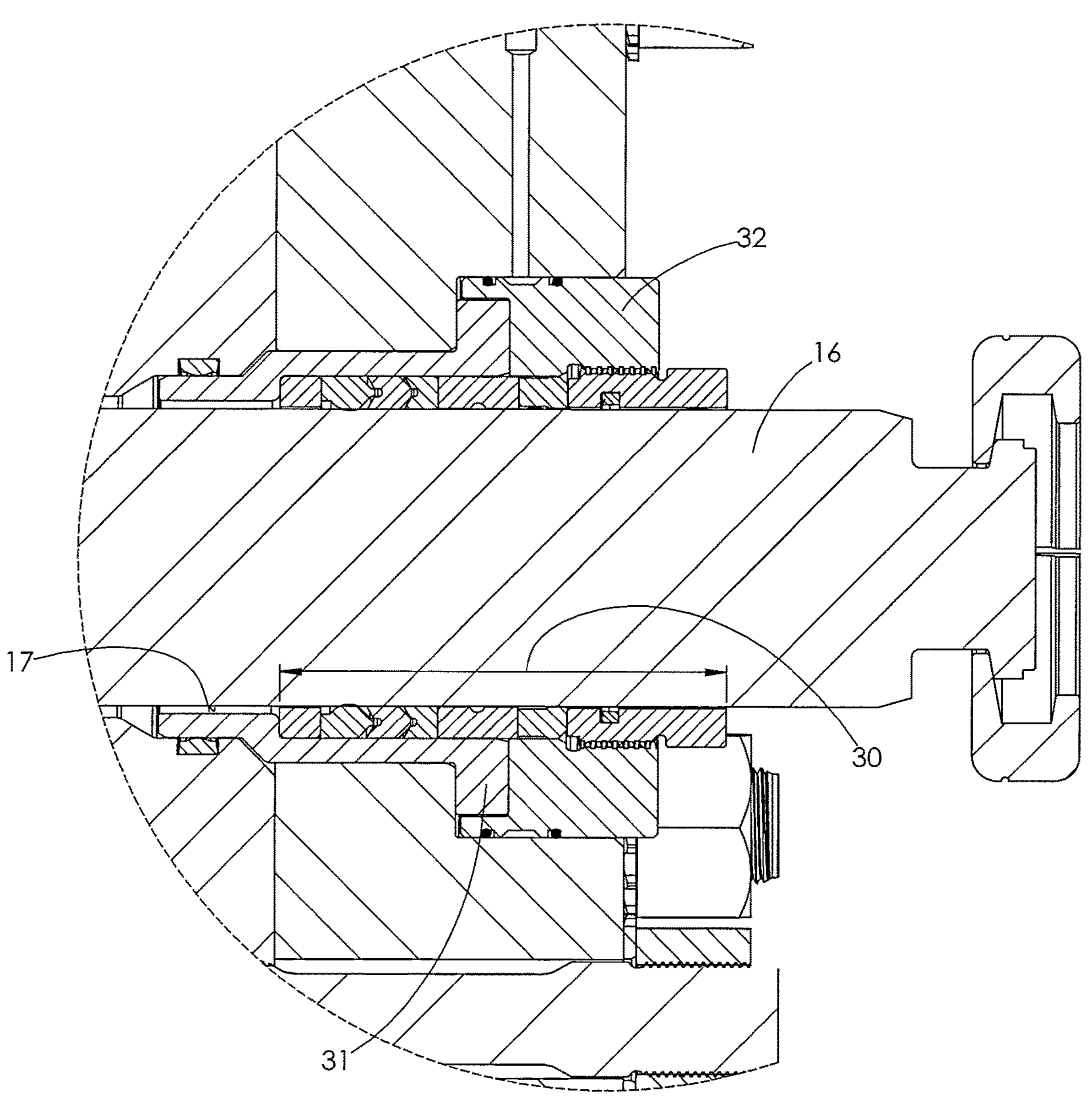
FIG. 3 is an enlarged view of area A taken from FIG. 2.

Turning to the figures generally, and FIGS. 1-3 in particular, a typical hydraulic fracturing pump 10 is shown. The pump 10 comprises a power end 12 and a fluid end 14. The power end 12 utilizes an internal, rotating crank shaft to reciprocate a number of plungers 16. The plungers 16 reciprocate within the fluid end 14. In this way, the pump 10 may pull fluid from an inlet manifold 18 during retraction of each plunger 16 and discharge fluid from an outlet 20 at a high pressure for delivery of fracturing fluid to a subterranean formation. An inlet valve 22 opens during retraction of the plunger 16 from an internal chamber 23 and closes during extension of the plunger 16. A discharge valve 24 opens during extension of the plunger 16 and closes during retraction.

The fluid end 14 has a plunger bore 17 for each plunger 16. The plunger bore 17 is open to the internal chamber 23. The plunger bore 17 must be sealed to prevent high pressure fluid within the internal chamber 23 from exiting through the plunger bore 17 rather than the discharge outlet 20. To this end, a plunger packing 30 is provided. The plunger packing 30 is installed within a stuffing box 31. The stuffing box 31 is retained within the plunger bore 17 by a retaining nut 32 or other retaining means. The plunger packing 30 known in the art comprises a plurality of packing seals positioned between a lantern ring and a junk ring. The packing seals are usually of single-piece construction and are made of the same elastomeric material throughout the seal. The lantern ring and the junk ring are traditionally made of metal or another hard material. During operation, the same material making up the packing seal engages the outer surface of the plunger 16 and the inner surface of the stuffing box 31 or plunger bore 17.

Figure 4:
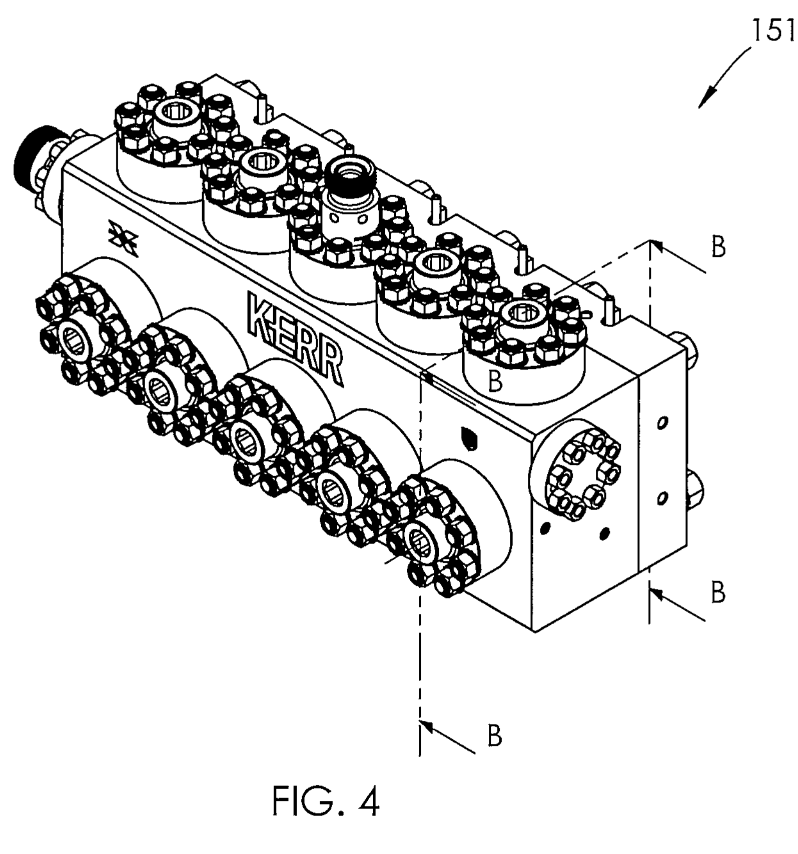
FIG. 4 is a front perspective view of a fluid end that may use the embodiments of plunger packing and hybrid pressure seals described herein.
Figure 5:
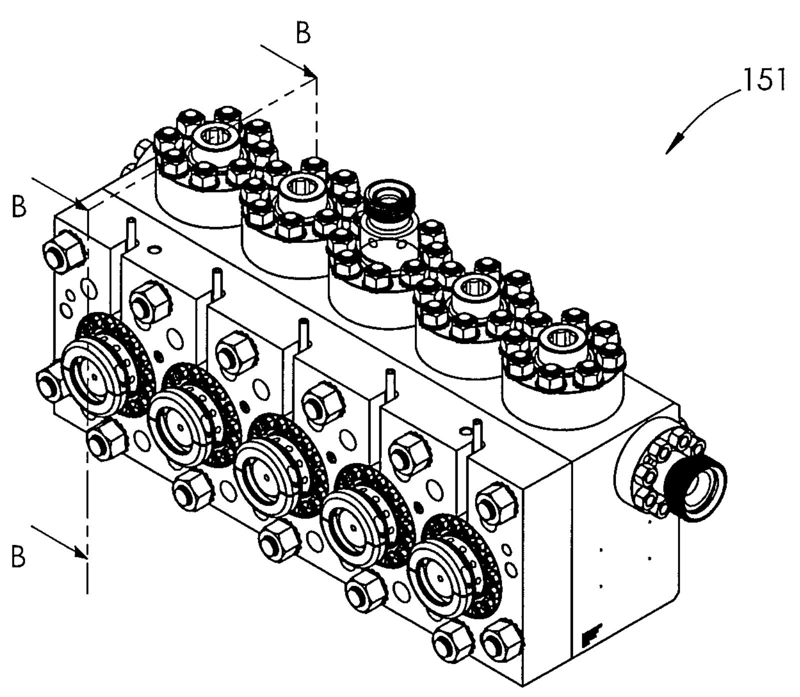
FIG. 5 is a rear perspective view of the fluid end shown in FIG. 4.
Figure 6:
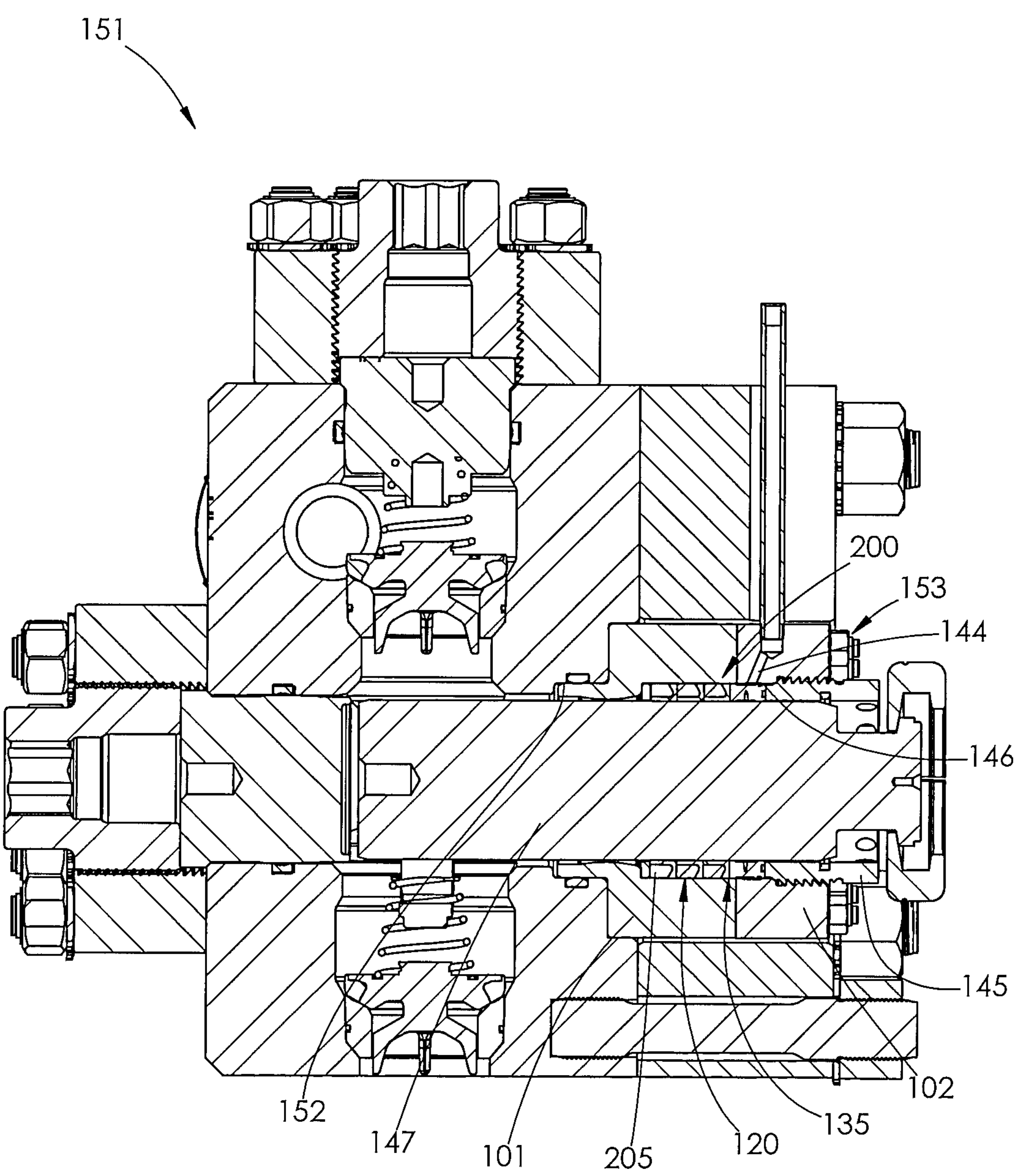
FIG. 6 is a cross-sectional view of the fluid end shown in FIGS. 4-5, taken along line B-B.
Figure 7:
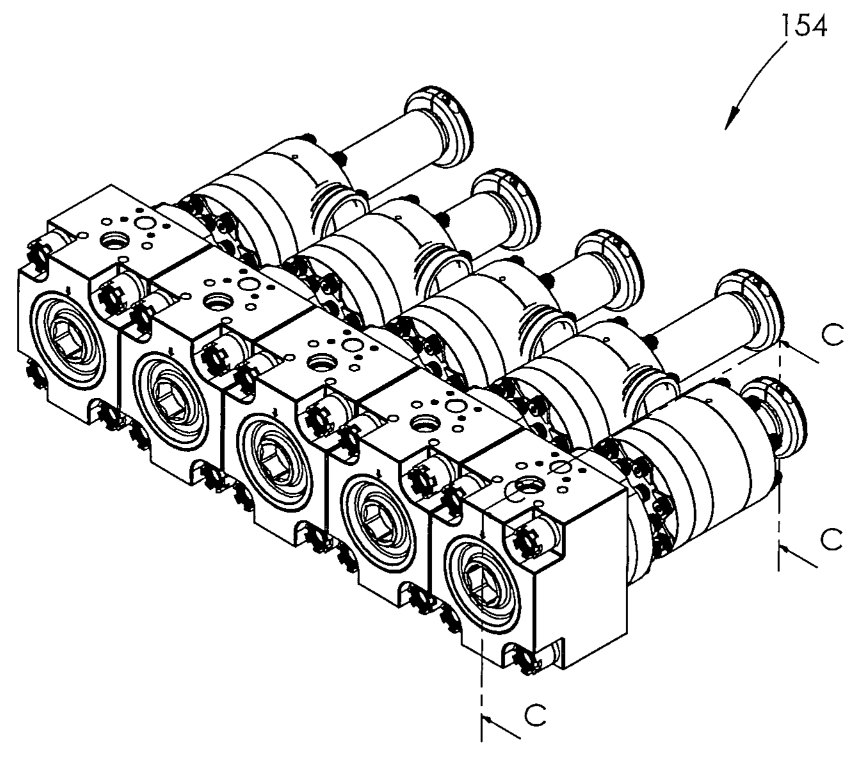
FIG. 7 is a front perspective view of another fluid end that may use the embodiments of plunger packing and hybrid pressure seals described herein.
Figure 8:
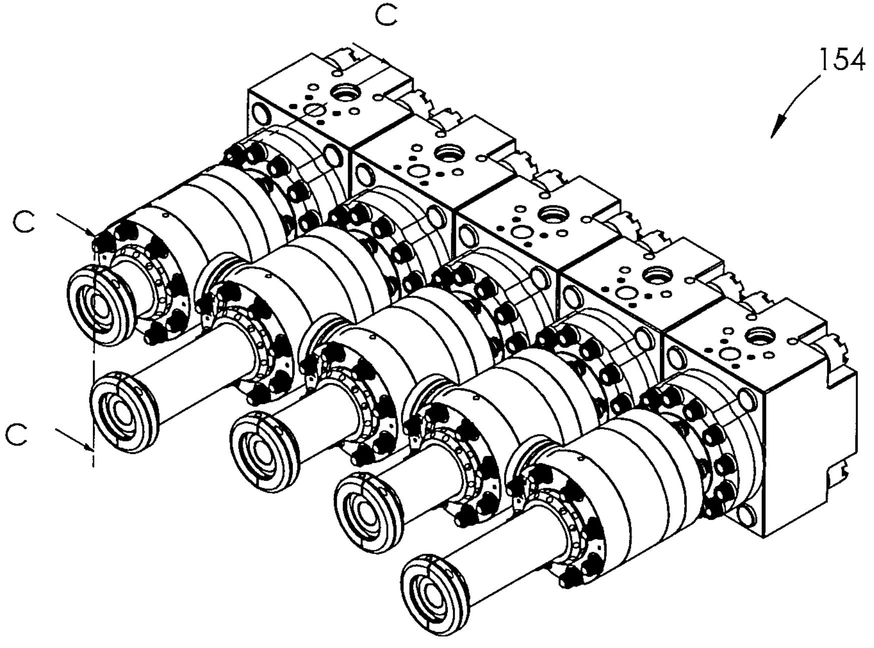
FIG. 8 is a rear perspective view of the fluid end shown in FIG. 7.
Figure 9:
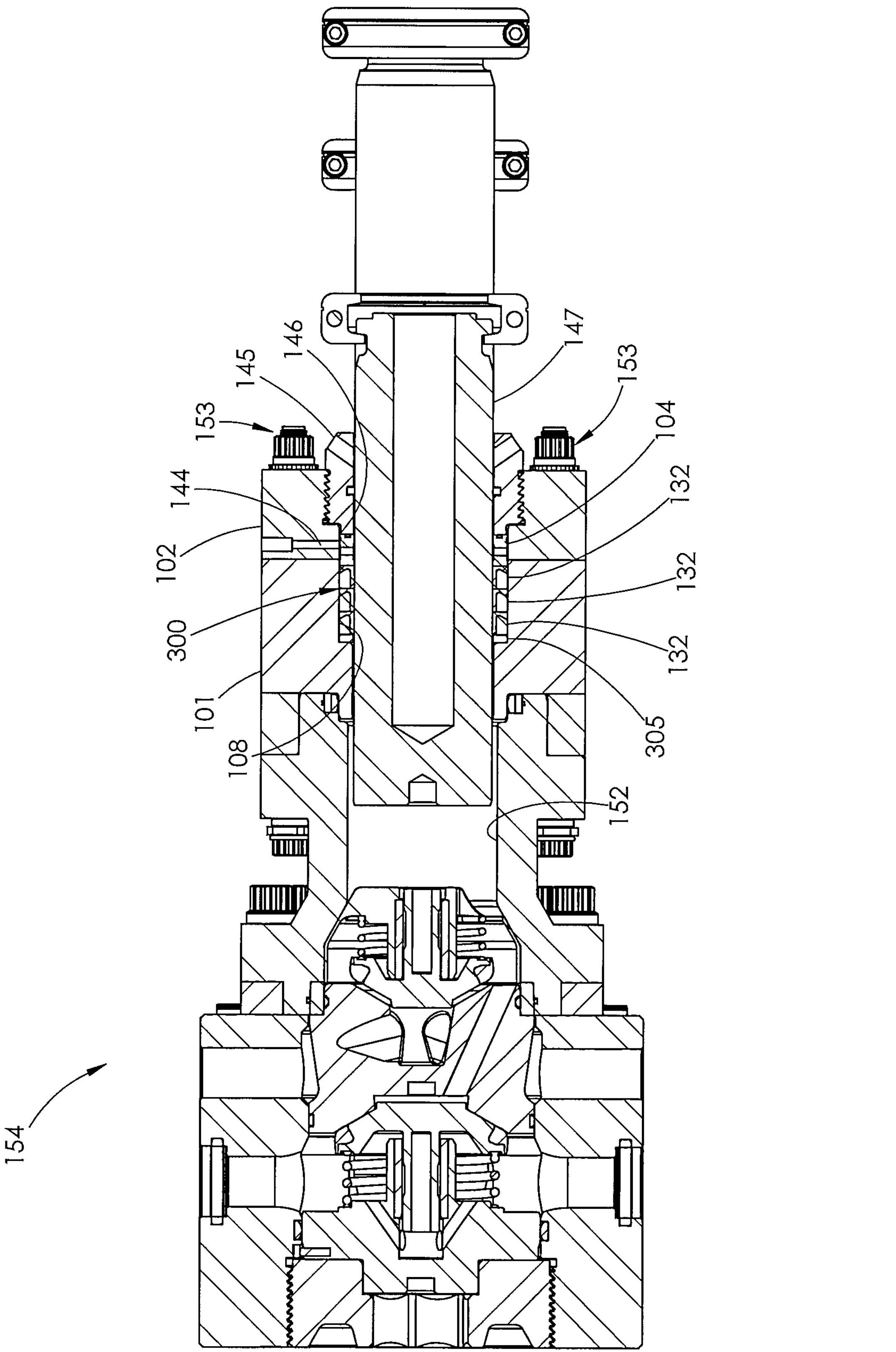
FIG. 9 is a cross-sectional view of the fluid end shown in FIGS. 7-9, taken along line C-C.
Figure 10:
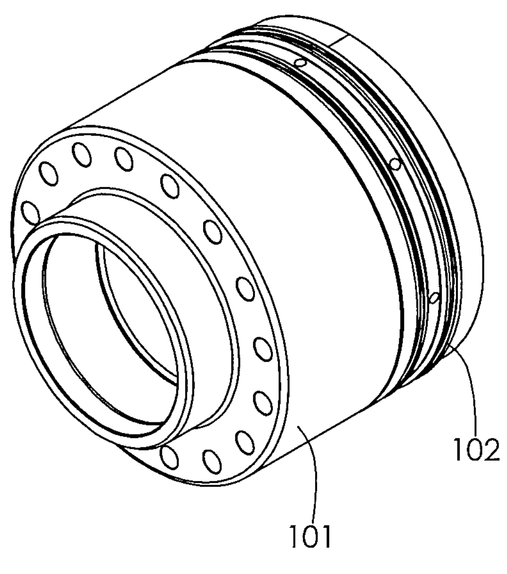
FIG. 10 is a front perspective view of one embodiment of a stuffing box and a retainer having a plunger packing disclosed herein installed therein.
Figure 11:
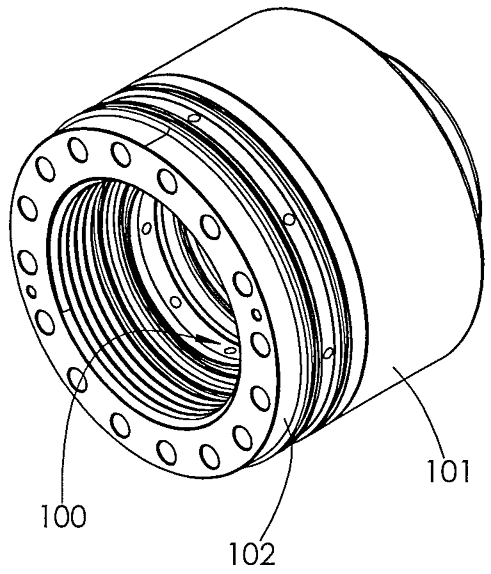
FIG. 11 is a rear perspective view of the stuffing box, retainer, and plunger packing shown in FIG. 10.
Figure 11:
Figure 12:
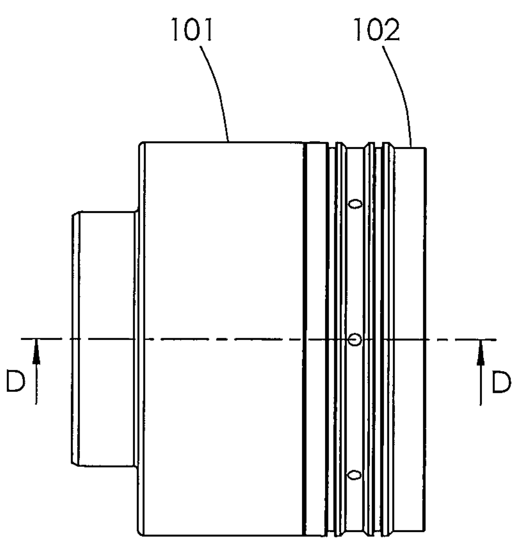
FIG. 12 is a top plan view of the stuffing box and retainer shown in FIG. 10. The plunger packing is not visible.
Figure 13:
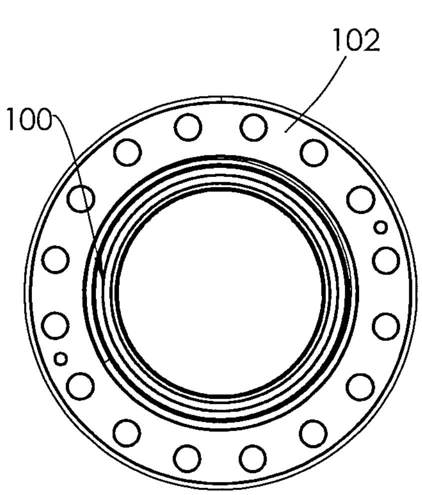
FIG. 13 is a rear elevational view of the stuffing box, retainer, and plunger packing shown in FIG. 10.
Figure 14:
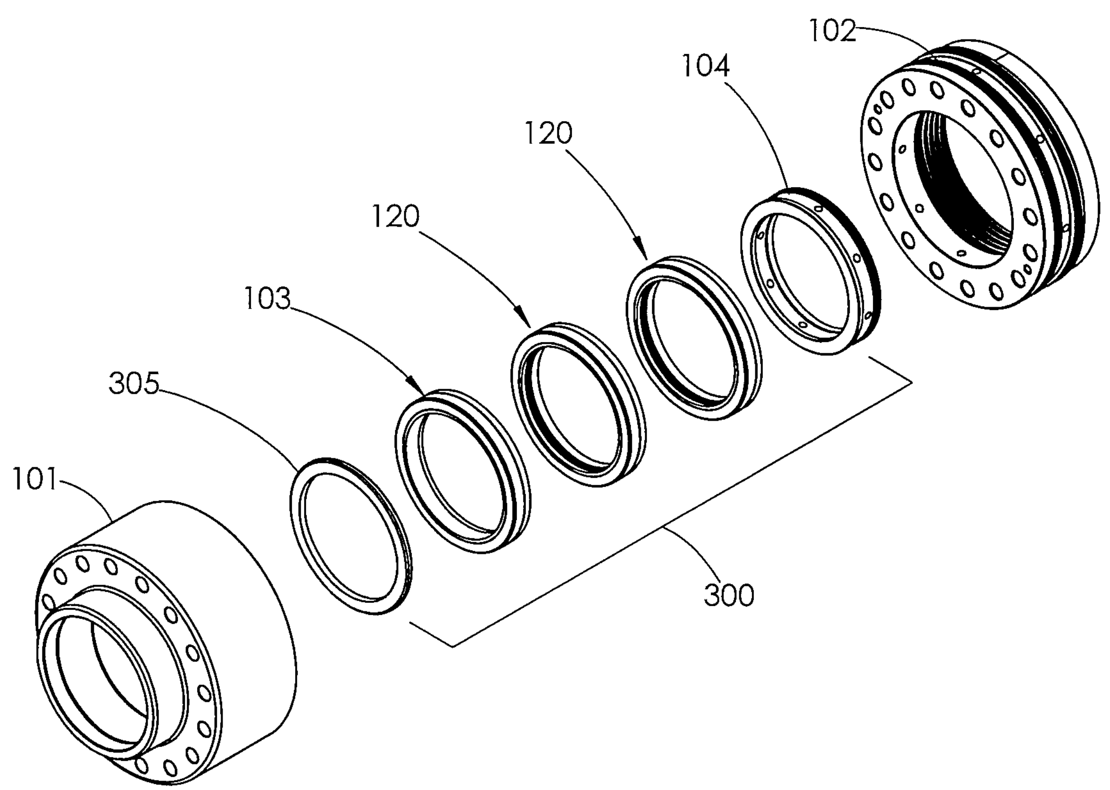
FIG. 14 is a front perspective and exploded view of the stuffing box, retainer, and plunger packing shown in FIG. 10.

With reference to FIGS. 4-32, the present application discloses a plunger packing 100 for use with a fluid end. Such fluid end may be a fluid end 151 (FIGS. 4-6) used in oil and gas operations, such as the fluid end shown in U.S. Pat. No. 10,941,765, issued to Nowell et al., the entire contents of which are incorporated herein by reference. Alternatively, FIGS. 7-9 show a fluid end 154, of the type shown in U.S. patent application Ser. No. 17/884,712, authored by Foster et al., the entire contents of which are incorporated herein by reference, shown with plunger packing embodiment 300 having three hybrid pressure seals 132.

The plunger packing 100 is configured to be installed within a stuffing box 101. The stuffing box 101 is then installed within a fluid bore 152 formed in the fluid end 151 as shown in FIG. 6. Alternatively, the stuffing box 101 may be attached to a side of the fluid end 151 such that the stuffing box 101 aligns with a fluid bore formed within the fluid end 151.

Figure 15:
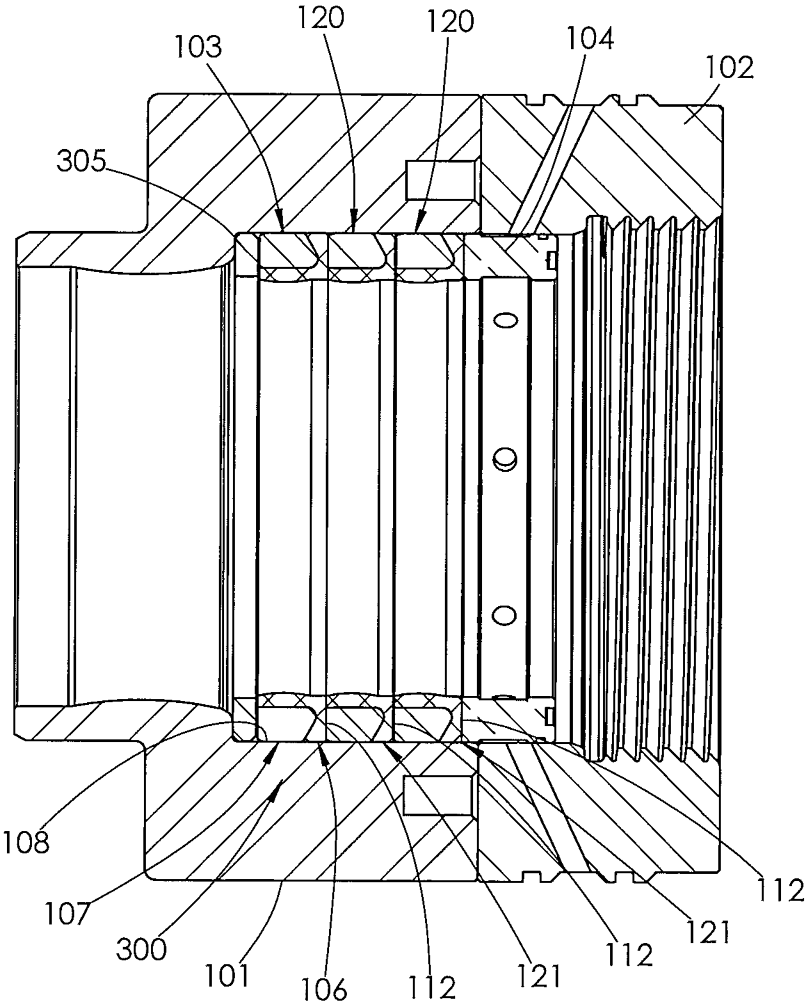
FIG. 15 is cross-sectional view of the stuffing box and retainer shown in FIG. 12, taken along line D-D.
Figure 16:
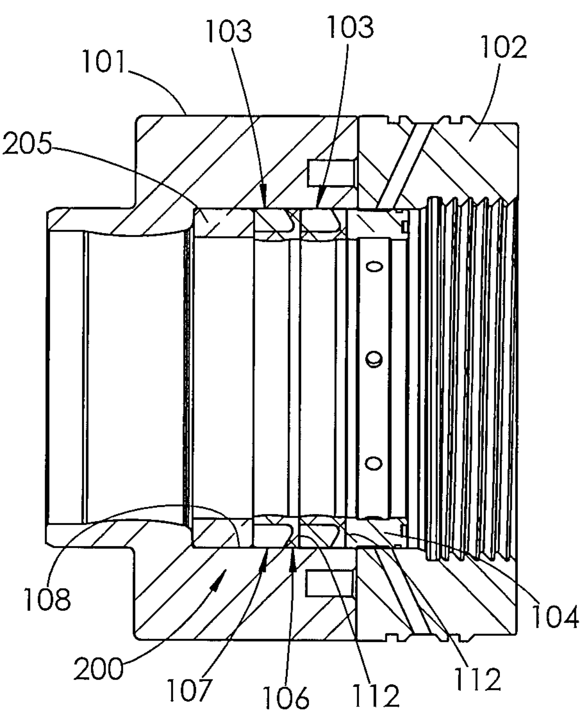
FIG. 16 is the cross-sectional view of the stuffing box and retainer shown in FIG. 15, but another embodiment of the plunger packing is shown installed therein.
Figure 17:
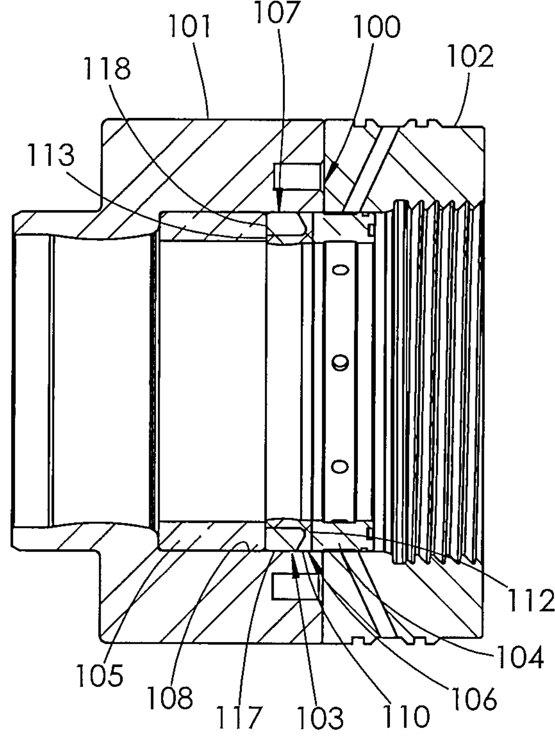
FIG. 17 is a cross-sectional view of the stuffing box and retainer shown in FIG. 15, but another embodiment of the plunger packing is shown installed therein.
Figure 18:
FIG. 18 is a front perspective view of a hybrid pressure seal used with the plunger packing shown in FIGS. 15-17.
Figure 18:
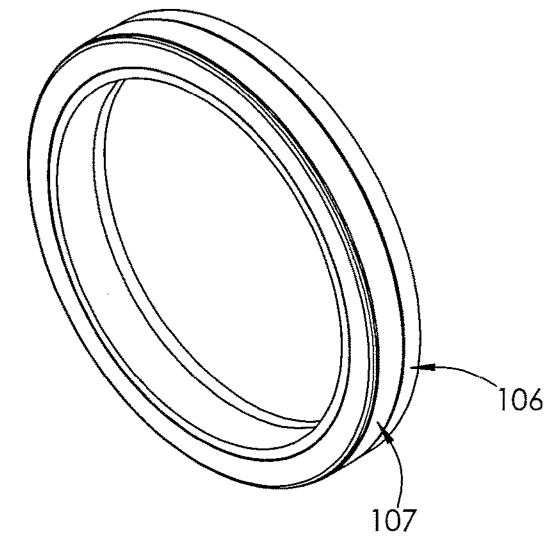
Figure 19:
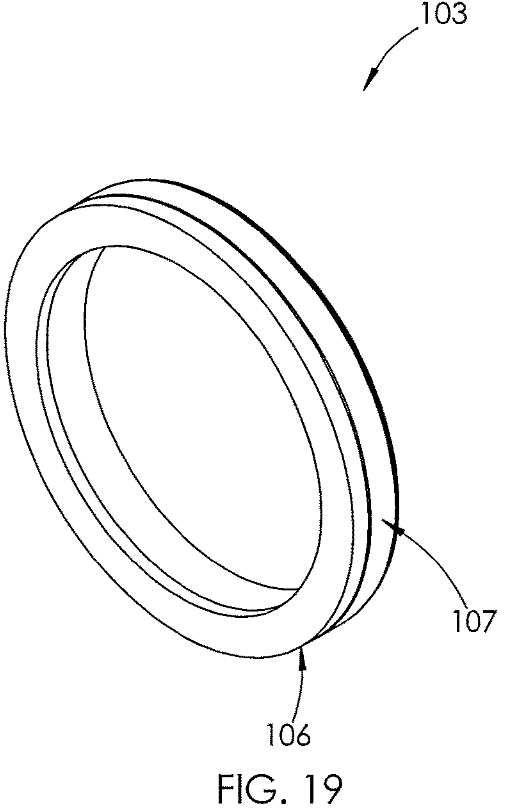
FIG. 19 is a rear perspective view of the hybrid pressure seal shown in FIG. 18.
Figure 20:
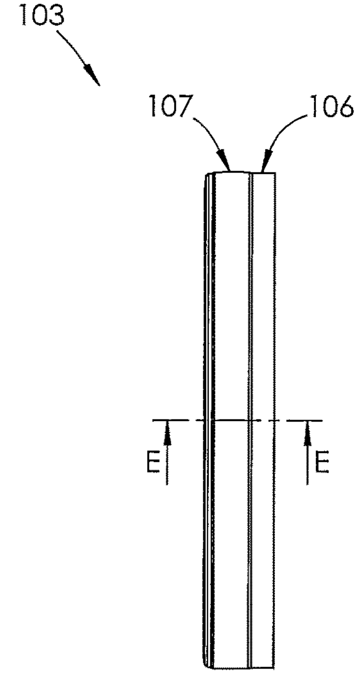
FIG. 20 is a side elevational view of the hybrid pressure seal shown in FIG. 18.

The stuffing box 101 is attached to or secured within the fluid end 151 by a retainer 102. The retainer 102 shown in FIGS. 10-17 is secured to the stuffing box 101 and the fluid end 151 using a plurality of fasteners 153 as shown in FIG. 6. In alternative embodiments, threads may be used to fasten the retainer to the stuffing box or the fluid end. At least a portion of the plunger packing 100 is installed within the retainer 102, as shown in FIGS. 15-17. The plunger packing 100 may be compressed and held within the stuffing box 101 and the retainer 102 by a packing nut 145 that is installed within the retainer 102, as shown in FIG. 6. In alternative embodiments, the plunger packing 100 and packing nut 145 may be installed directly within a fluid bore formed in the fluid end.

In operation, a reciprocating plunger 147 is installed within the plunger packing 100. The plunger packing 100 engages an outer surface of the plunger 147, thereby preventing fluid from leaking around the plunger 147 and out of the fluid end 151.

In contrast to traditional plunger packings, the plunger packing 100 disclosed herein comprises at least one hybrid pressure seal 103 of multi-piece construction positioned between a lantern ring 104 and a junk or spacer ring 105. The hybrid pressure seal 103 comprises a seal carrier or inner seal 106 joined to an outer seal 107. The outer seal 107 may comprise a D-ring seal, a V-ring seal, or the like. A D-ring outer seal 107 is shown in FIGS. 17-27. In operation, the inner seal 106 engages the outer surface of the plunger 147, while the outer seal 107 engages an inner surface 108 of the stuffing box 101 or the inner surface of the fluid bore 152.

The seal carrier or inner seal 106 is made of a harder material than the outer seal 107. This allows the inner seal 106 to be more wear resistant during operation as it engages the reciprocating plunger 147. The outer seal 107 is made of a more elastomeric material than the inner seal 106, thereby allowing the outer seal 107 to create a tight fluid seal with the inner surface 108 of the stuffing box 101 or fluid bore 152 during operation. During operation, the hybrid pressure seal 103 provides improved sealing and stability as compared to traditional packing seals.

The inner seal 106 may be made of a polymer filled with aramid fibers, such as Hydlar Z, CiramP, or the like. The inner seal 106 does not have a layer of fabric covering any portion of the inner seal 106. Rather, the inner seal 106 is a single, integral piece made of a polymer having fibers mixed therein. Alternatively, the inner seal 106 may be made of an ultra-high-molecular-weight polyethylene (UHMWPE) material with a glass filler, a UHMWPE material specifically designed for use in high temperature applications, a UHMWPE infused with 12 to 20% aramid fibers, or Nylatron®).

The outer seal 107 may be made of injection molded Thermoplastic Polyurethane (TPU). In alternative embodiments, the outer seal 107 may be made of Chloroprene Rubber (CR), Fluorine Kautschuk Material (FKM), Nitrile Butadiene (NB), Nitrile Butadiene Rubber (NBR), Hydrogenated Nitrile Butadiene Rubber (HNBR), Carboxylated Nitrile Rubber (XNBR), polytetrafluoroethylene (PTFE), urethane, or a fabric reinforced rubber. In further alternative embodiments, other elastomeric materials known in the art and not specifically listed herein may be used to make the outer seal 107.

While multiple embodiments of a hybrid pressure seal are shown herein, the general principle is the same in each. A homogenous ring made of durable material forms the inner seal. The inner seal has a place to seat a homogenous ring made of more elastomeric material, which is the outer seal. In the discussion of the various embodiments, below, various designs are utilized.

Figure 44:
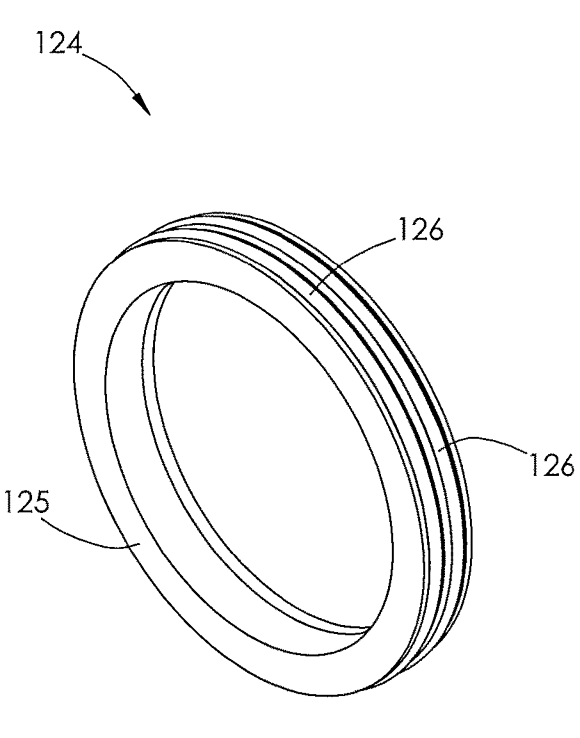
FIG. 44 is a front perspective view of another embodiment of a hybrid pressure seal used with the plunger packing shown in FIGS. 15-17.
Figure 45:
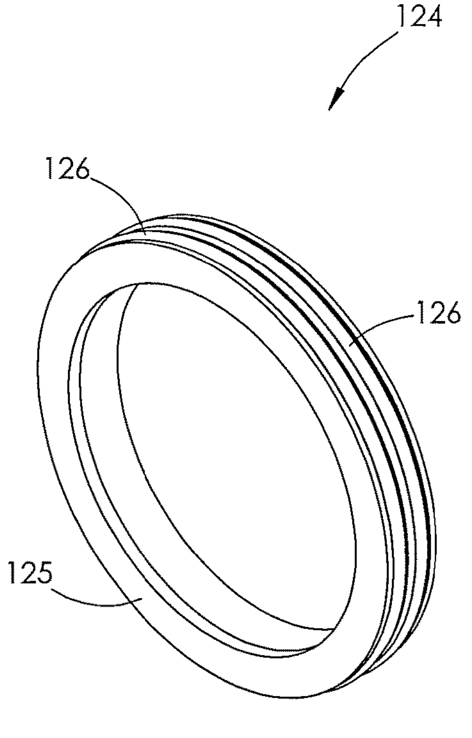
FIG. 45 is a rear perspective view of the hybrid pressure seal shown in FIG. 44.
Figure 46:
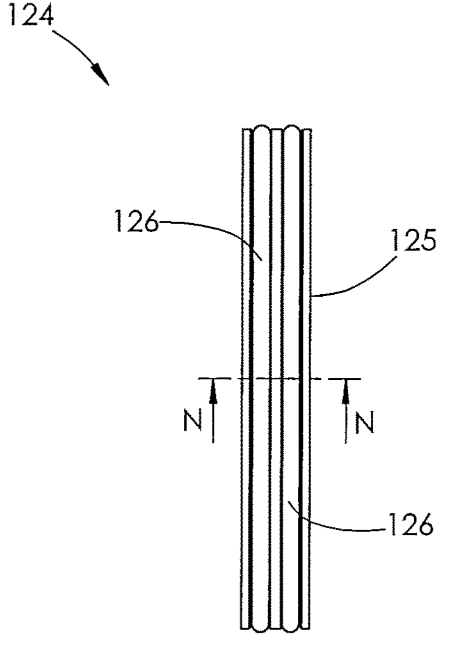
FIG. 46 is a side elevational view of the hybrid pressure seal shown in FIG. 44.
Figure 47:
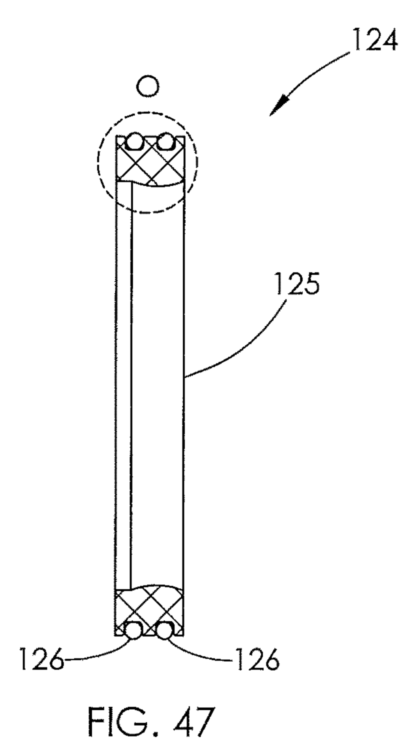
FIG. 47 is a cross-sectional view of the hybrid pressure seal shown in FIG. 46, taken along line N-N.
Figure 48:
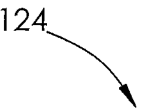
FIG. 48 is an enlarged view of area O, shown in FIG. 47.
Figure 48:
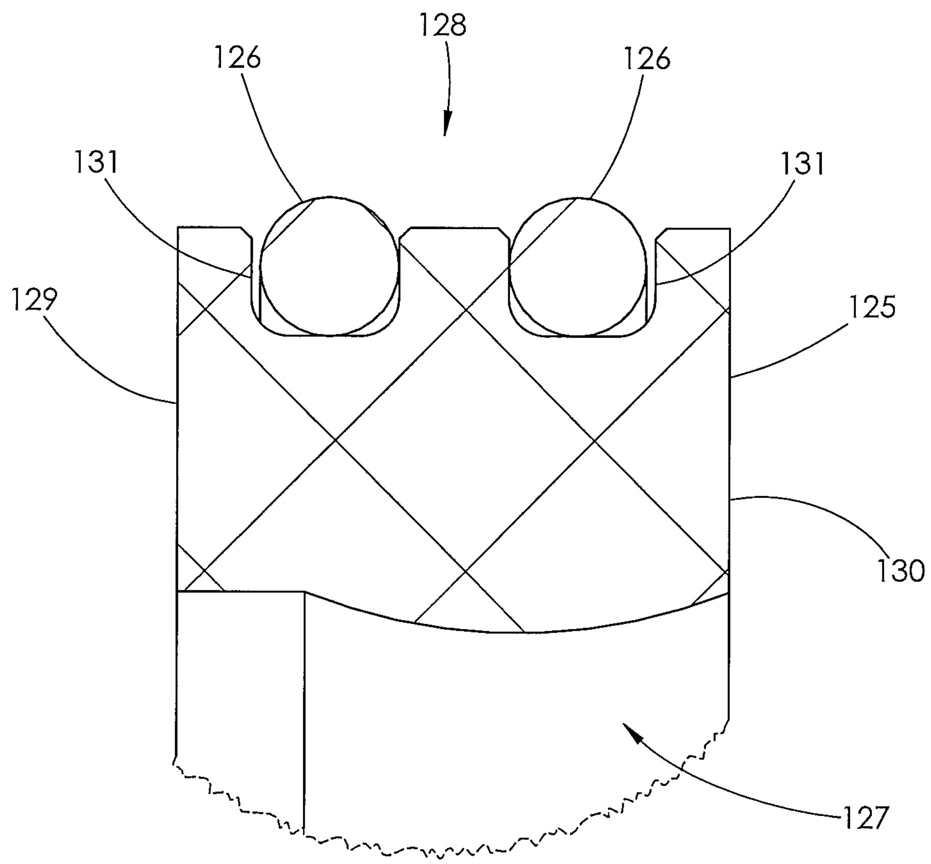
Figure 49:
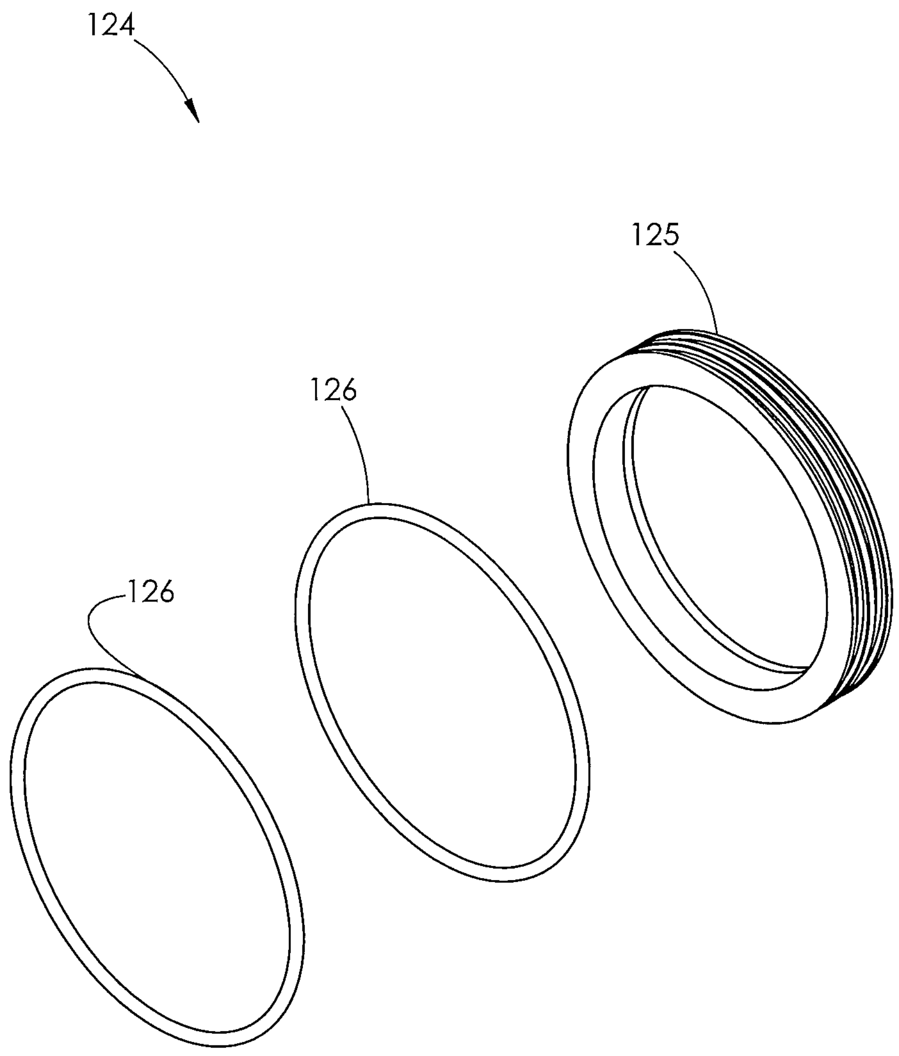
FIG. 49 is a front perspective and exploded view of the hybrid pressure seal shown in FIG. 44.
Figure 54:
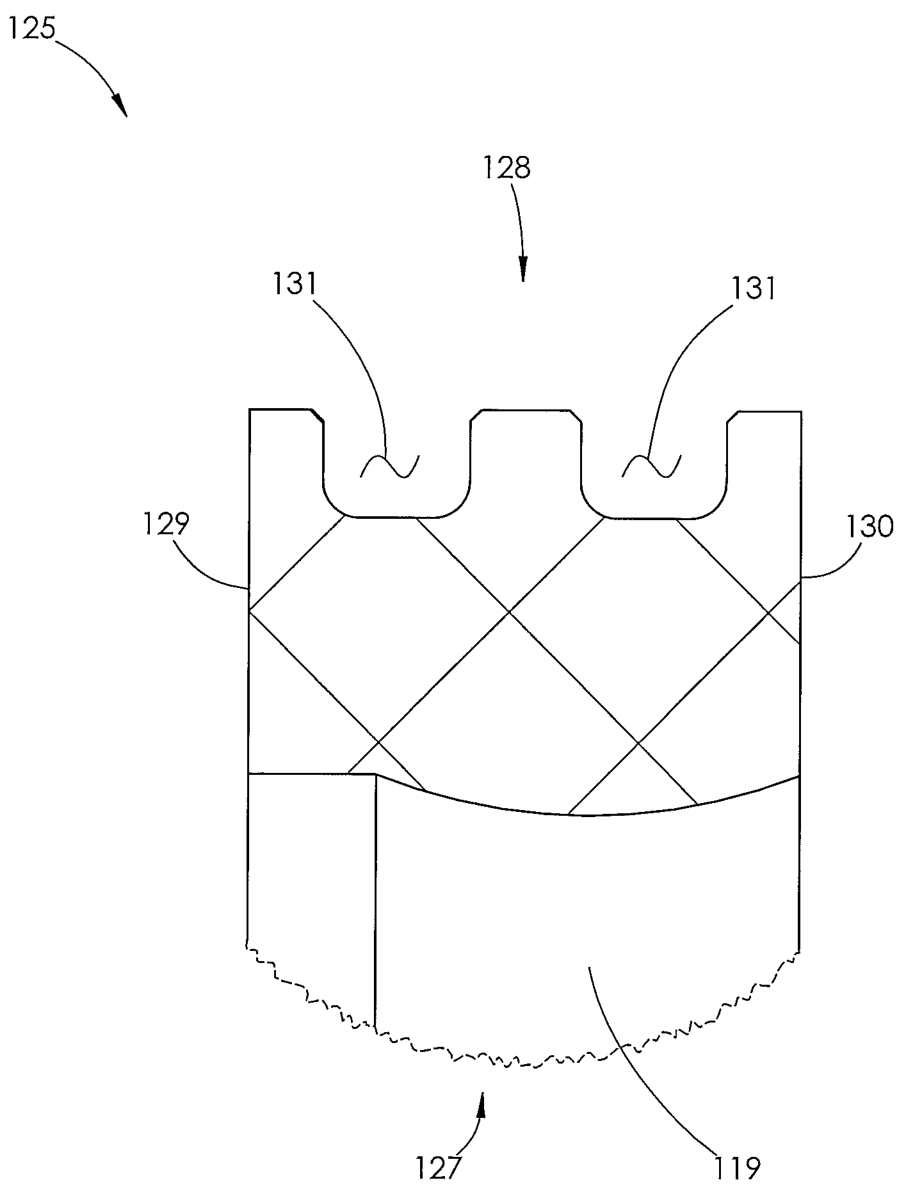
FIG. 54 is an enlarged view of area Q, shown in FIG. 53.
Figure 55:
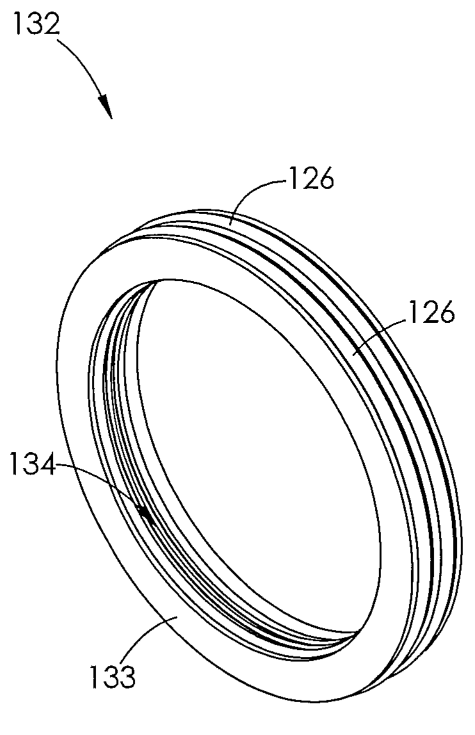
FIG. 55 is a front perspective view of another embodiment of a hybrid pressure seal used with the plunger packing shown in FIGS. 15-17.
Figure 56:
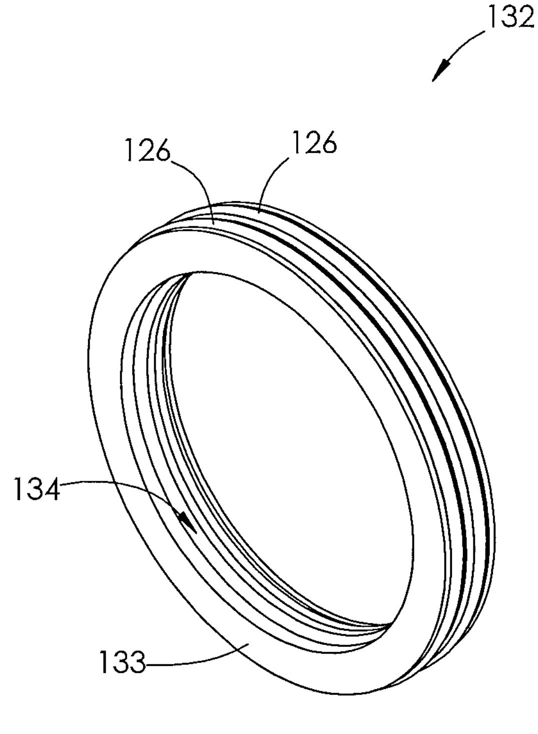
FIG. 56 is a rear perspective view of the hybrid pressure seal shown in FIG. 55.
Figure 57:
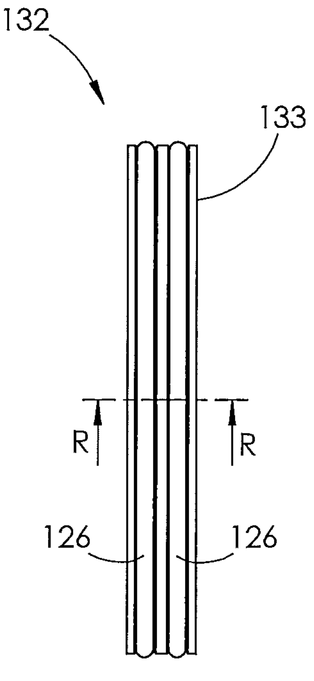
FIG. 57 is a side elevational view of the hybrid pressure seal shown in FIG. 55.
Figure 58:
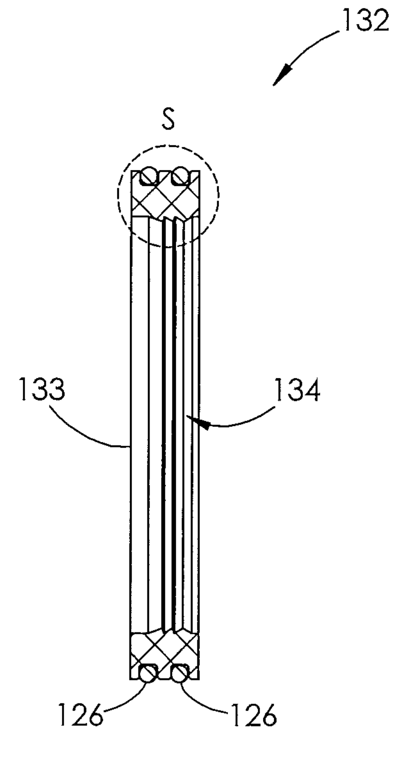
FIG. 58 is a cross-sectional view of the hybrid pressure seal shown in FIG. 57, taken along line R-R.
Figure 59:
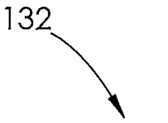
FIG. 59 is an enlarged view of area S, shown in FIG. 58.
Figure 59:
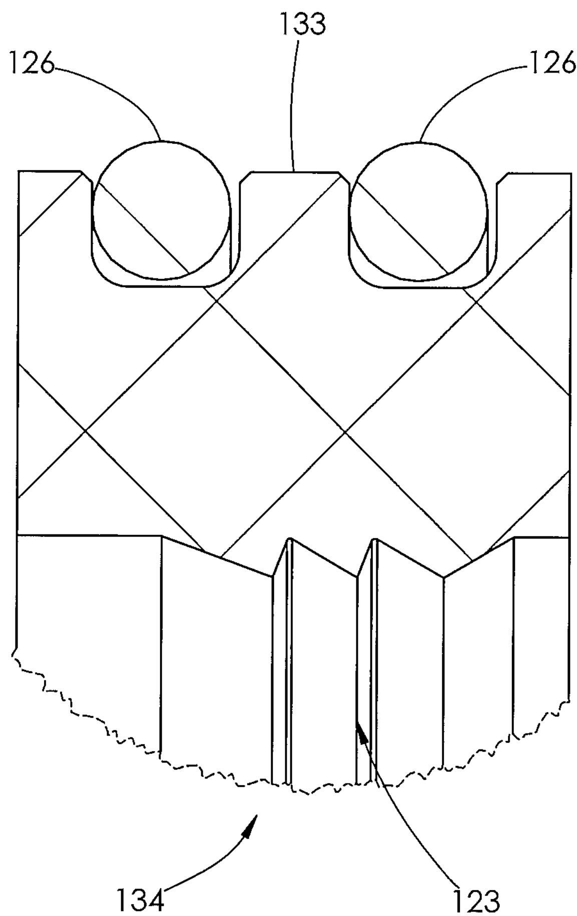

For example, the outer seal may be a D-Ring (FIG. 18) or an O-Ring (FIG. 44). The inner seal may have a "D" shaped surface (FIG. 22), or "V"-shaped protrusions or similar (FIG. 37) on its inner surface. A front-most inner seal may be separate (FIG. 14) or integrally formed with (FIGS. 77-81) a lantern ring. One hybrid seal may be used (FIG. 17) or multiple hybrid seals may be used in series (FIG. 16).

Figure 64:
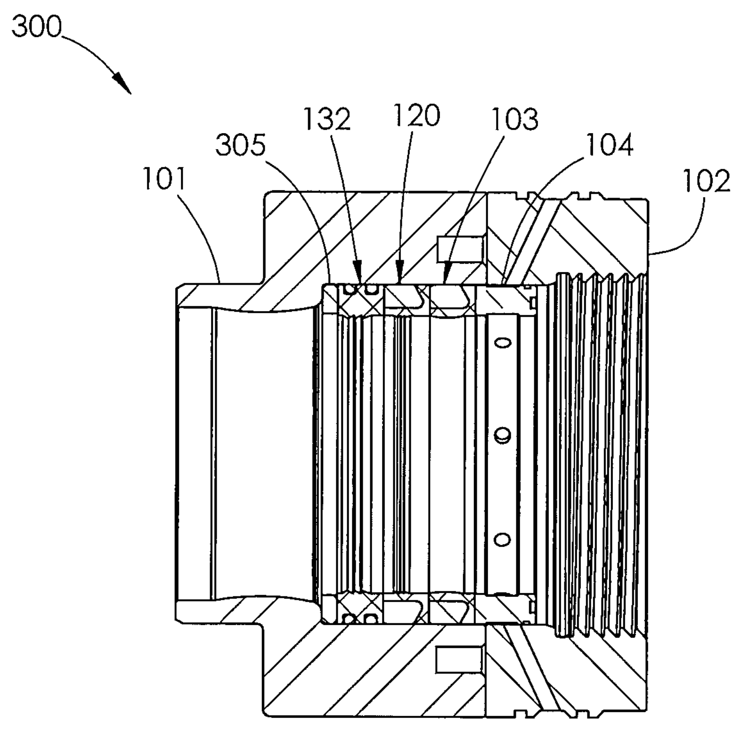
FIG. 64 is the cross-sectional view of a stuffing box and retainer with three hybrid pressure seals within.

In embodiments with multiple hybrid seals, they may all be the same construction (FIG. 62) or different seals may be used together (FIG. 64). Adjacent seals and rings may abut one another without interlocking (FIG. 62) or may have complementary interlocking features (FIGS. 139, 140). The stuffing box with the seals may be used in a fluid end 151, 154 with a perpendicular junction (FIG. 101) or an in-line geometry (FIG. 102).

The following figures demonstrate the various configurations and features which may be used alone or in conjunction with other features.

Figure 22:
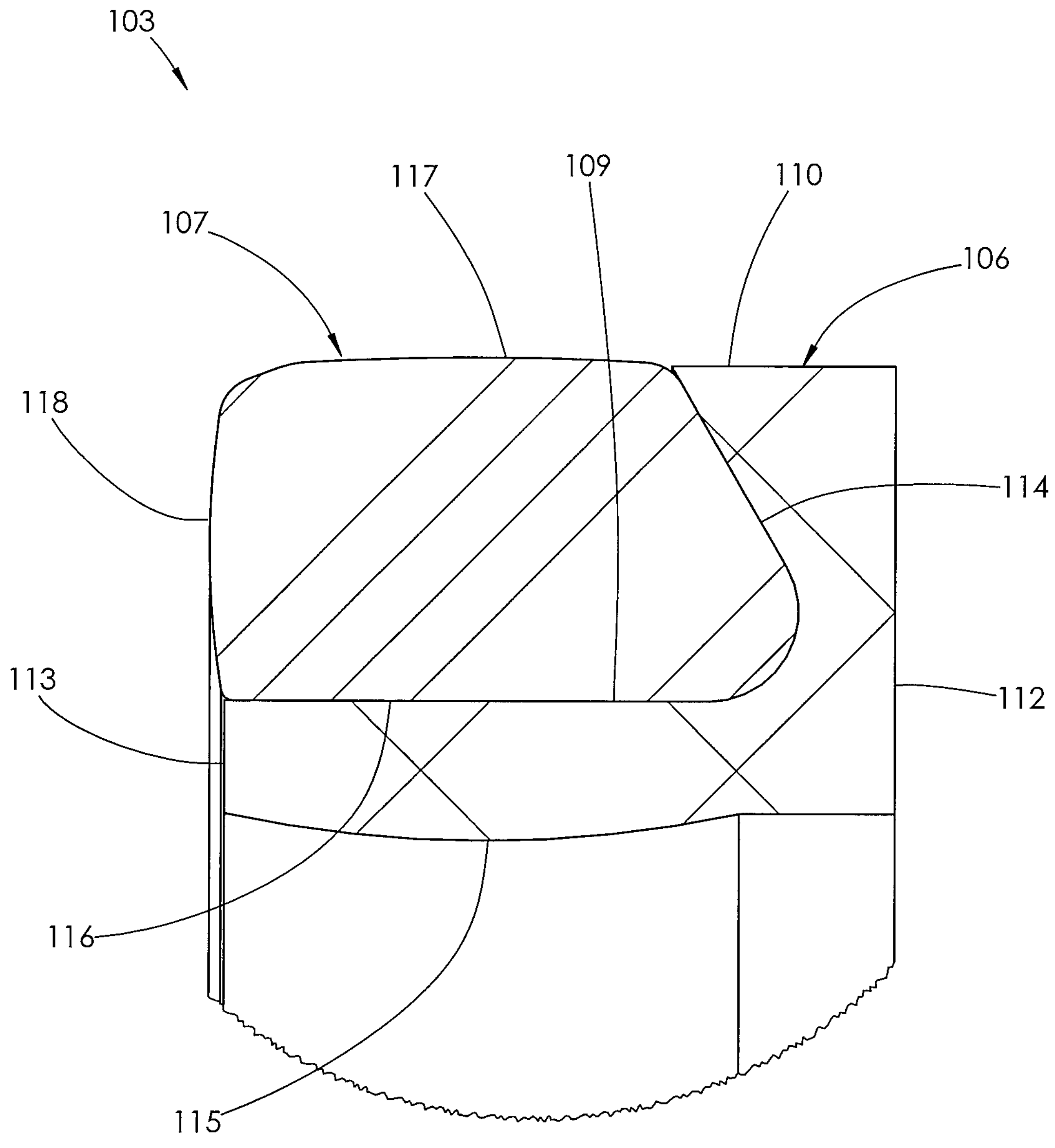
FIG. 22 is an enlarged view of area F, shown in FIG. 21.
Figure 23:
FIG. 23 is a front perspective and exploded view of the hybrid pressure seal shown in FIG. 18.
Figure 23:
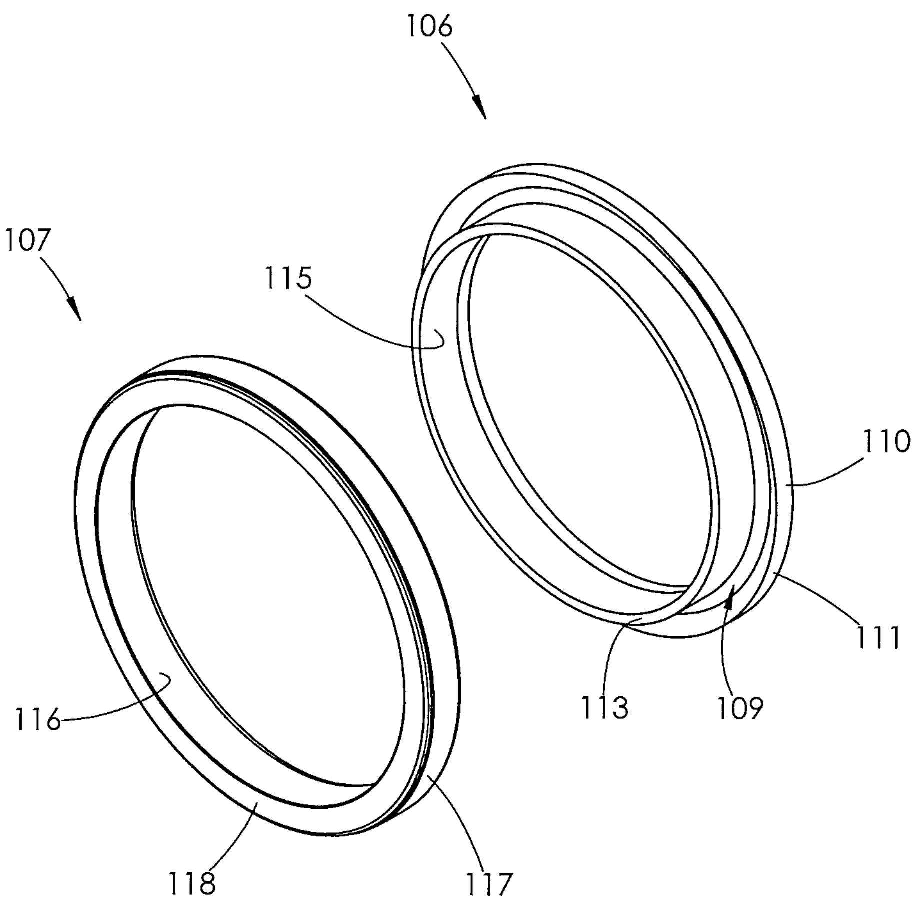
Figure 24:
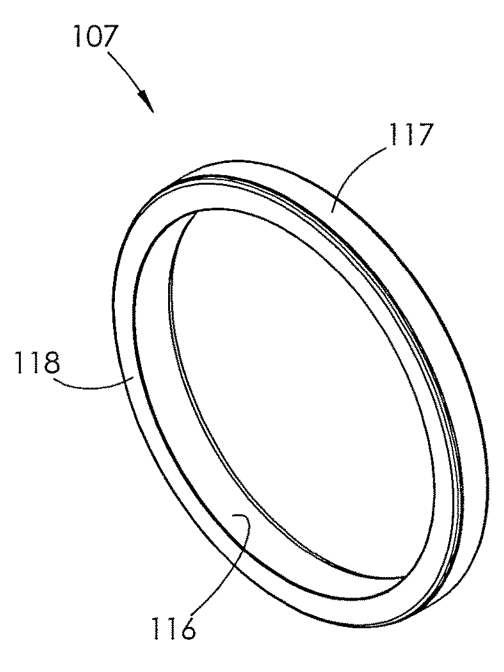
FIG. 24 is a front perspective view of the outer seal used with the hybrid pressure seal shown in FIG. 18.
Figure 25:
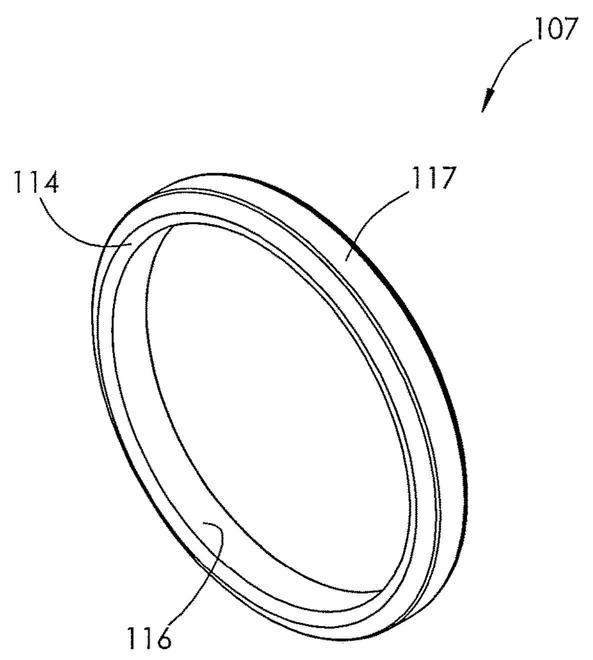
FIG. 25 is a rear perspective view of the outer seal shown in FIG. 24.
Figure 26:
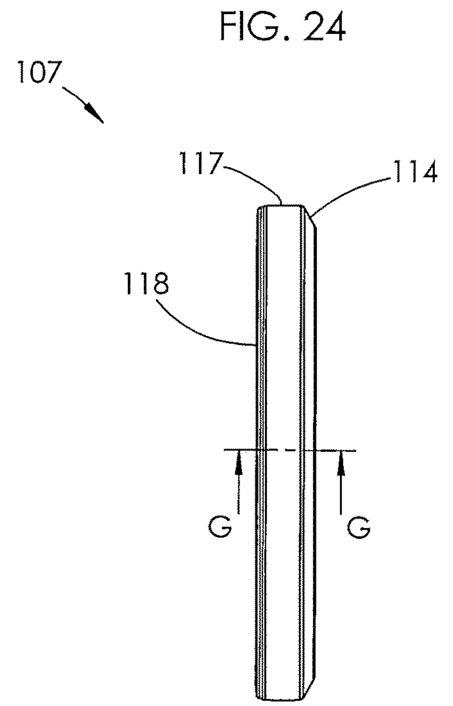
FIG. 26 is a side elevational view of the outer seal shown in FIG. 24.
Figure 27:
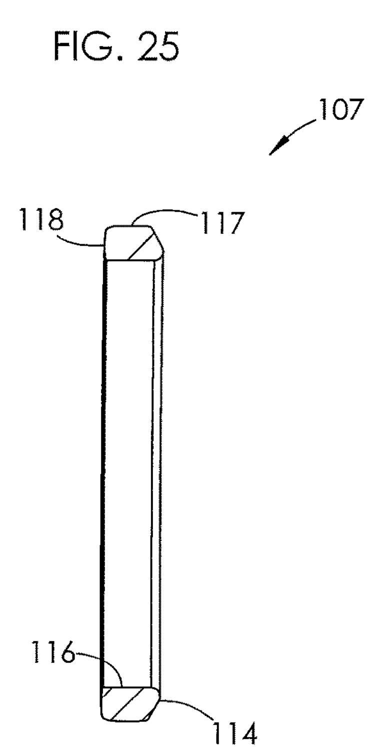
FIG. 27 is a cross-sectional view of the outer seal shown in FIG. 26, taken along line G-G.
Figure 28:
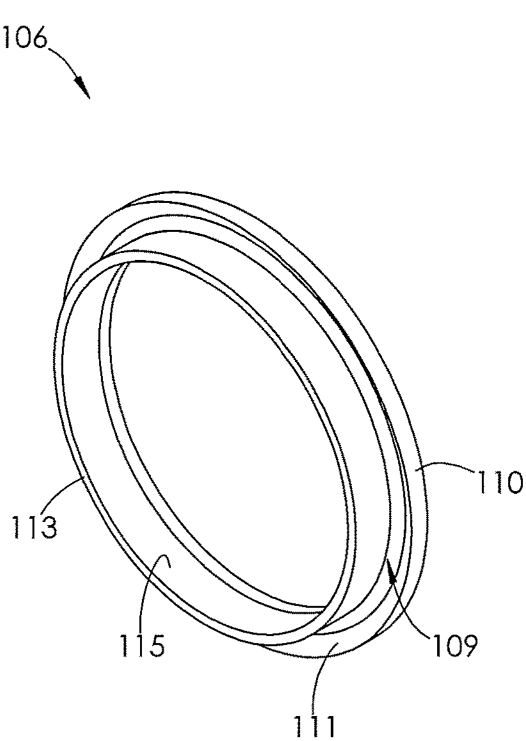
FIG. 28 is a rear perspective view of the inner seal or seal carrier used with the hybrid pressure seal shown in FIG. 18.
Figure 28:
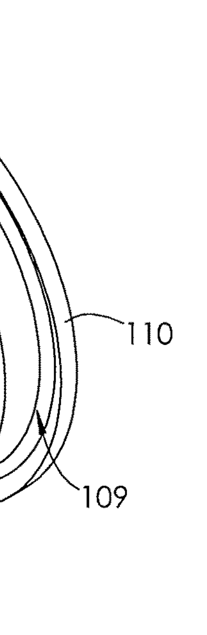
Figure 29:
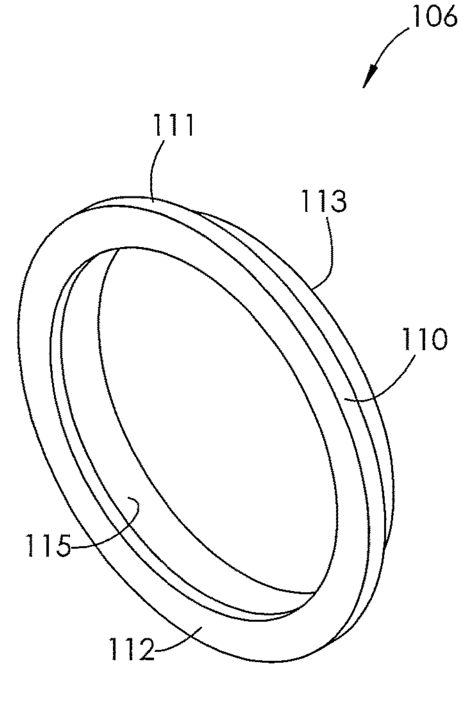
FIG. 29 is a front perspective view of the inner seal shown in FIG. 28.
Figure 30:
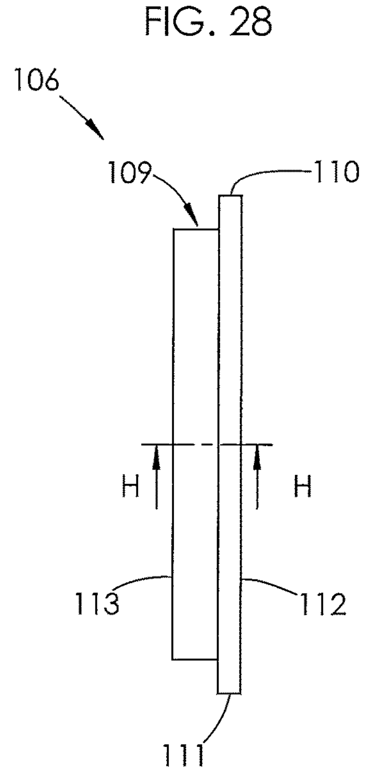
FIG. 30 is a side elevational view of the inner seal shown in FIG. 28.
Figure 31:
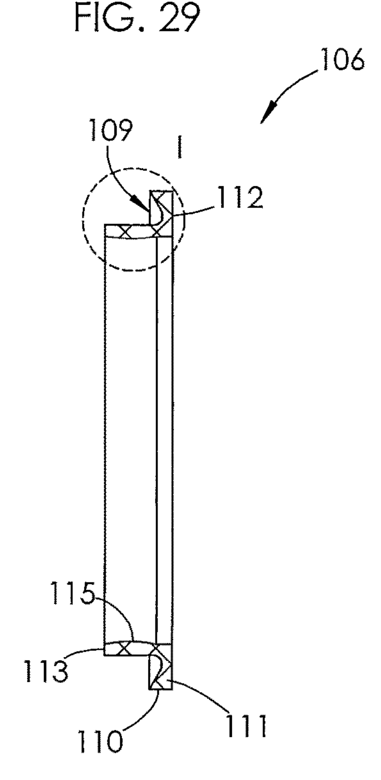
FIG. 31 is a cross-sectional view of the inner seal shown in FIG. 30, taken along line H-H.
Figure 32:
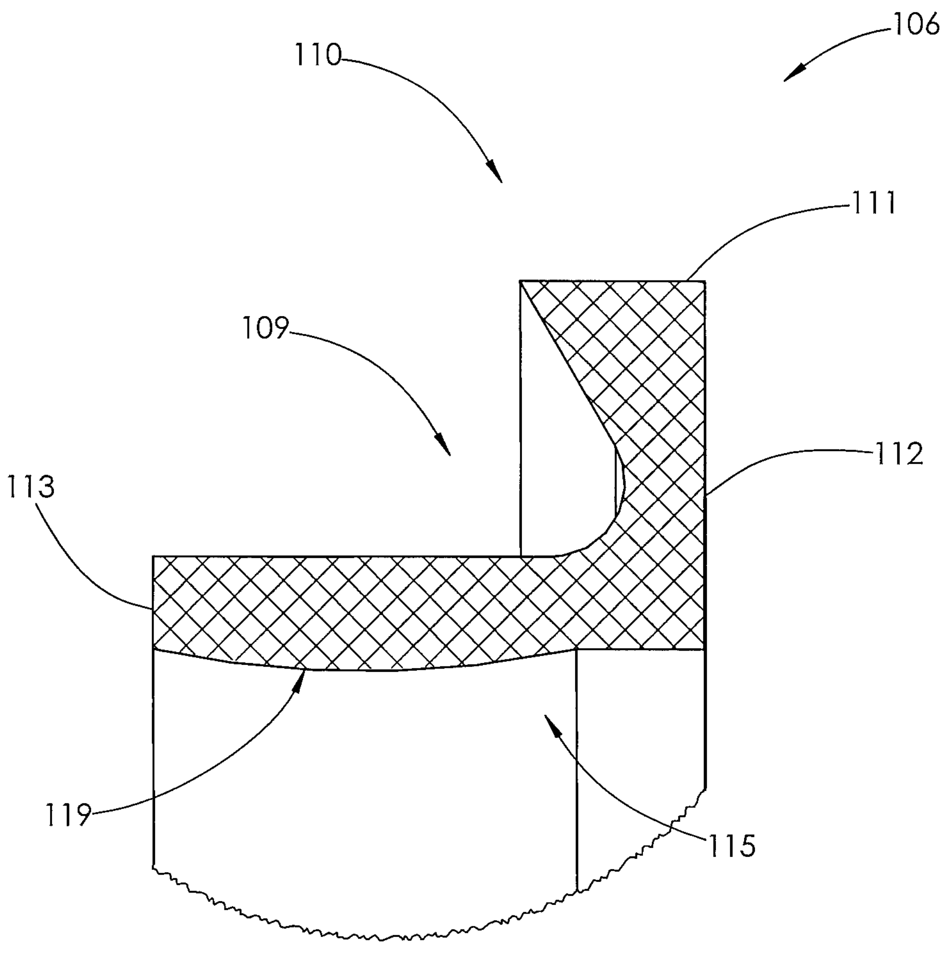
FIG. 32 is an enlarged view of area I, shown in FIG. 31.
Figure 33:
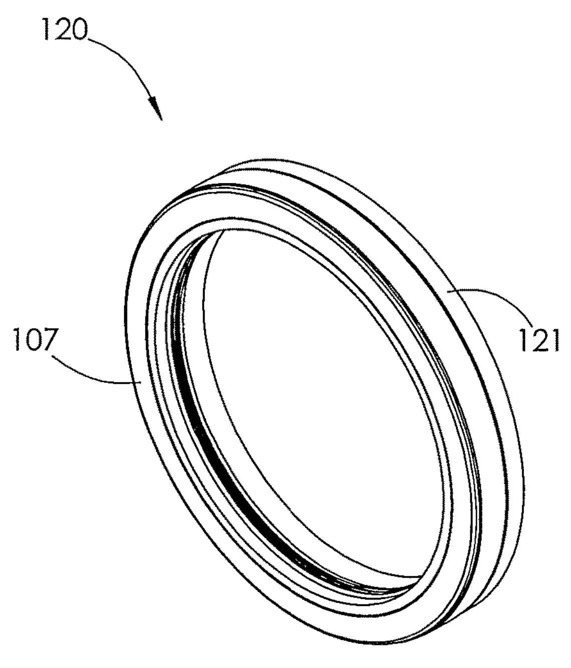
FIG. 33 is a front perspective view of another embodiment of a hybrid pressure seal used with the plunger packing shown in FIGS. 15-17.
Figure 34:
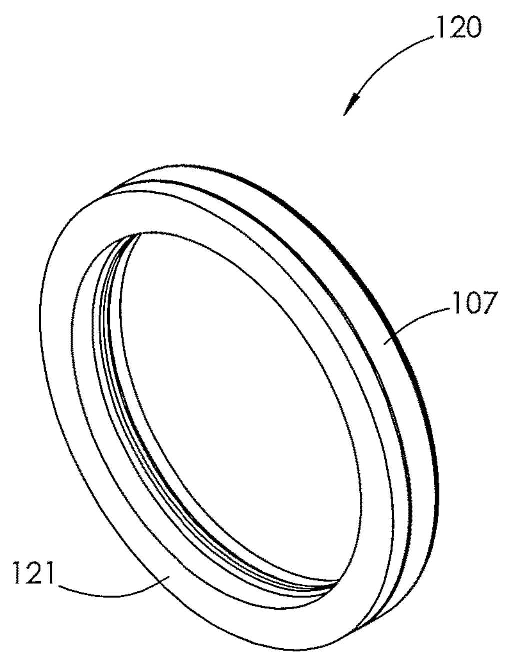
FIG. 34 is a rear perspective view of the hybrid pressure seal shown in FIG. 33.
Figure 35:
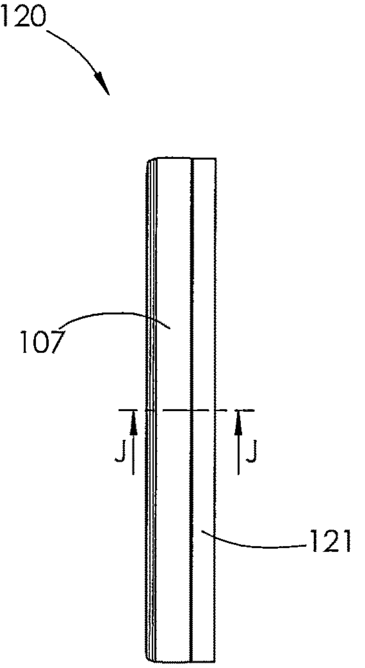
FIG. 35 is a side elevational view of the hybrid pressure seal shown in FIG. 33.
Figure 36:
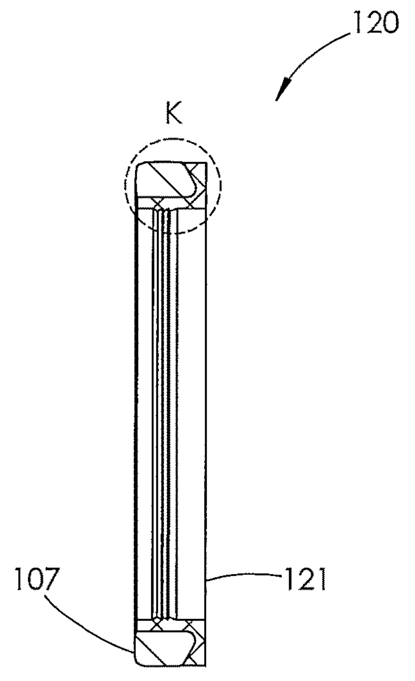
FIG. 36 is a cross-sectional view of the hybrid pressure seal shown in FIG. 35, taken along line J-J.

Turning to FIGS. 28-32, the inner seal 106 has a ring shape with an annular cutout 109 formed in its outer surface 110. The cutout 109 forms a flange 111 at a front surface 112 of inner seal 106 that comprises the remaining outer surface 110. The cutout 109 extends between the flange 111 and a rear surface 113 of the inner seal 106 such that the front surface 112 of the inner seal 106 has a greater outer diameter than the rear surface 113 of the inner seal 106. The cutout 109 is sized and shaped to correspond to a cross-sectional shape of a front surface 114 of the outer seal 107, as shown in FIG. 22. The front and rear surfaces 112 and 113 of the inner seal 106 are joined by an inner surface 115. In this embodiment of the hybrid pressure seal 103 the inner surface 115 has a D-ring shape 119. During operation, the inner surface 115 engages the outer surface of the plunger 147.

Turning to FIGS. 24-27, the outer seal 107 has a ring-shape and comprises inner and outer surfaces 116 and 117 joined by front and rear surfaces 114 and 118. The front surface 114 is shaped to conform to the shape of the cutout 109, as shown in FIG. 22.

Figure 21:
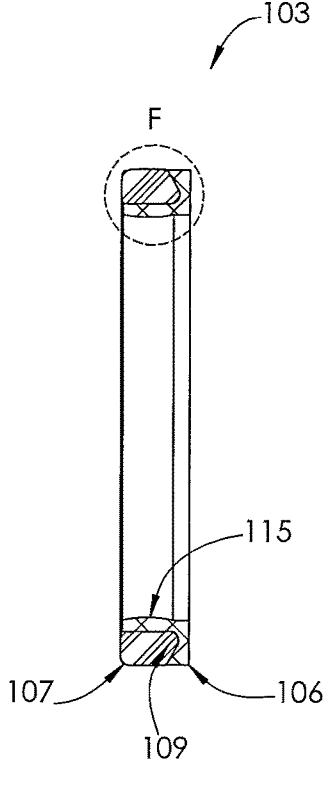
FIG. 21 is a cross-sectional view of the hybrid pressure seal shown in FIG. 11, taken along line E-E.

Turning back to FIGS. 18-23, the hybrid pressure seal 103 is assembled by installing the outer seal 107 within the cutout 109 formed in the inner seal 106. When installed therein, the outer seal 107 surrounds at least a portion of the inner surface 115 of the inner seal 106, as shown in FIG. 21. The outer seal 107 is sized to extend slightly past the outer and rear surfaces 110 and 113 of the inner seal 106, as shown in FIG. 22.

The inner and outer seals 106 and 107 may be manufactured individually and assembled. Alternatively, the seal carrier or inner seal 106 may be machined and the outer seal 107 over-molded or bonded directly to the seal carrier 106.

When the hybrid pressure seal 103 is installed within the stuffing box 101, the outer surface 117 of the outer seal 107 engages the inner surface 108 of the stuffing box 101. Likewise, the outer surface 110 of the inner seal 106 faces and may also engage the inner surface 108 of the stuffing box 101. The rear surface 118 of the outer seal 107 engages the junk ring 105, as shown in FIG. 17, or another hybrid pressure seal 103, 120 as shown in FIGS. 15 and 16. Likewise, the rear surface 113 of the inner seal 106 faces or may engage the junk ring 105 or another hybrid pressure seal 103, 120, The front surface 112 of the inner seal 106 engages the lantern ring 104 or another hybrid pressure seal 103, 120 as shown in FIGS. 15-17. No portion of the outer seal 107 engages any portion of the plunger 147.

Figure 37:
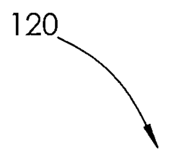
FIG. 37 is an enlarged view of area K, shown in FIG. 36.
Figure 37:
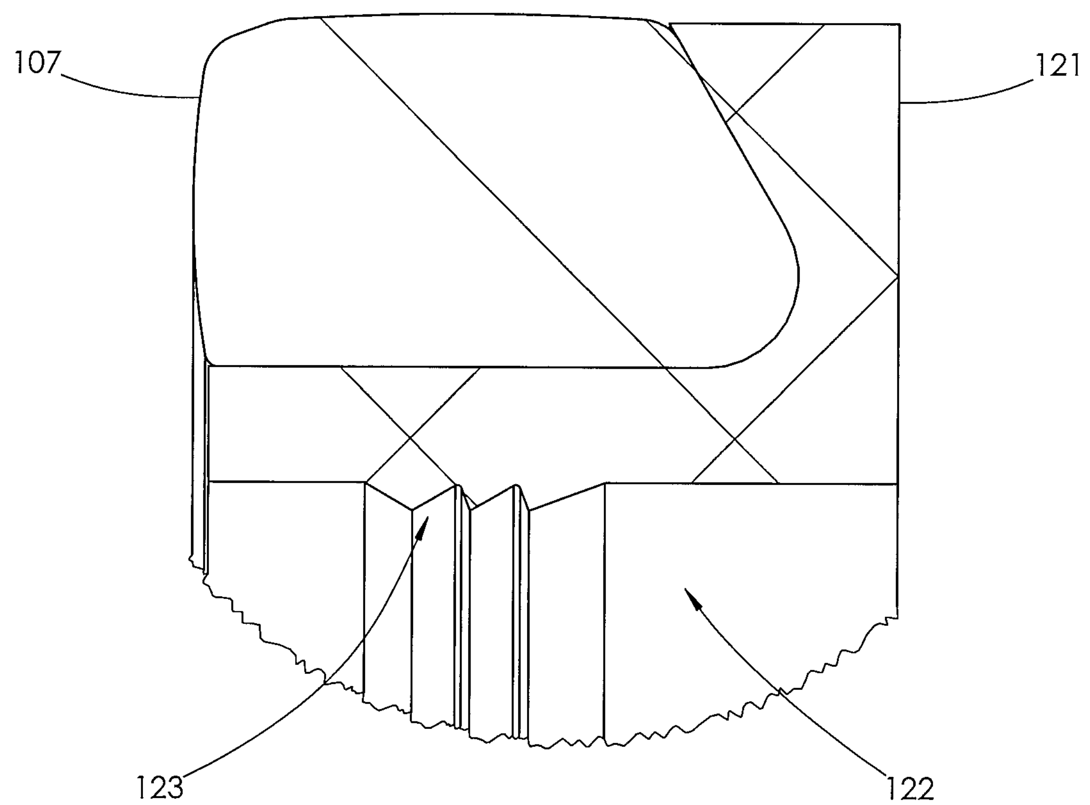
Figure 38:
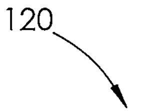
FIG. 38 is a front perspective and exploded view of the hybrid pressure seal shown in FIG. 33.
Figure 38:
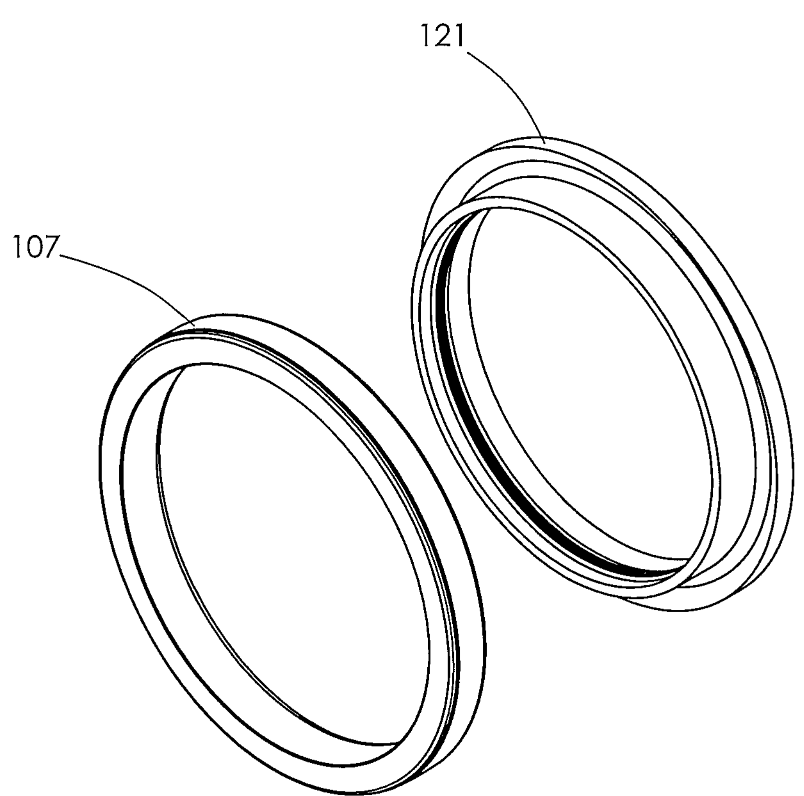
Figure 39:
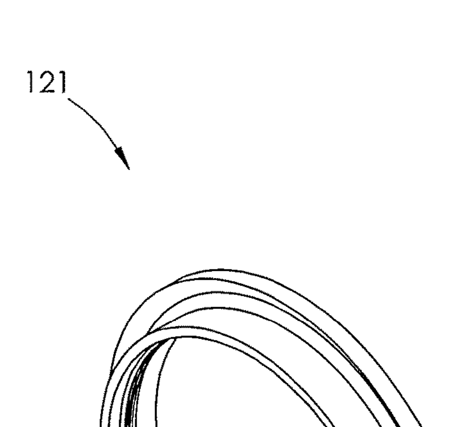
FIG. 39 is a front perspective view of the inner seal used with the hybrid pressure seal shown in FIG. 33.
Figure 39:
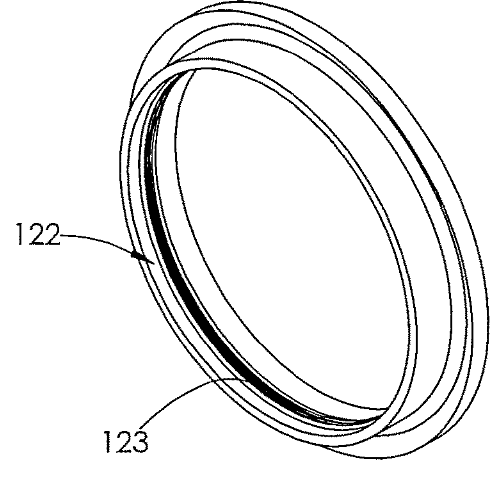
Figure 39:
Figure 40:
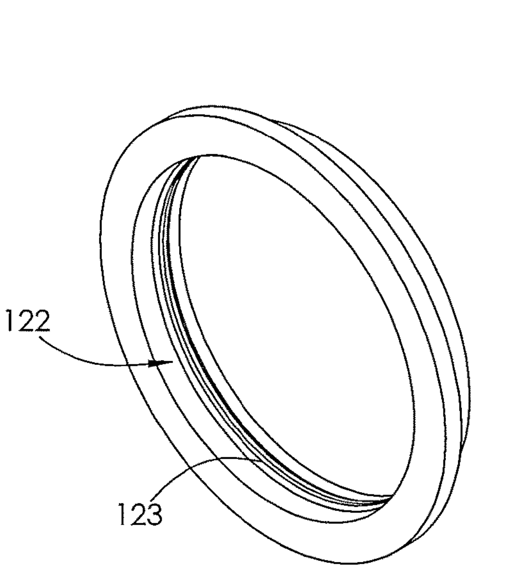
FIG. 40 is a rear perspective view of the inner seal shown in FIG. 33.
Figure 41:
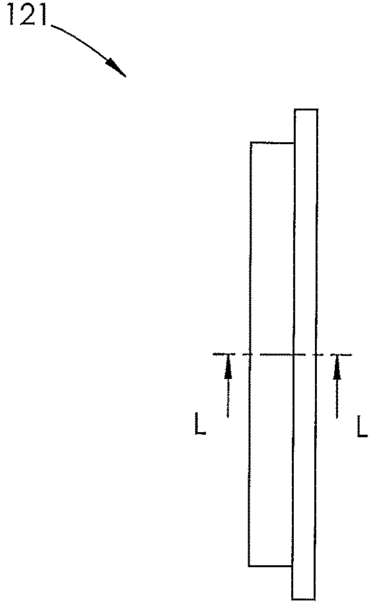
FIG. 41 is a side elevational view of the inner seal shown in FIG. 33.
Figure 42:
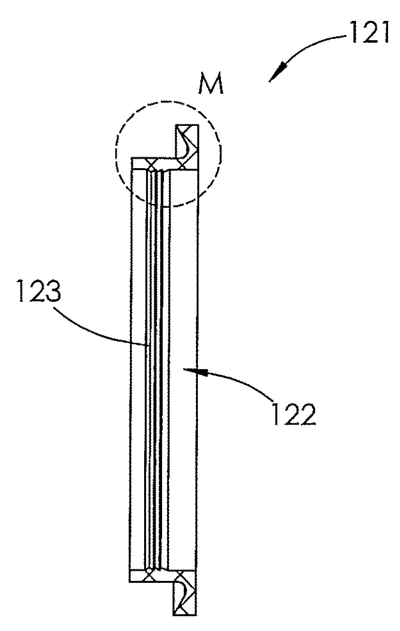
FIG. 42 is a cross-sectional view of the inner seal shown in FIG. 41, taken along line L-L.
Figure 43:
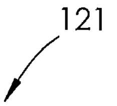
FIG. 43 is an enlarged view of area M, shown in FIG. 42.
Figure 43:
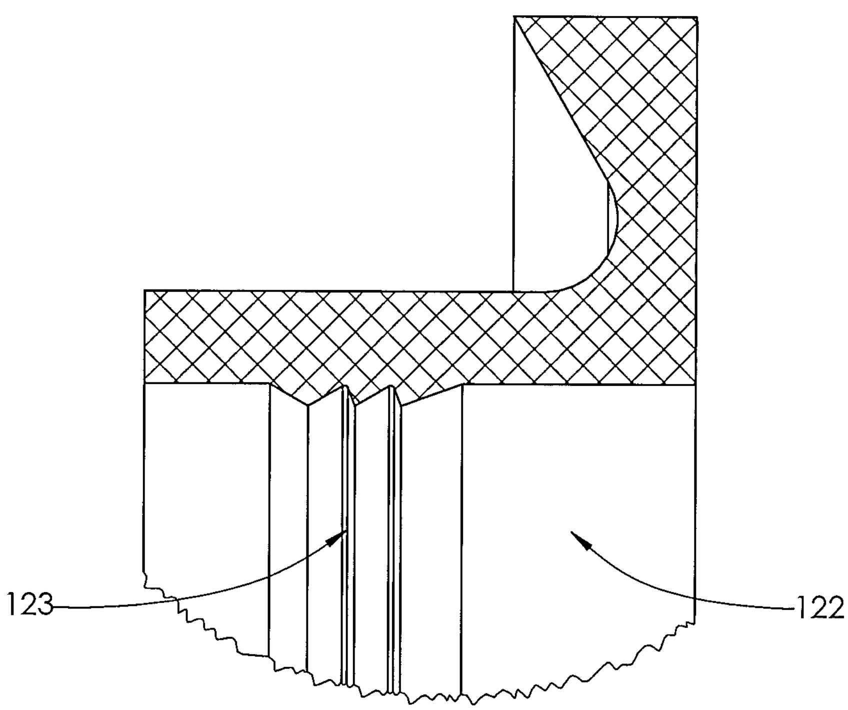

Turning to FIGS. 33-43, another embodiment of a hybrid pressure seal 120 is shown. The hybrid pressure seal 120 comprises another embodiment of an inner seal 121 with an inner surface 122 having V-shaped extrusions 123, as shown in FIG. 37. Other shapes not specifically shown in the figures may also be used to create additional embodiments of hybrid pressure seals. The plunger packing 100 comprises one hybrid pressure seal 103 as shown in FIG. 17. The hybrid pressure seal 103 may be of any the embodiments disclosed herein such as hybrid pressure seals 120, 124, 132, 135, 148, 149, 150.

Referring now to FIGS. 44-54, another embodiment of a hybrid pressure seal 124 is shown. The hybrid pressure seal 124 comprises an inner seal 125 and a plurality of outer seals 126. The inner seal 125 is generally ring shaped and comprises an inner surface 127, an outer surface 128, a front surface 129, and a rear surface 130. The inner surface 127 comprises the same D-ring shape 119 as the inner surface 115 of the inner seal 106. The outer surface 128 comprises a plurality of grooves 131 sized to accept the outer seals 126. The outer seals 126 each comprise an O-ring.

The inner seal 125 is harder than the outer seal 126 as with the earlier described embodiments of hybrid pressure seals 103, 120. The inner and outer seals 125, 126 may also be made of the same materials listed for the earlier described embodiments of inner seal 106, 121, 125, 133, 136 or outer seal 107, 126.

Assembly of the hybrid pressure seal 124 only requires the insertion of the outer seals 126 in the grooves 131 of the inner seal 125. The hybrid pressure seal 124 may be used interchangeably with other embodiments of hybrid pressure seals 103, 120, 132 in any inner position and hybrid pressure seals 103, 120, 132, 135, 148, 149, 158 in the outer position in any of the embodiments of the plunger packing 100, 200, 300 described herein.

In operation the outer seal 126 assists in energizing the inner seal 125 against the plunger 147 by providing a radial compressive force. The outer seal 126 also seals against the inner surface 108 of the stuffing box 101.

Referring now to FIGS. 55-59, another embodiment of a hybrid pressure seal 132 is shown. The hybrid pressure seal 132 comprises an inner seal 133 with an inner surface 134 comprising the same V-shaped extrusions 123 as the inner surface 122 of inner seal 121. All other elements of the hybrid pressure seal 132 are the same as that of hybrid pressure seal 124.

Assembly of the hybrid pressure seal 132 only requires the insertion of the outer seal 126 in the grooves 131 of the inner seal 133, the same as hybrid pressure seal 124. The hybrid pressure seal 132 may be used interchangeably with other embodiments of hybrid pressure seals 103, 120, 124 in any inner position and hybrid pressure seals 103, 120, 124, 135, 148, 149, 158 in the outer position in any of the embodiments of the plunger packing 100, 200, 300 described herein.

In operation the outer seal 126 assists in energizing the inner seal 133 against the plunger 147 by providing a radial compressive force. The outer seal 126 also seals against the inner surface 108 of the stuffing box 101.

In alternative embodiments, the seal 124 or 132 may be configured to utilize a single outer seal 126 or more than two outer seals 126. If only a single outer seal 126 is used, the seal 126 may be larger in size than the seal 126 shown in the figures.

Figure 60:
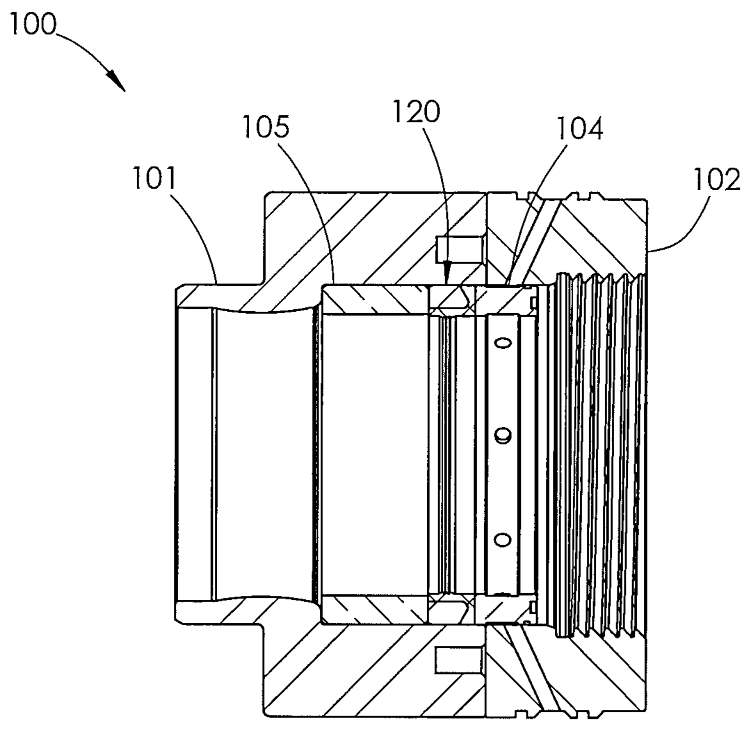
FIG. 60 is the cross-sectional view of a stuffing box and retainer with a single hybrid pressure seal within.
Figure 61:
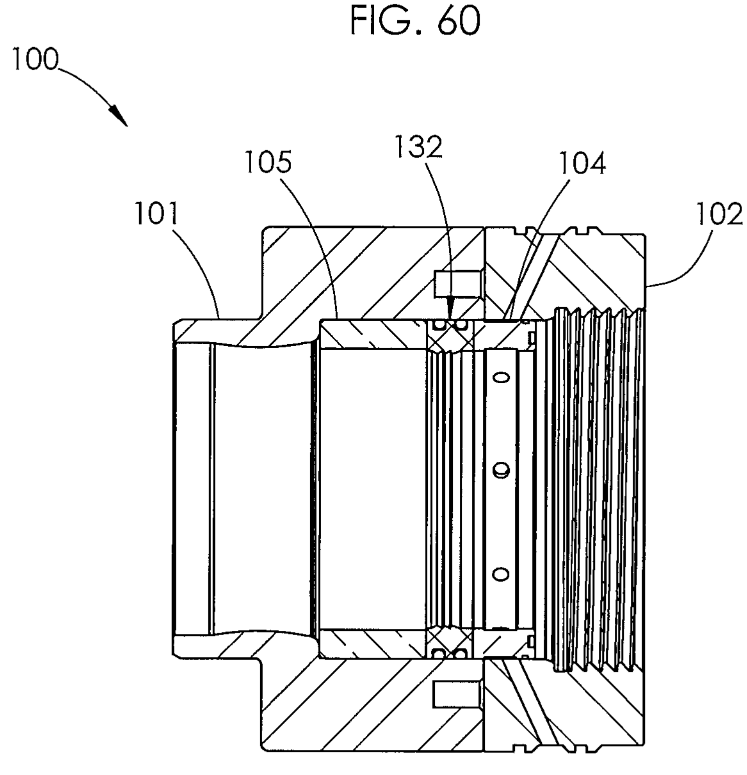
FIG. 61 is the cross-sectional view of a stuffing box and retainer with a single hybrid pressure seal within, however, the seal of FIG. 61 differs from that of FIG. 60.
Figure 62:
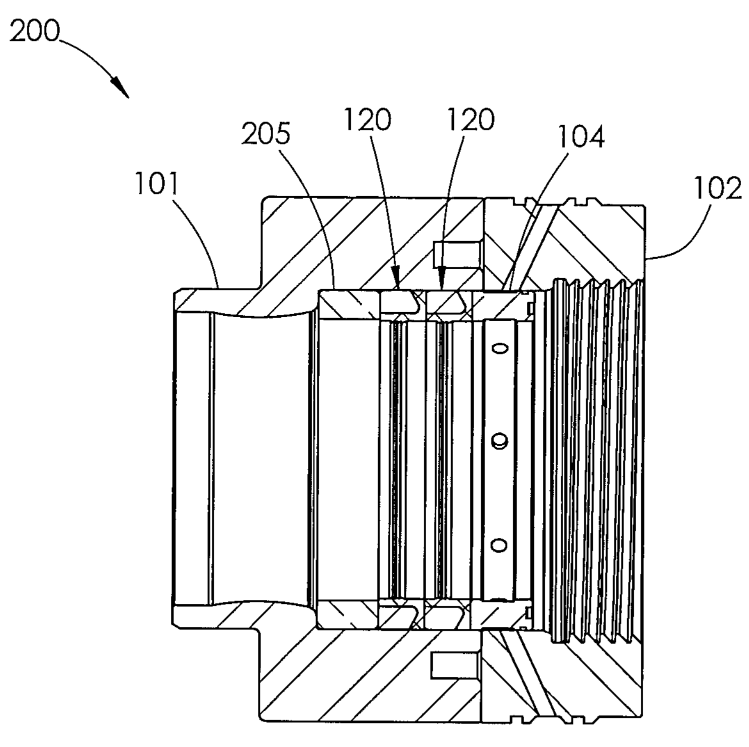
FIG. 62 is the cross-sectional view of a stuffing box and retainer with two identical hybrid pressure seals within.
Figure 63:
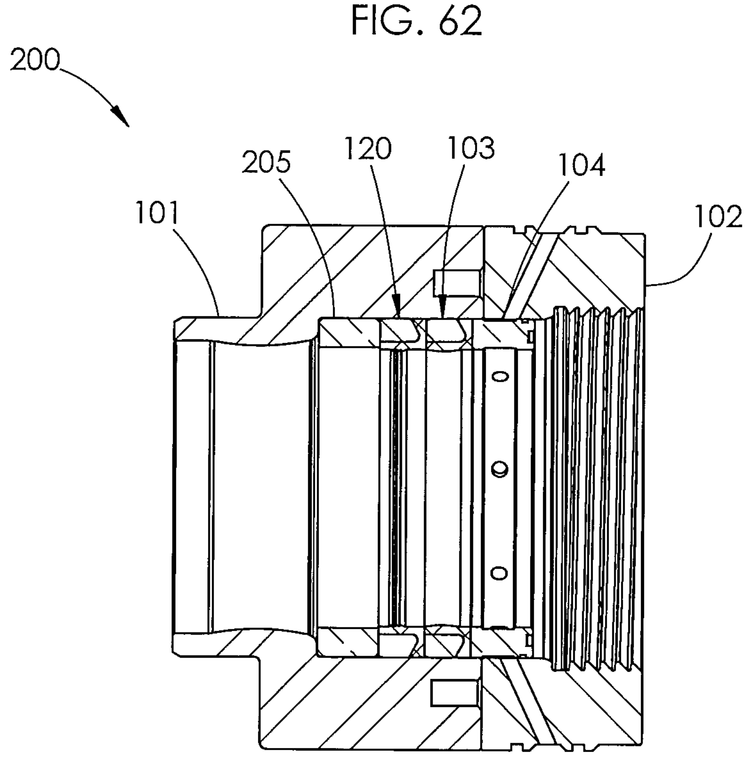
FIG. 63 is the cross-sectional view of a stuffing box and retainer with two different hybrid pressure seals within.
Figure 65:
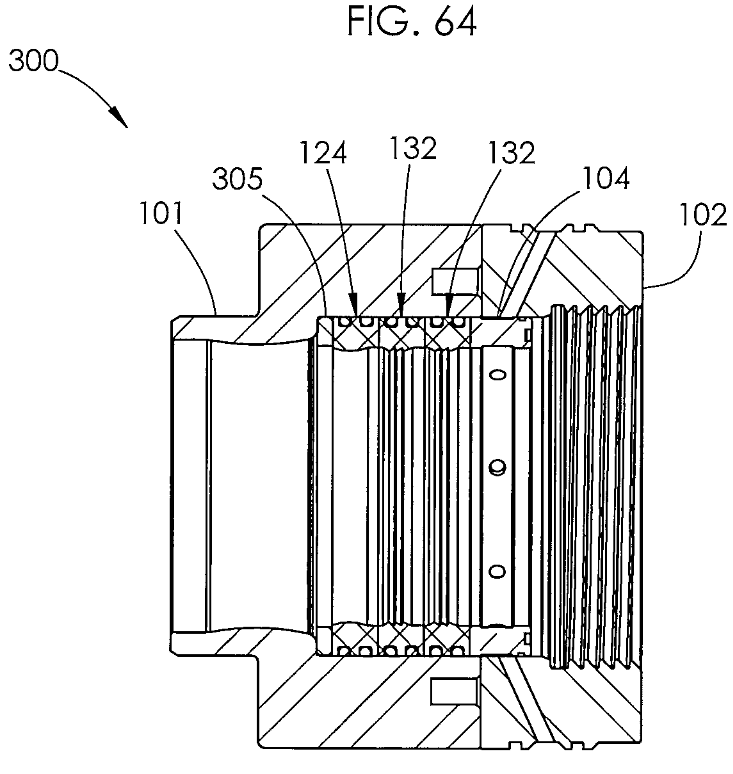
FIG. 65 is the cross-sectional view of a stuffing box and retainer with three hybrid pressure seals within, however, the seals of FIG. 65 differ from that of FIG. 64.

Various seal positions may be mixed and matched, as shown in FIGS. 60-65. FIGS. 60-61 show a plunger packing 100 with a single hybrid pressure seal 120, 132 of differing type. FIGS. 62-63 show a plunger packing 200 with two hybrid pressure seals. In FIG. 62, the same pressure seal 120 is used, while in FIG. 63, two types of hybrid pressure seals 120, 103 are used together. In FIGS. 64-65, three such hybrid pressure seals are used in packing 300, of varied types. An artisan will appreciate that the various features of the seals themselves may be interchangeable within the same stuffing box 101, provided that the junk ring 105, 205, 305 is appropriately sized for the application.

Figure 66:
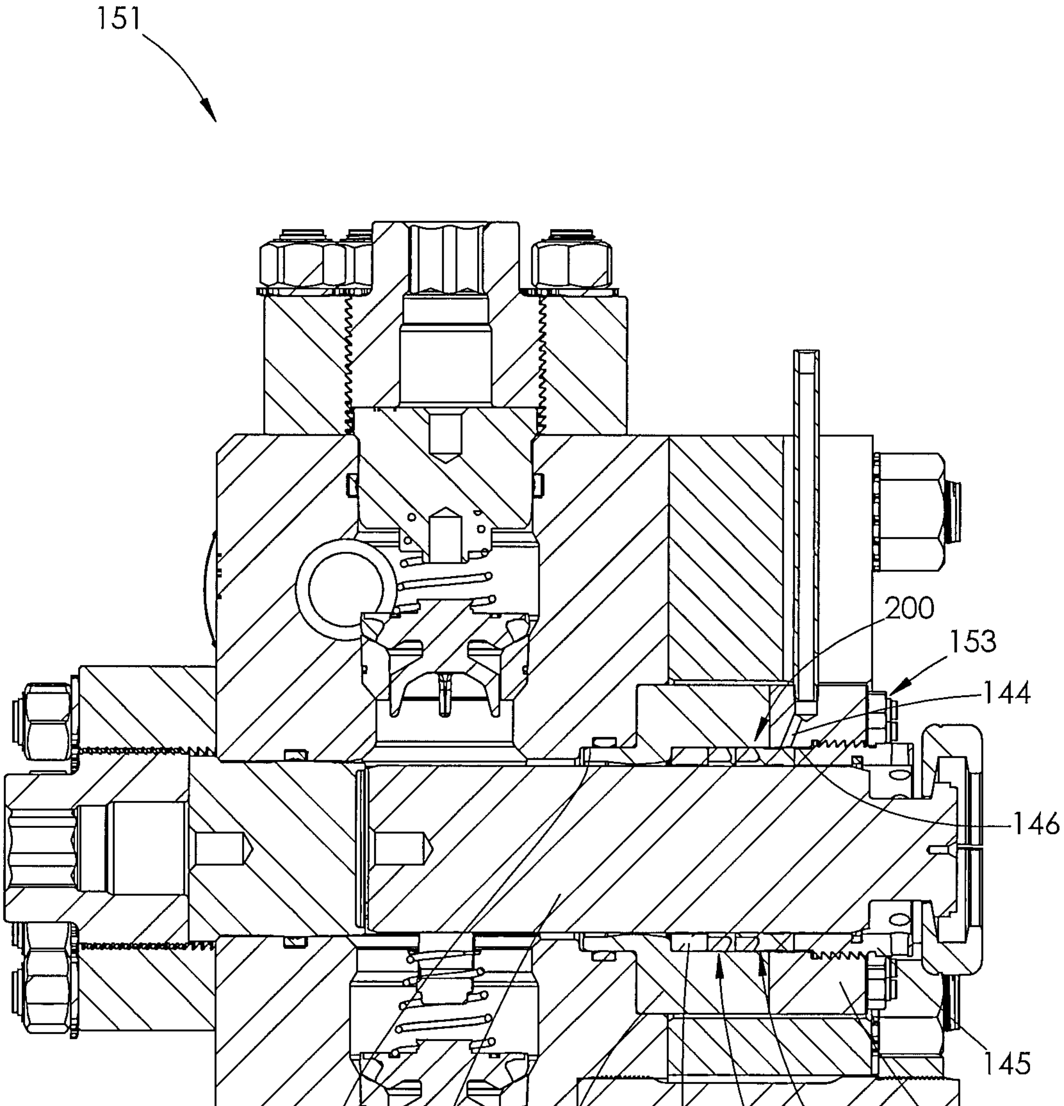
FIG. 66 is a sectional view of a fluid end having an internal junction, and an embodiment of the stuffing box having a pair of hybrid pressure seals.
Figure 67:
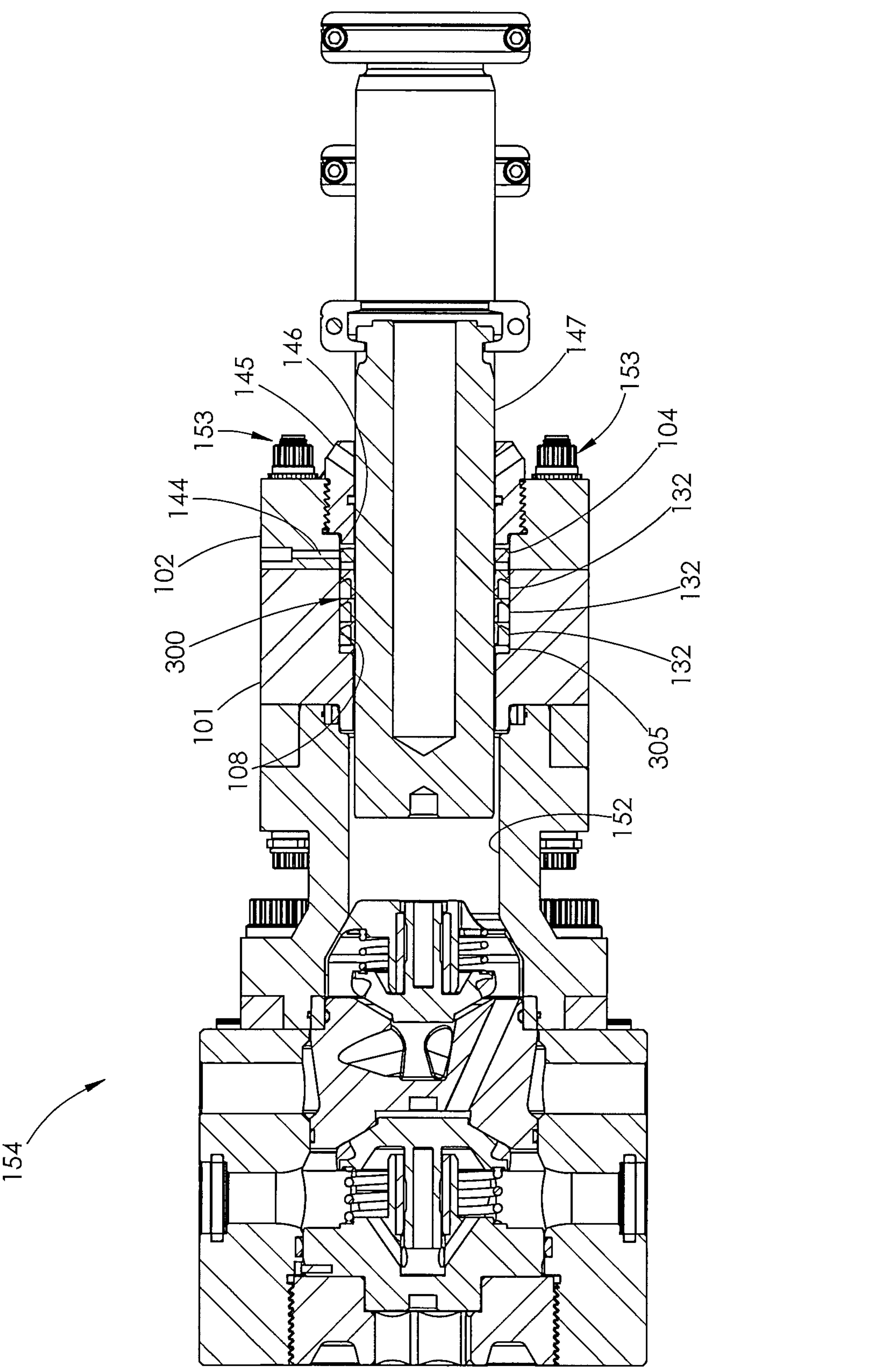
FIG. 67 is a sectional view of an alternative fluid end having a stuffing box. The fluid end of FIG. 67 is in-line in orientation.
Figure 68:
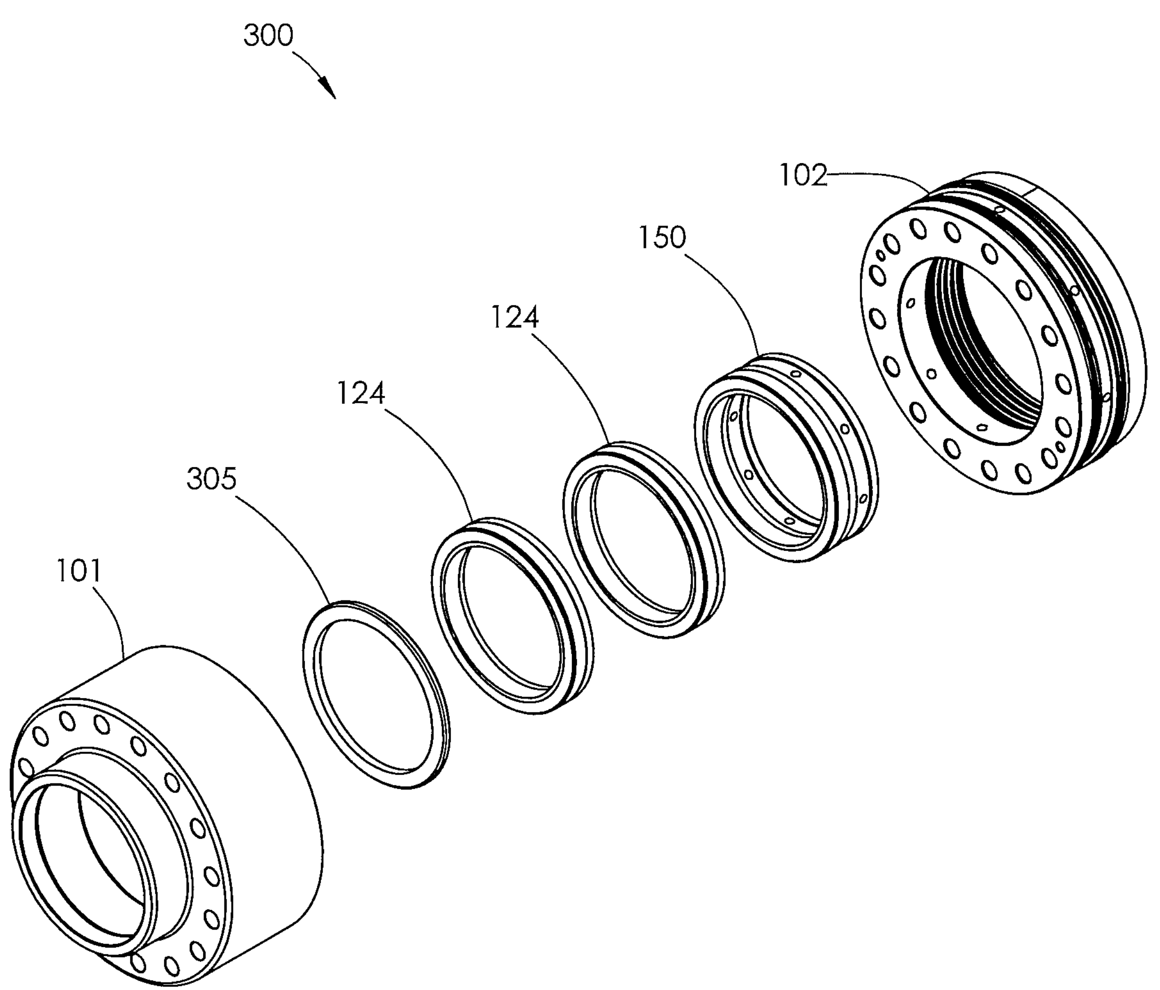
FIG. 68 is an exploded view of the stuffing box and retainer shown in FIG. 15, but with other embodiments of hybrid pressure seals installed in the plunger packing, including a combined seal/lantern ring.
Figure 69:
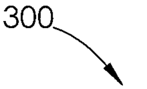
FIG. 69 is the cross-sectional view of the stuffing box of FIG. 68.
Figure 69:
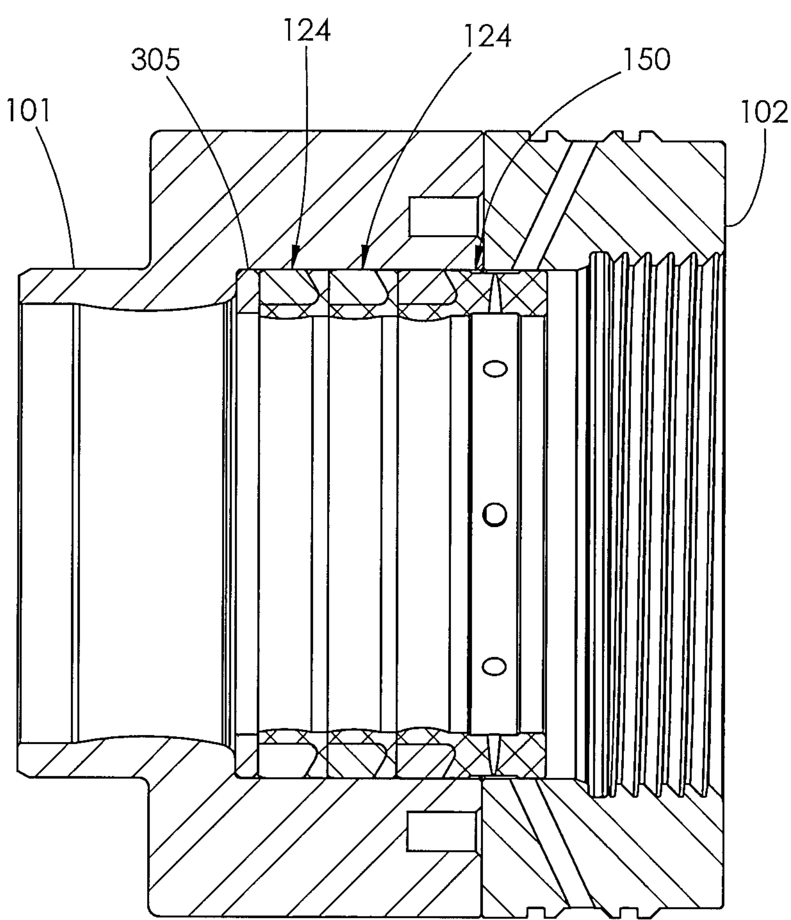
Figure 70:
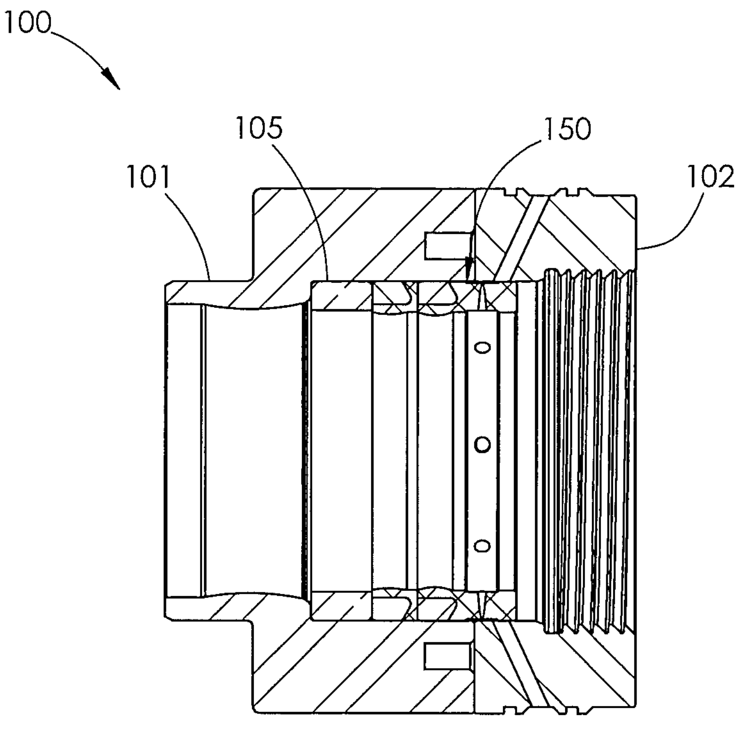
FIG. 70 is the cross-sectional view of the stuffing box of FIG. 69, but with one less hybrid pressure seal.
Figure 71:
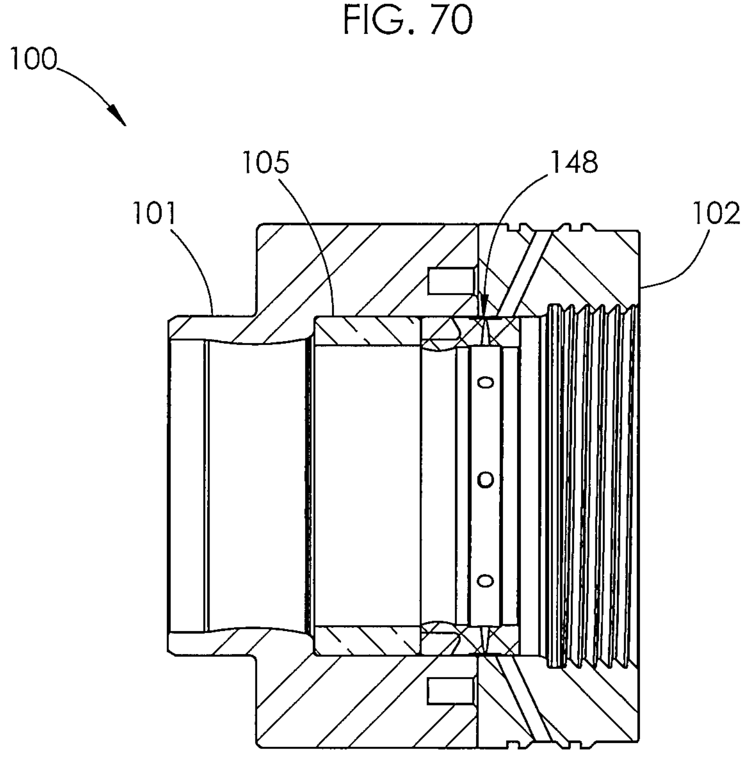
FIG. 71 is the cross-sectional view of the stuffing box of FIG. 69, but with no hybrid pressure seal only a single hybrid pressure seal/lantern ring.
Figure 76:
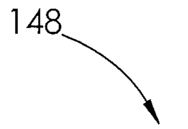
FIG. 76 is an enlarged view of area U, shown in FIG. 75.
Figure 76:
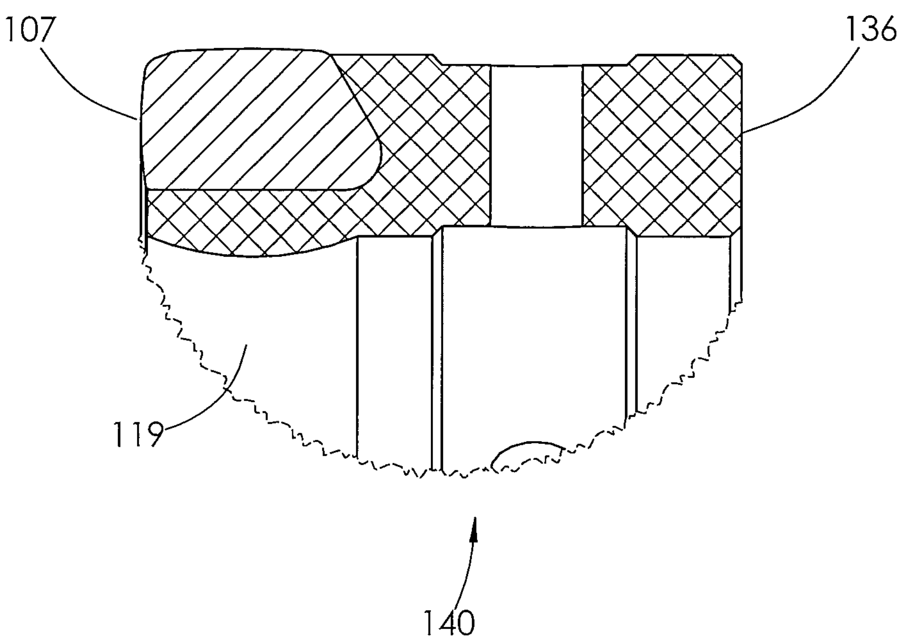
Figure 77:
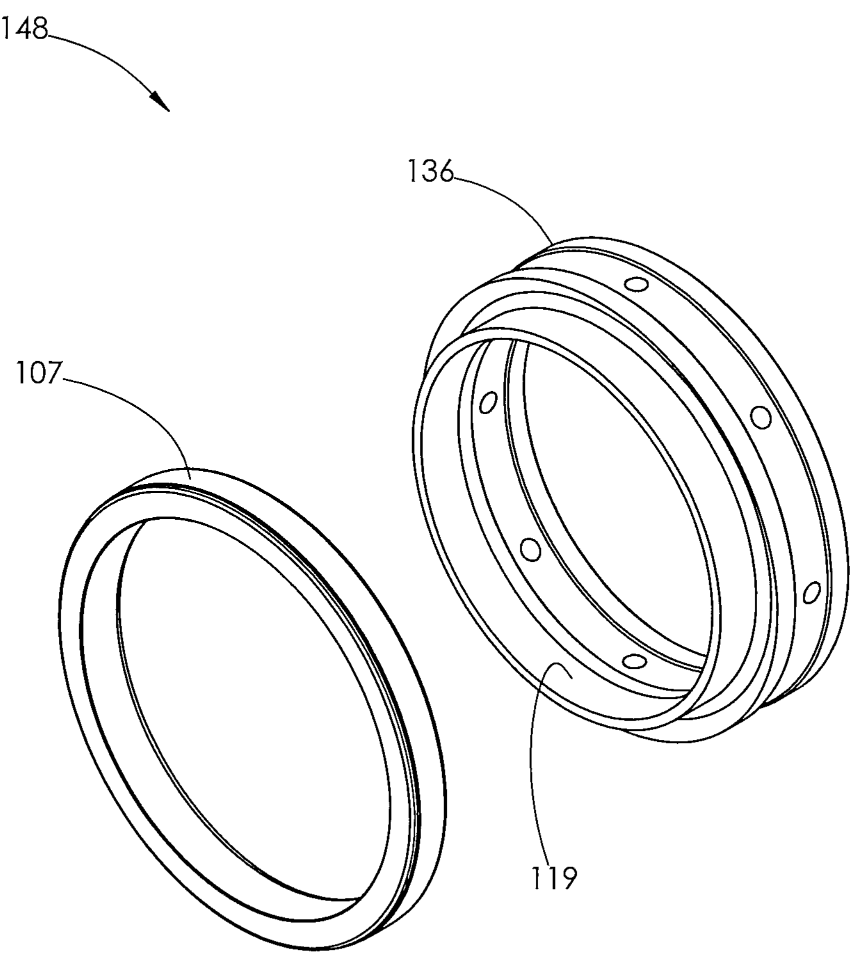
FIG. 77 is a front perspective and exploded view of the hybrid pressure seal shown in FIG. 72.

In addition, various versions of the stuffing boxes may be used in different types of fluid end 151, 154, as shown in FIGS. 66-67.

Another embodiment of a hybrid pressure seal 135 is shown in FIGS. 68-96. In FIGS. 78-83, the hybrid pressure seal 135 comprises an inner seal 136 and an outer seal 107. The hybrid pressure seal 135 incorporates the lantern ring 104 as a part of the inner seal 136. Thus, instead of the lantern ring 104 being made of metal or another hard material as is traditionally done, the lantern ring 104 is made of the same material as the inner seal 136. The lantern ring 104 incorporated into the hybrid pressure seal 135 is more flexible than traditional lantern rings known in the art.

The inner seal 136 of the hybrid pressure seal 135 is generally ring shaped and comprises a front surface 137, a rear surface 138, an outer surface 139, an inner surface 140, and a plurality of lubrication through holes 141. The outer surface 139 comprises an annular cutout 109 and a lubrication groove 142. The annular cutout 109 is the same as that in the outer surface 110 of the inner seal 106 described above. The lubrication groove 142 has a smaller diameter than the outer surface 139 and is formed between the rear surface 138 and the annular cutout 109 without intersecting either.

The inner surface 140 comprises V-shaped extrusions 123 and a lubrication groove 143. The V-shaped extrusions 123 are the same as shown in hybrid pressure seals 120 and 132. The lubrication groove 143 has a larger diameter than the inner surface 140 and is formed between the rear surface 138 and the V-shaped extrusions 123 without intersecting either. The width of the lubrication groove 143 may be the same as the width of the lubrication groove 142 and located at the same location axially.

The lubrication through holes 141 are radial bores connecting the outer surface 139 to the inner surface 140. The lubrication through holes 141 are located axially such that they intersect both lubrication grooves 142 and 143. The lubrication through holes 141 may be spaced evenly circumferentially.

Figure 82:
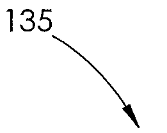
FIG. 82 is an enlarged view of area W, shown in FIG. 81.
Figure 82:
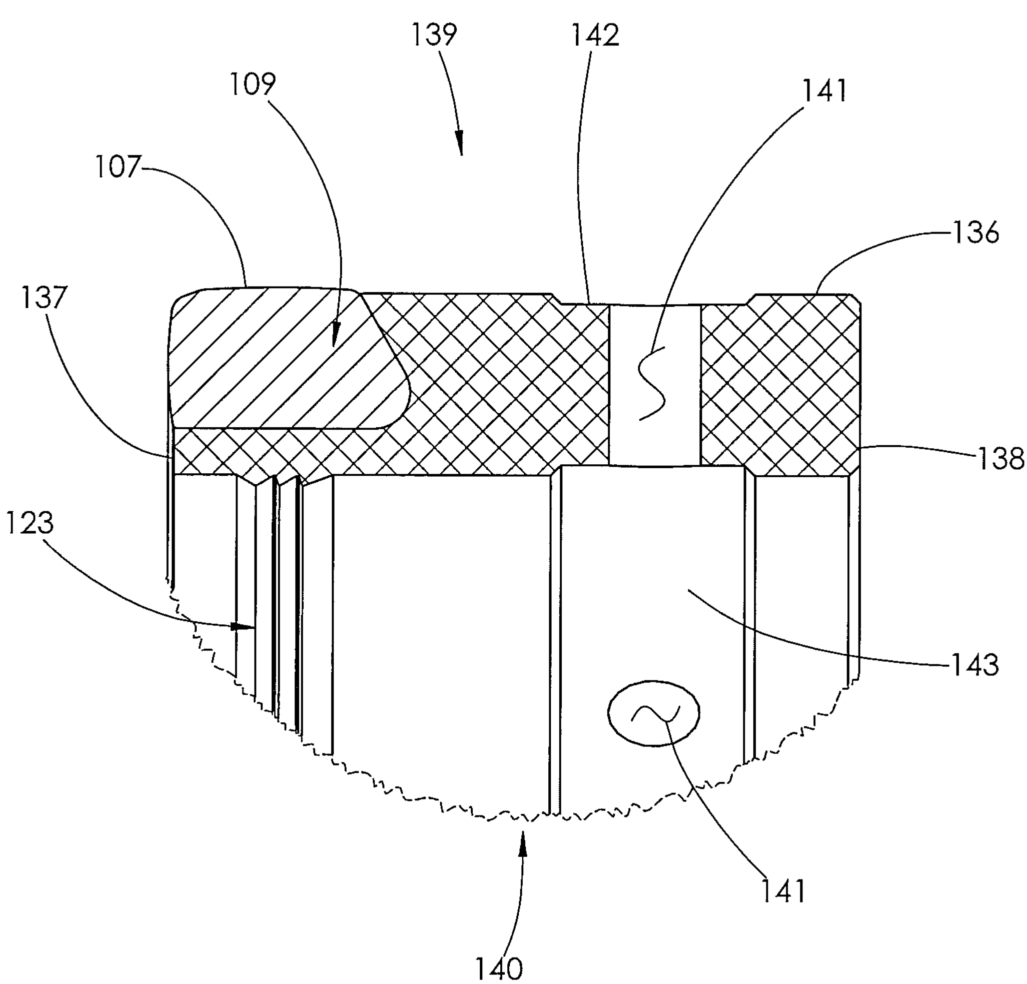
Figure 83:
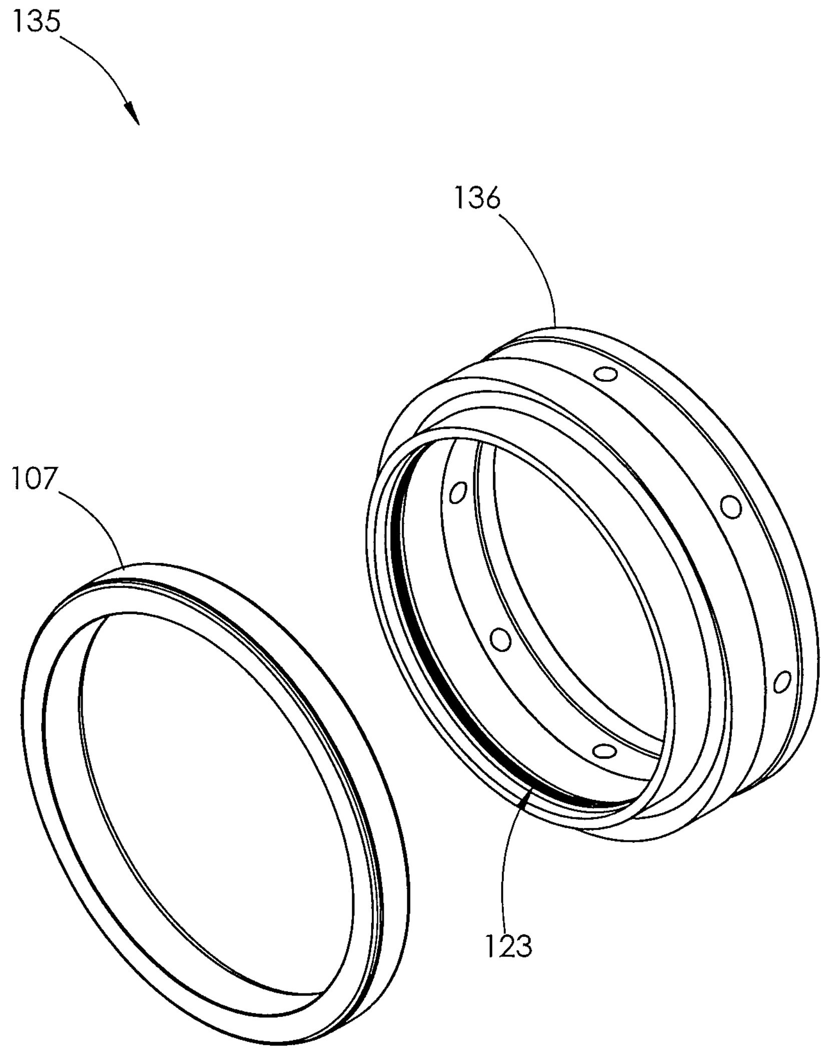
FIG. 83 is a front perspective and exploded view of the hybrid pressure seal shown in FIG. 78.
Figure 84:
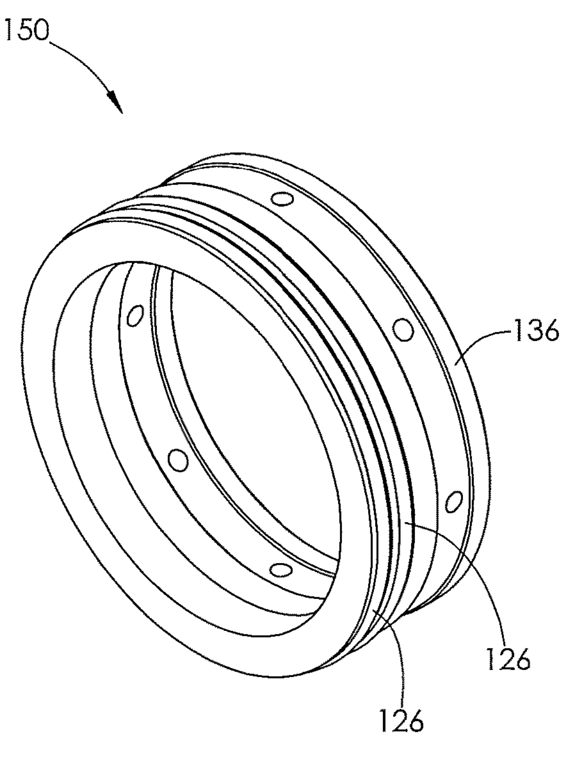
FIG. 84 is a front perspective view of another embodiment of a hybrid pressure seal used with the plunger packing shown in FIGS. 15-17.
Figure 85:
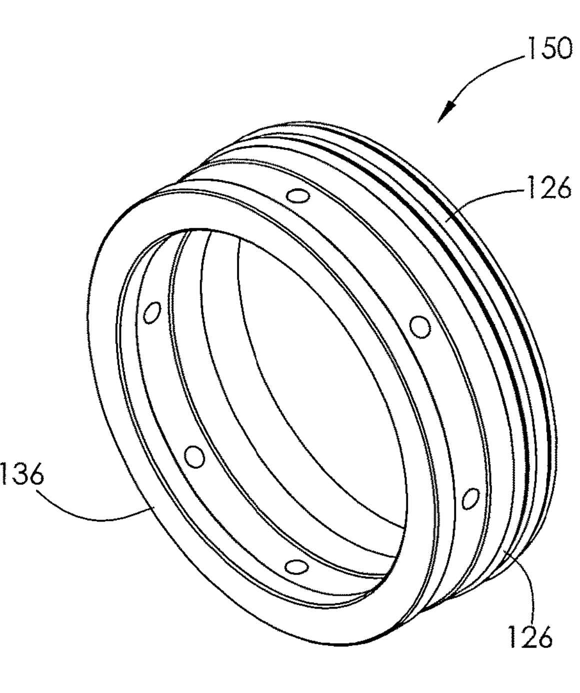
FIG. 85 is a rear perspective view of the hybrid pressure seal shown in FIG. 84.
Figure 86:
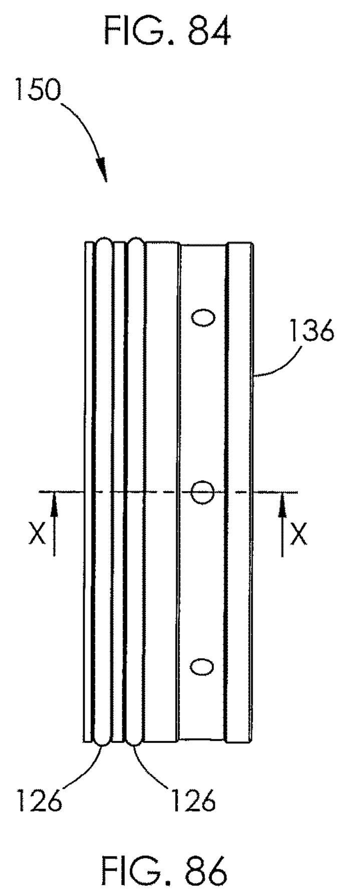
FIG. 86 is a side elevational view of the hybrid pressure seal shown in FIG. 84.
Figure 87:
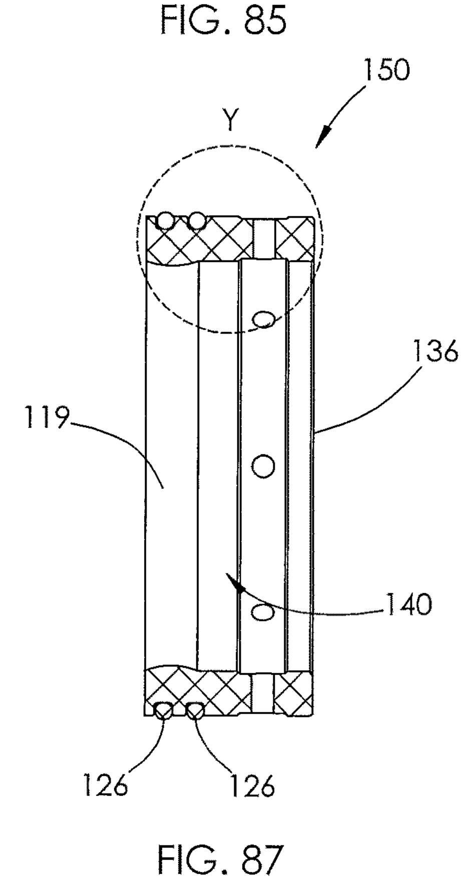
FIG. 87 is a cross-sectional view of the hybrid pressure seal shown in FIG. 86, taken along line X-X.
Figure 88:
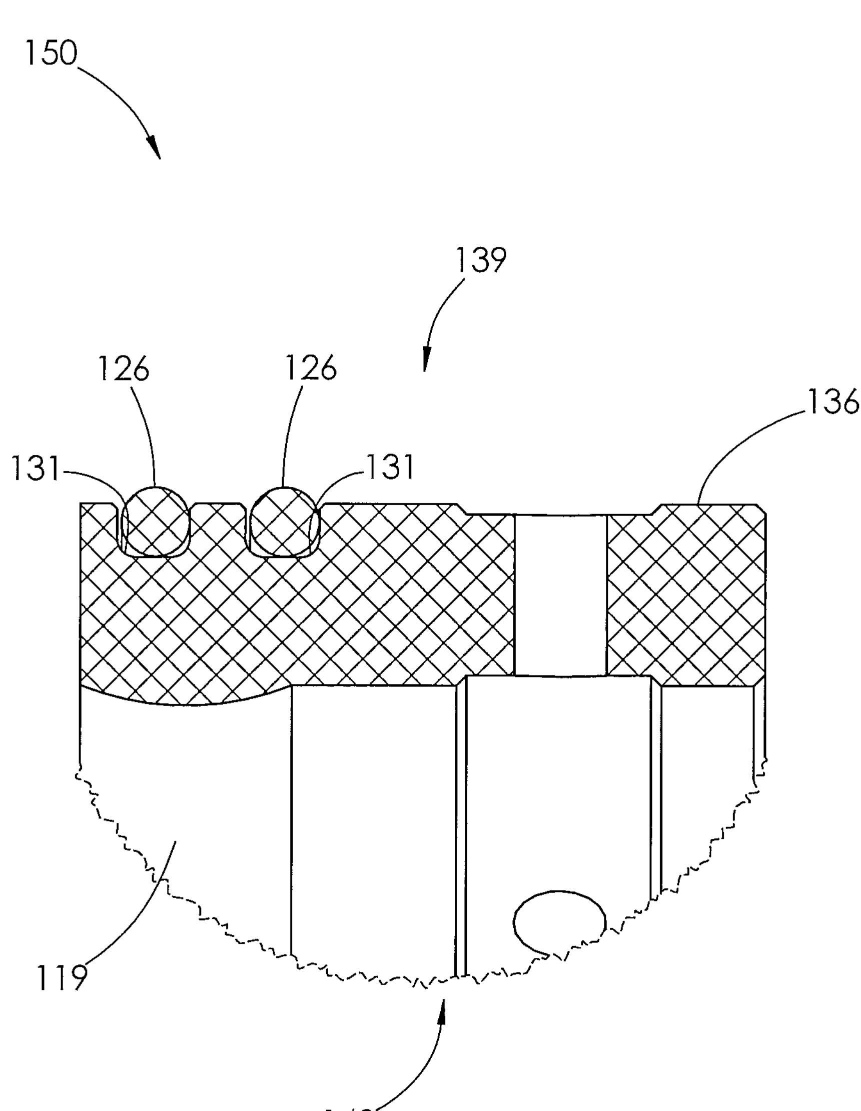
FIG. 88 is an enlarged view of area Y, shown in FIG. 87.
Figure 89:
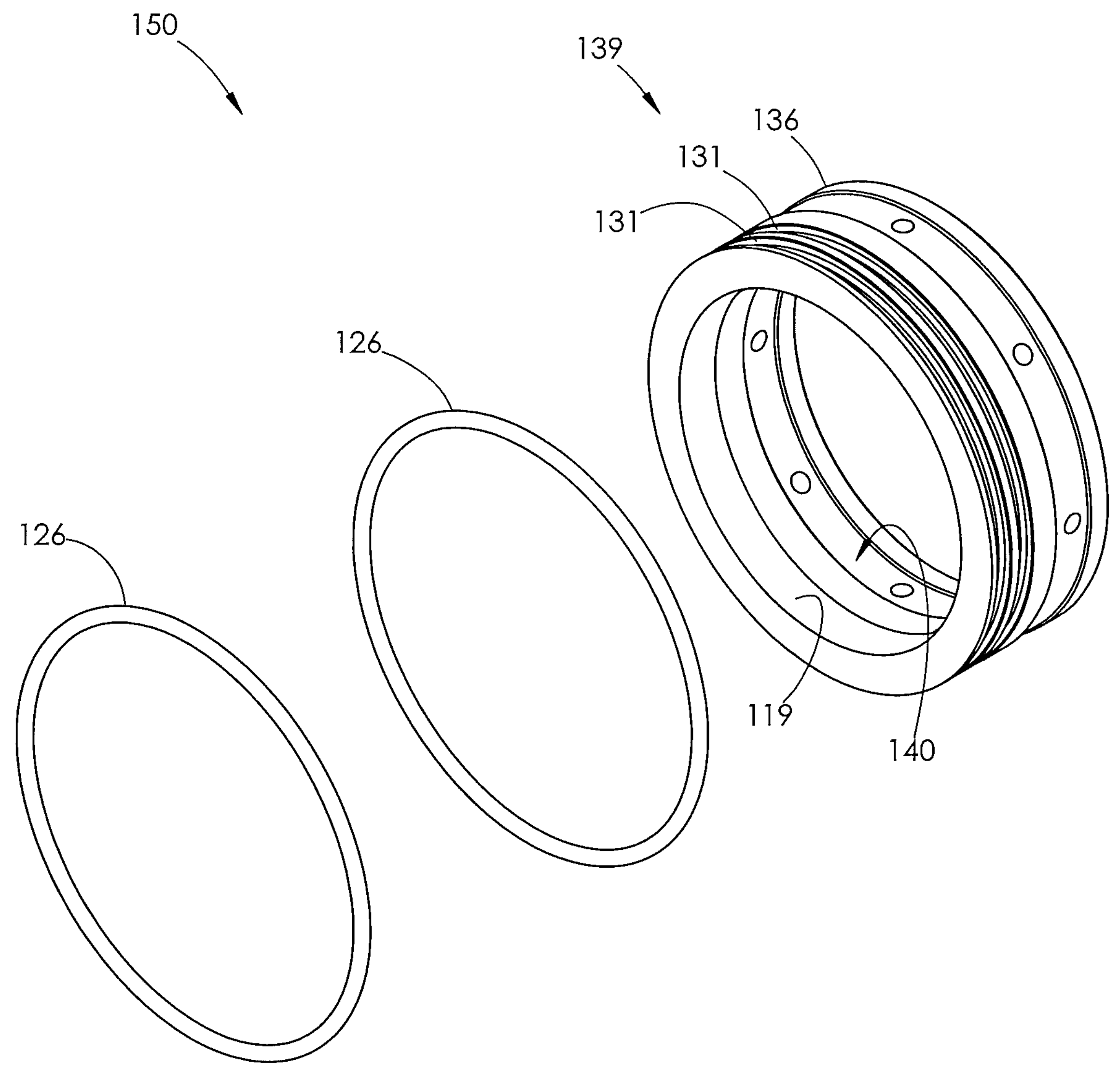
FIG. 89 is a front perspective and exploded view of the hybrid pressure seal shown in FIG. 84.
Figure 94:
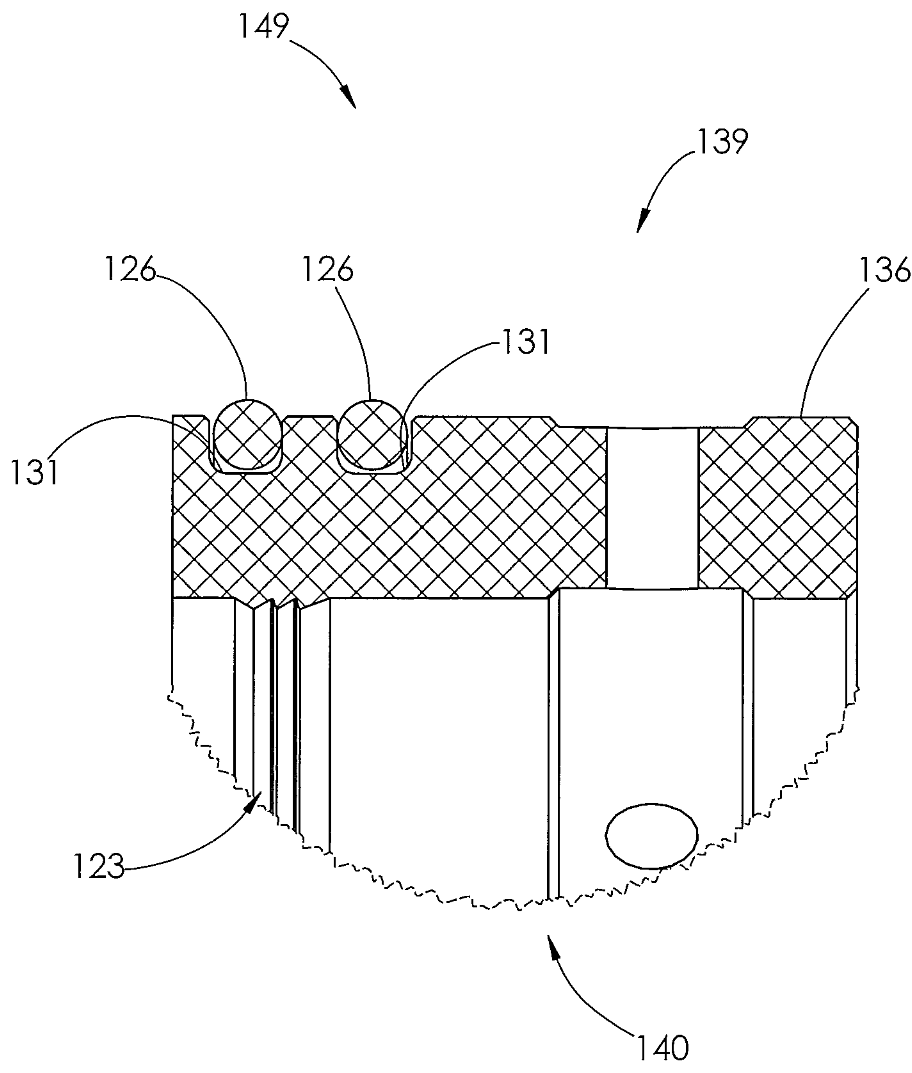
FIG. 94 is an enlarged view of area AA, shown in FIG. 93.
Figure 95:
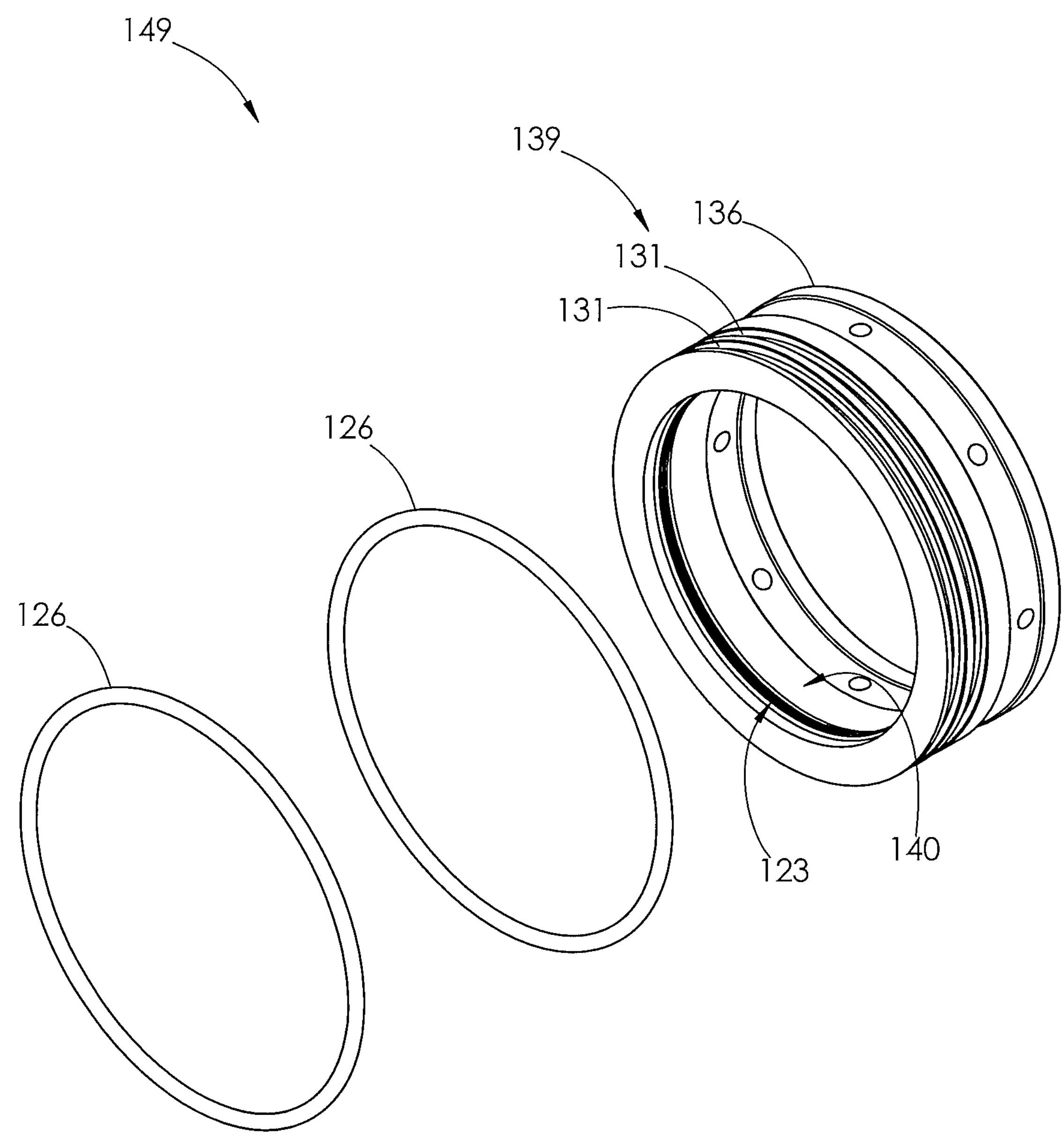
FIG. 95 is a front perspective and exploded view of the hybrid pressure seal shown in FIG. 90.
Figure 96:
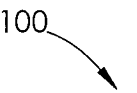
FIGS. 96-100 each show a cross-sectional view of the stuffing box and retainer with various embodiments of hybrid pressure seals and junk rings installed in the plunger packing. Each of the figures show at least one lantern ring-hybrid seal combined structure.
Figure 96:
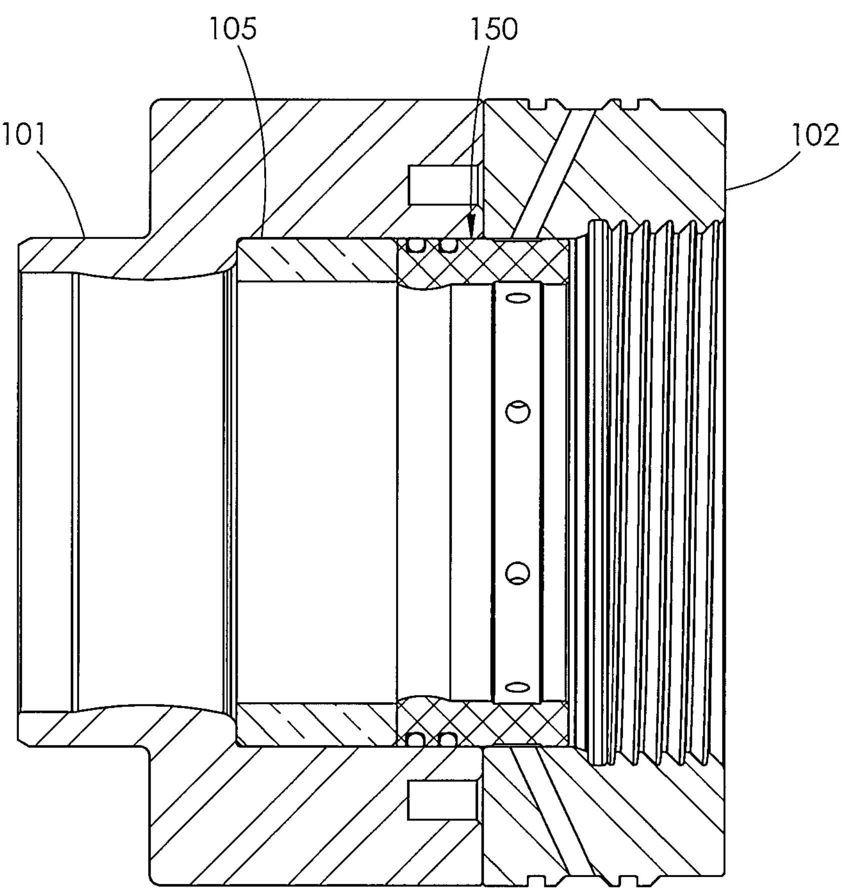
Figure 97:
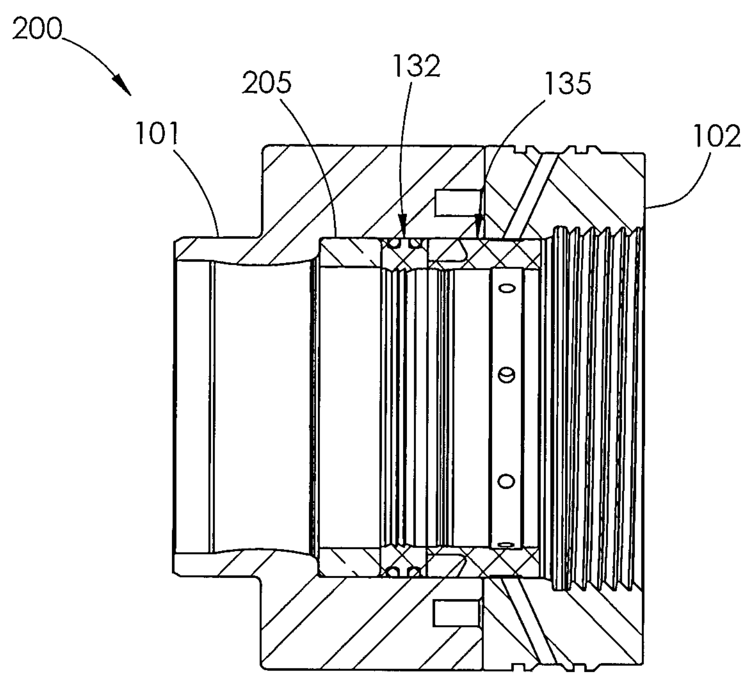

The hybrid pressure seal 135 is assembled by installing the outer seal 107 within the cutout 109 formed in the inner seal 136, as shown in FIG. 82. When installed therein, the outer seal 107 surrounds at least a portion of the inner surface 140 of the inner seal 136, as shown in FIG. 81. The outer seal 107 is sized to extend slightly past the outer and rear surfaces 139 and 138 of the inner seal 106.

The inner and outer seals 136 and 107 may be manufactured individually and assembled. Alternatively, the seal carrier or inner seal 136 may be machined and the outer seal 107 over-molded or bonded directly to the seal carrier 136.

When the hybrid pressure seal 135 is assembled in any of the plunger packing 100, 200, 300 embodiments the lantern ring 104 and one hybrid pressure seal 103, 120, 124, 132 is removed and replaced by the hybrid pressure seal 135. If used in plunger packing embodiment 200 or 300 it must always be in the outermost position so the lubrication groove 142 is at least partially aligned with the lubrication port 144 of the retainer 102. Once the hybrid pressure seal 135 is inserted in the stuffing box 101 and/or retainer 102 of the plunger packing 200, a packing nut 145 is threaded into the retainer 102 and tightened. This applies a compressive axial force to the hybrid pressure seal 135. Since the front and rear surfaces 137, 138 are confined between the packing nut 145 and the hybrid pressure seal 103 the compressive axial force may cause the outer surface 139 to increase in diameter until it contacts the inner surface 108 of the stuffing box 101 and/or the inner surface 146 of the retainer 102. Likewise, the axial force may cause the inner surface 140 to decrease in diameter until it contacts the plunger 147.

In operation the contact, or close proximity, of the outer surface 139 to the inner surface 108 of the stuffing box 101 and/or the inner surface 146 of the retainer 102 seals, or nearly seals, the lubrication groove 142. The contact or close proximity of the inner surface 140 to the plunger 147 seals, or nearly seals, the lubrication groove 143. This sealing and/or near sealing, greatly reduces lubricant losses axially to the atmosphere as compared to the losses allowed by a conventional metallic lantern ring 104.

Referring now to FIGS. 72-77, another embodiment of a hybrid pressure seal 148 is shown. The hybrid pressure seal 148 is the same as hybrid pressure seal 135 except the inner surface 140 of the inner seal 136 comprises a D-ring shape 119 instead of V-shaped extrusions 123.

The hybrid pressure seal 148 may be used interchangeably with other embodiments of hybrid pressure seals 135, 149, 150 in any of the embodiments of the plunger packing 100, 200, 300 described herein. Hybrid pressure seal 148 may also be used interchangeably, in the outer position only, with the other embodiments of hybrid pressure seals 103, 120, 124, 132 and lantern ring 104 in any of the embodiments of the plunger packing 100, 200, 300.

Referring now to FIGS. 90-95, another embodiment of a hybrid pressure seal 149 is shown. The hybrid pressure seal 149 is the same as hybrid pressure seal 135 except it comprises a plurality of outer seals 126 instead of outer seal 107. Additionally, the outer surface 139 comprises a plurality of grooves 131 instead of the annular cutout 109.

Figure 98:
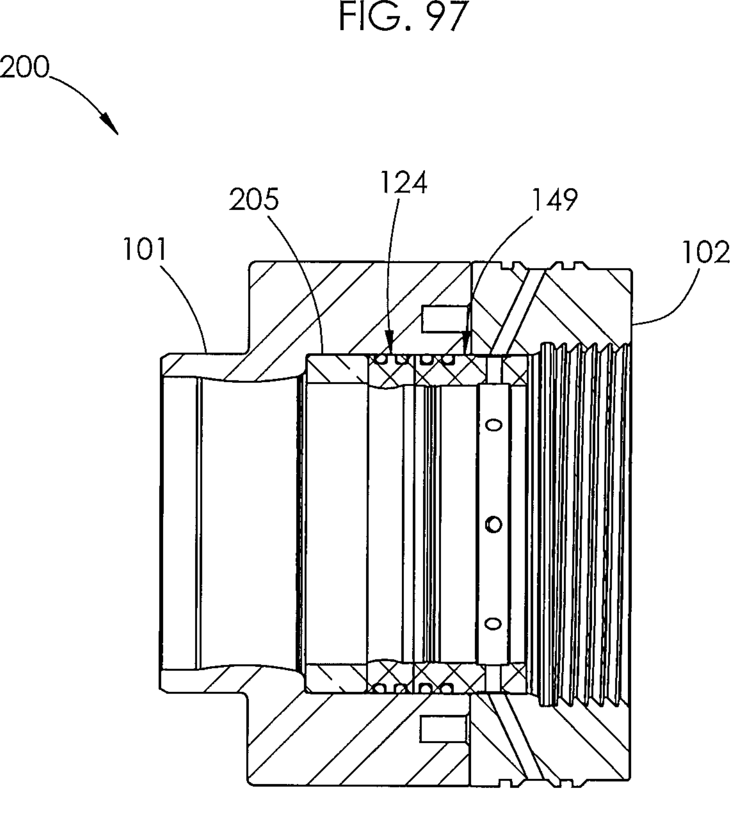
Figure 99:
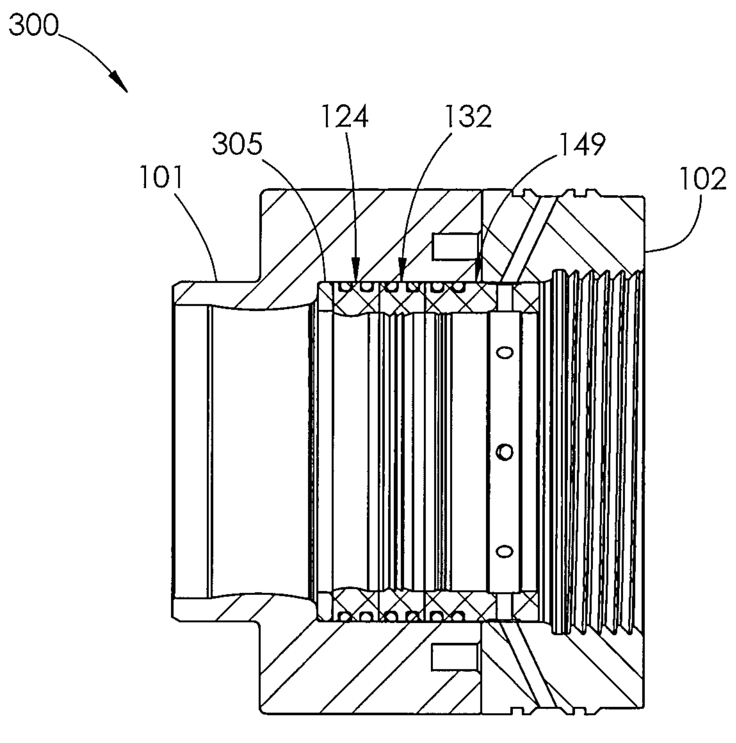
Figure 100:
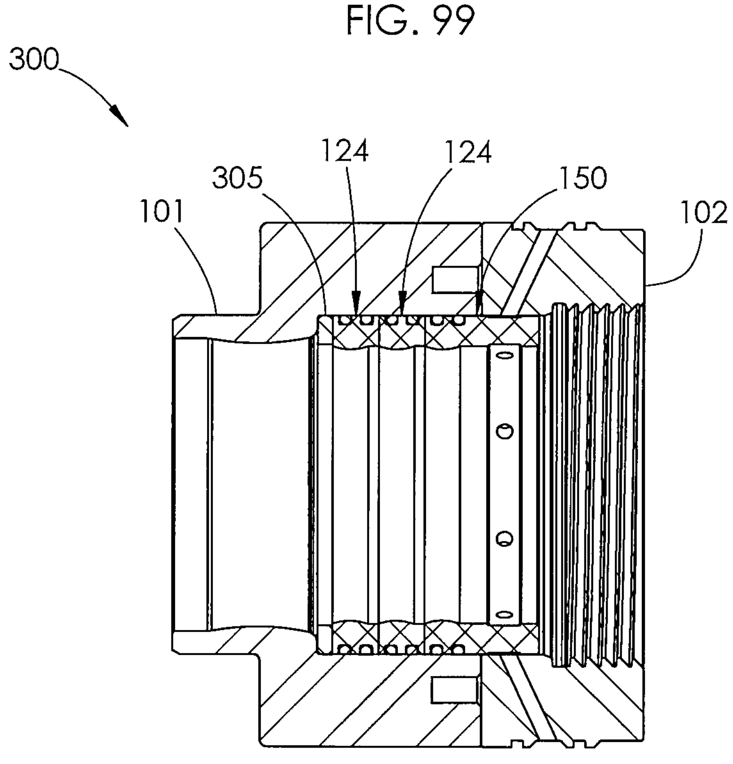

The hybrid pressure seal 149 may be used interchangeably with other embodiments of hybrid pressure seals 135, 148, 150 in any of the embodiments of the plunger packing 100, 200, 300 described herein as shown in FIG. 98. Hybrid pressure seal 149 may also be used interchangeably, in the outer position only, with the other embodiments of hybrid pressure seals 103, 120, 124, 132 and lantern ring 104 in any of the embodiments of the plunger packing 100, 200, 300.

Referring now to FIGS. 84-89, another embodiment of a hybrid pressure seal 150 is shown. The hybrid pressure seal 150 is the same as hybrid pressure seal 149 except the inner surface 140 of the inner seal 136 comprises a D-ring shape 119 instead of V-shaped extrusions 123.

The hybrid pressure seal 150 may be used interchangeably with other embodiments of hybrid pressure seals 135, 148, 149 in any of the embodiments of the plunger packing 100, 200, 300 described herein. Hybrid pressure seal 150 may also be used interchangeably, in the outer position only, with the other embodiments of hybrid pressure seals 103, 120, 124, 132 and lantern ring 104 in any of the embodiments of the plunger packing 100, 200, 300.

For example, various arrangements of the hybrid pressure seals within a stuffing box 101 are shown in FIGS. 96-100.

With reference to FIG. 16, another embodiment of plunger packing 200 is shown. Plunger packing 200 comprises two hybrid pressure seals 103, a lantern ring 104, and a junk ring 205. The junk ring 205 serves the same purpose of spacing as in the first embodiment of the plunger packing 100 but it is necessarily shorter to accommodate the additional hybrid pressure seal 103. The two hybrid pressure seals 103 may be the same or may be a mix of one of any of the embodiments of hybrid pressure seals 103, 120, 124, 132, 135, 148, 149, 150 disclosed herein. Also, the order of the selected hybrid pressure seals 103, 120, 124, 132 may be switched. For example, it may be such that in one application the hybrid pressure seals 103, 120 are selected to be used in the plunger packing 200. In one application the hybrid pressure seal 103 with a D-ring shape 119 may be inserted in the stuffing box 101 first and in a different application the hybrid pressure seal 120 with the V-shaped extrusions 123 may be inserted in the stuffing box 101 first. However, only one of the hybrid pressure seals 135, 148, 149, 150 may be used at a time and if selected to be used it must be located in the end, or outer, position.

In FIG. 15, another embodiment of plunger packing 300 is shown. Plunger packing 300 comprises three hybrid pressure seals 103, a lantern ring 104, and a junk ring 305. In FIG. 15 one hybrid pressure seal 103 is used and two hybrid pressure seals 120 are used. The junk ring 305 serves the same purpose of spacing as in the other embodiments of the plunger packing 100, 200 but is necessarily shorter to accommodate the third hybrid pressure seal 103.

The three hybrid pressure seals 103 may be all the same or any mixture of the different embodiments of the hybrid pressure seals 103, 120, 124, 132, 135, 148, 149, 150. Also, the order of insertion of the selected hybrid pressure seals 103, 120, 124, 132, 135, 148, 149, 150 into the stuffing box 101 may be changed based on preference or known parameters. However, only one of the hybrid pressure seals 135, 148, 149, 150 may be used at a time and if selected to be used it must be located in the end, or outer, position.

In further alternative embodiments of plunger packing, more than three hybrid pressure seals 103, 120, 124, 132, 135, 148, 149, 150 may be used. As described in relation to the embodiments disclosed in FIGS. 15-17, the junk or spacer ring used in these further alternative embodiments may vary in width, depending on the amount of hybrid pressure seals 103 used or may be omitted entirely.

In contrast to some plunger packings known in the art, if more than one hybrid pressure seal 103, 120, 124, 132 is used, the hybrid pressure seals 103, 120, 124, 132 stacked on top of each other are identical in size and shape in regard to spacing. The stacked hybrid pressure seals 103, 120, 124, 132 do not comprise any bead portions, chevron, or V-shapes configured to interlock with one another like other pressure seals known in the art.

In contrast to other previous seals, such as the packing seal shown in U.S. Pat. No. 9,534,691, issued to Miller et al., the embodiments of hybrid pressure seals 103, 120, 124, 132, 135, 148, 149, 150 disclosed herein are not a single seal having areas made of different material. Rather, the hybrid pressure seals 103, 120, 124, 132, 135, 148, 149, 150 are comprised of at least two separate seals. In the embodiment of hybrid pressure seal 103, 120, 135, 148 the two separate seals are the inner seal 106, 121, 136, 136 and outer seal 107. In the embodiment of hybrid pressure seal 124, 132, 149, 150 the separate seals are the inner seal 125, 133, 136, 136 and outer seal 126. In each embodiment of hybrid pressure seal 103, 120, 124, 132, 135, 148, 149, 150 the separate seals 106, 107, 121, 125, 126, 133, 136, are each made of a different, homogeneous material, joined together to form a single hybrid pressure seal 103, 120, 124, 132, 135, 148, 149, 150. As noted above, no portion of the inner seal 106, 121, 125, 133, 136 or outer seal 107, 126 is covered by fabric. Each inner seal 106, 121, 125, 133, 136 or outer seal 107, 126 is made of a homogeneous material throughout.

Figure 101:
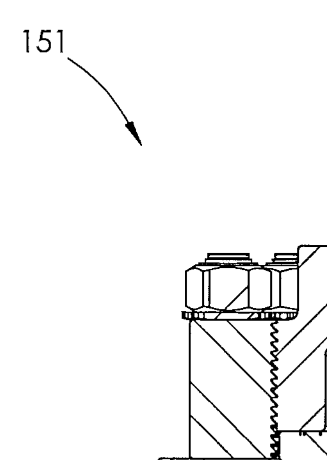
FIG. 101 is a sectional view of a fluid end using one of the stuffing box embodiments of this invention.
Figure 102:
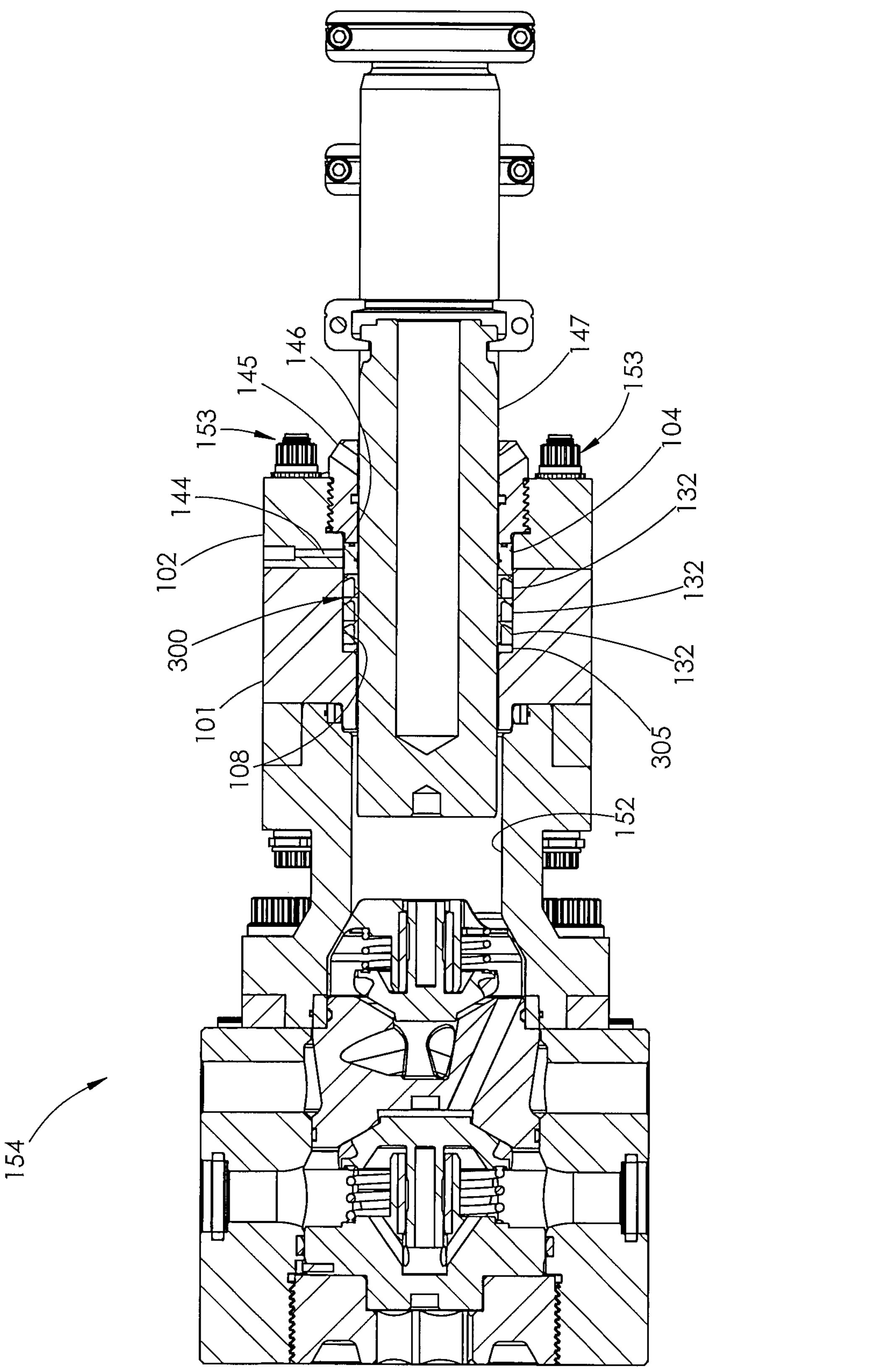
FIG. 102 is a sectional view of a different fluid end using one of the stuffing box embodiments of this invention.

Referring now to FIGS. 101, a fluid end 151 of the type shown in U.S. Pat. No. 10,941,765, issued to Nowell et al., and incorporated by reference earlier is shown with plunger packing embodiment 200 having hybrid pressure seals 103 and 135.

Referring now to FIGS. 106-138, another embodiment of plunger packing 400 is shown. The plunger packing 400 comprises new embodiments of a hybrid pressure seal 420, lantern ring 404, and junk ring 405. The plunger packing 400 is the same as plunger packing 100 with the addition of interlocking elements to each component.

Referring now to FIGS. 124-128, another embodiment of a junk ring 405 is shown. The junk ring 405 is the same as junk ring 105 with the addition of an interlocking element. The junk ring 405 is generally ring shaped and comprises a front surface 455, rear surface 456, inner surface 457, and outer surface 458. The rear surface 456 comprises a convex interlocking element 459. The convex interlocking element 459 is generally V-shaped and is configured to be inserted in a complimentary concave interlocking element 460 of the hybrid pressure seal 420.

Figure 128:
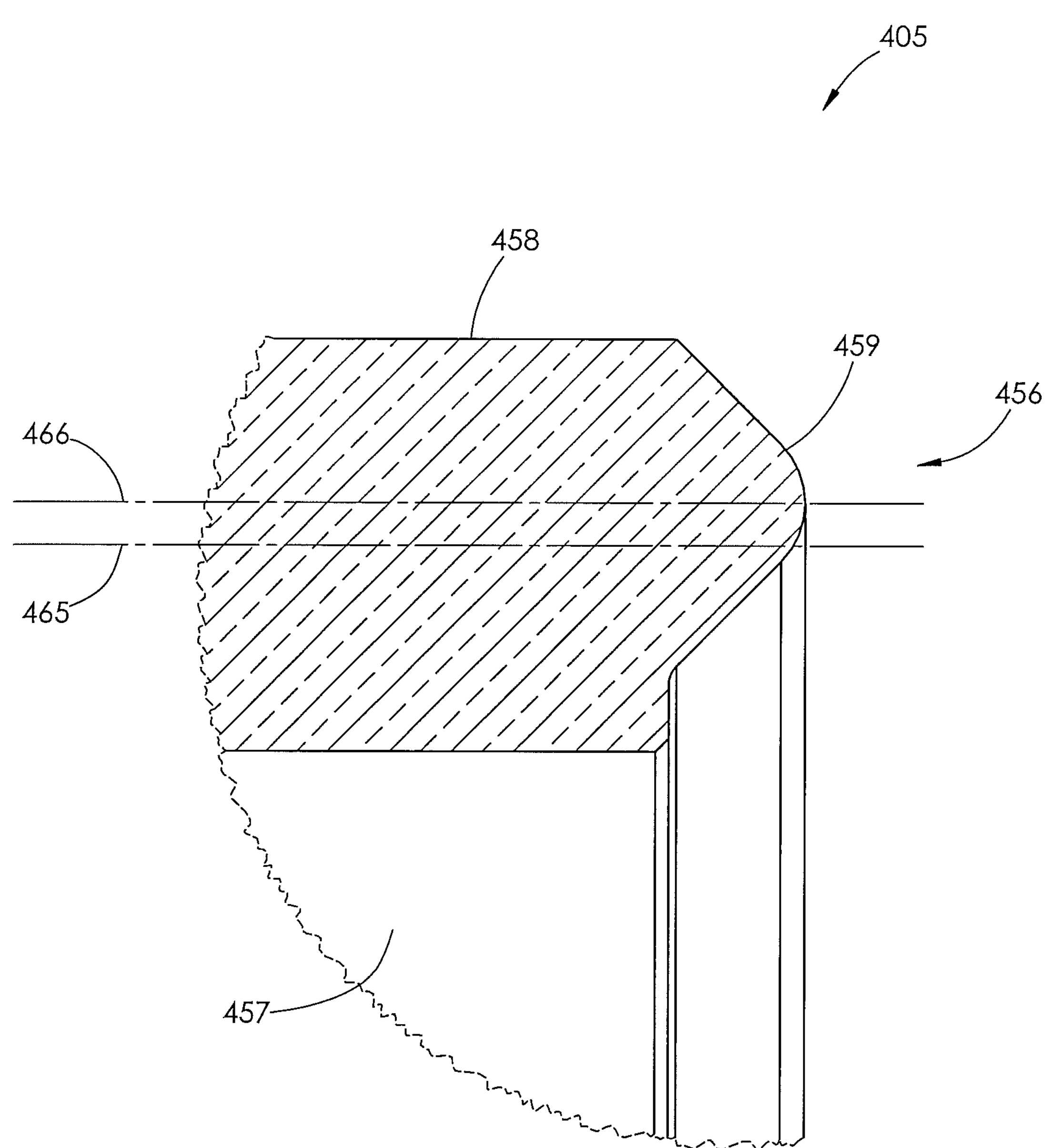
Figure 133:
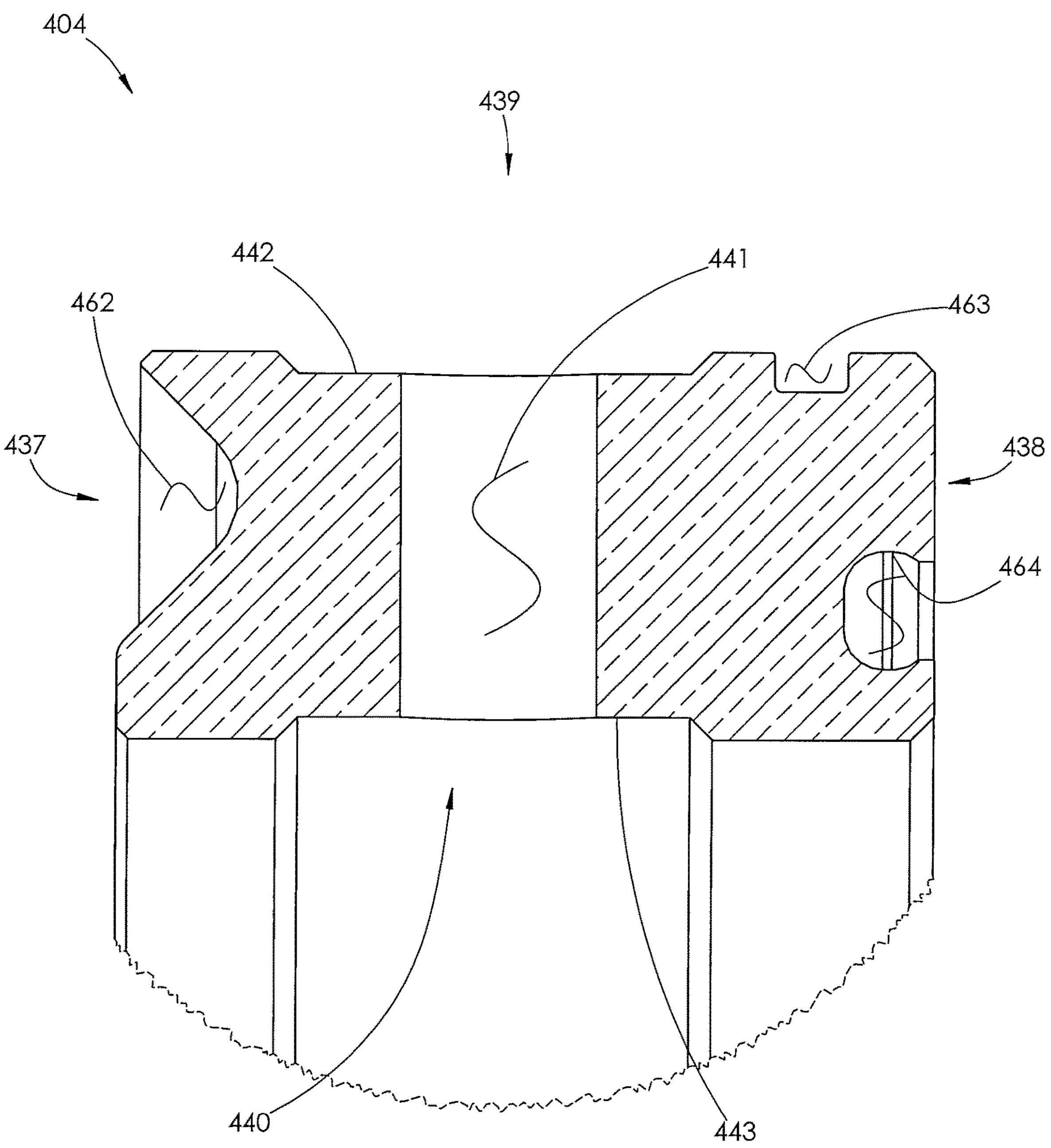
Figure 134:
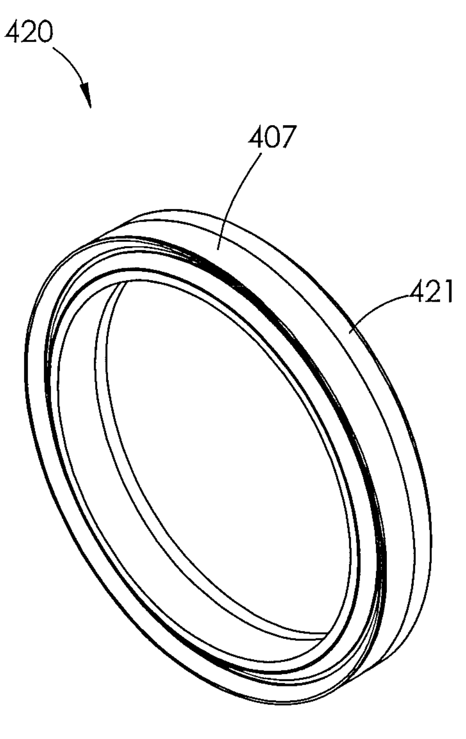
Figure 135:
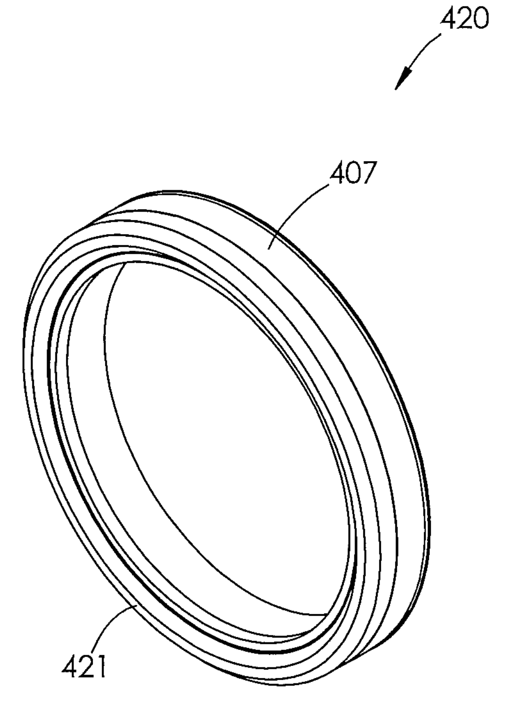
Figure 136:
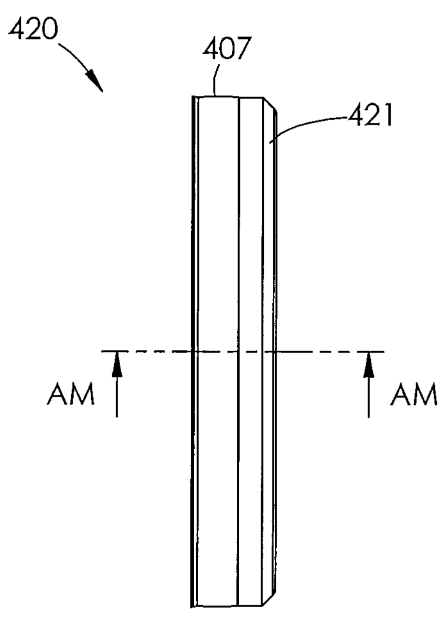
Figure 137:
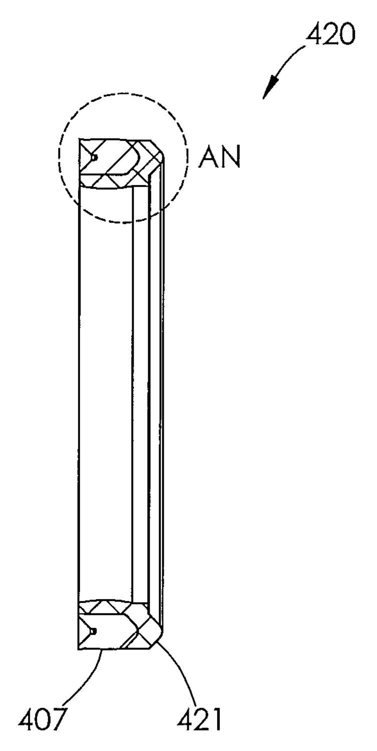
Figure 138:
Figure 138:
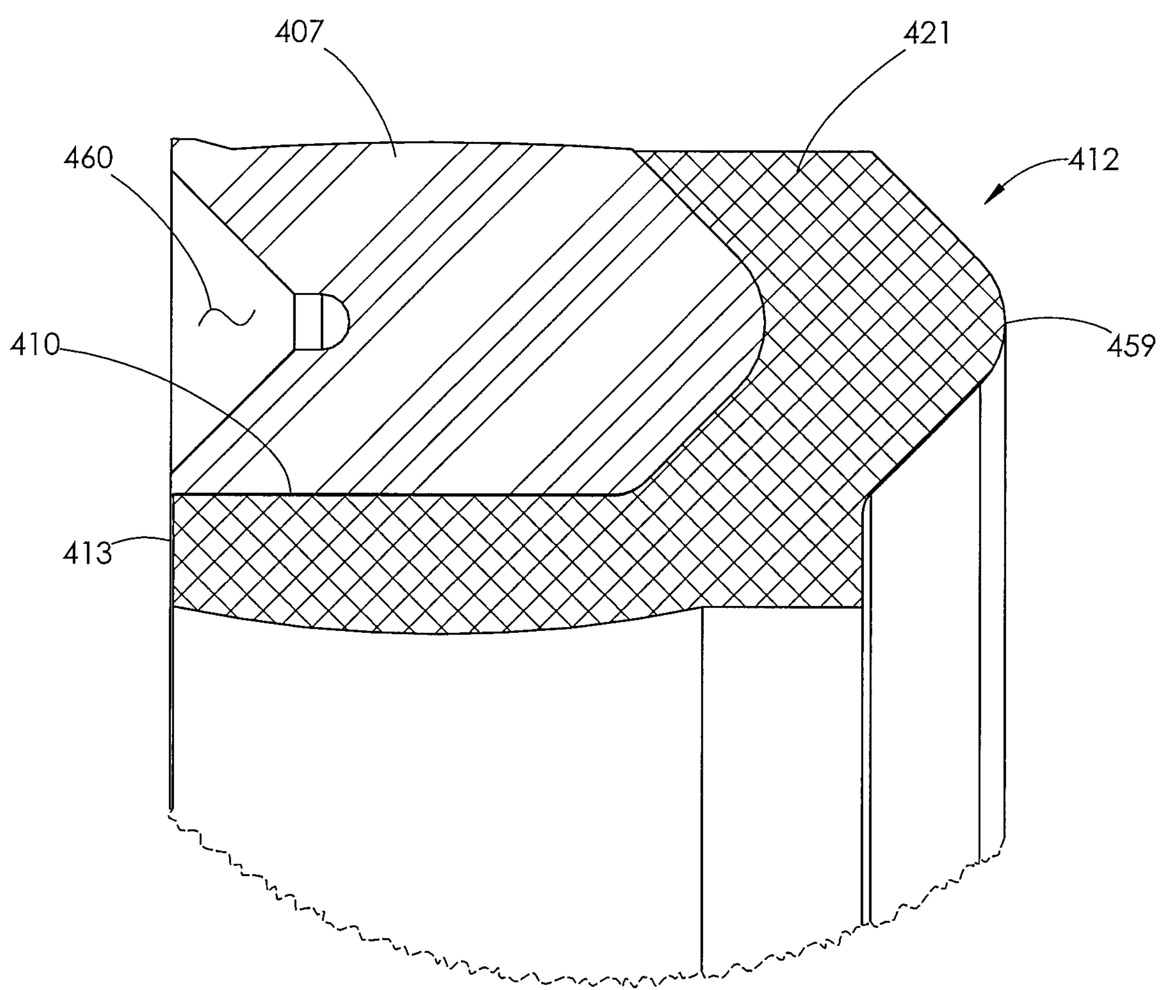

The centerline 465 of the wall of the junk ring 405 is shown in FIG. 128, that is half the distance between the outer surface 458 and the inner surface 457 of the junk ring 405. Also shown in FIG. 128 is the centerline 466 of the V-shaped convex interlocking element 459. As can be seen, the two centerlines 465 and 466 are not colinear thus the convex interlocking element 459 is not centered on the centerline 465 of the wall, or is "offset from the centerline of the wall", or just "offset".

The hybrid pressure seal 420 is the same as hybrid pressure seal 220 with the addition of external interlocking elements on each component. The hybrid pressure seal 420 comprises an outer seal 407 and inner seal 421.

The outer seal 407 is generally ring shaped and comprises a front surface 414, rear surface 418, inner surface 416, and outer surface 417. The front surface 414 comprises a concave interlocking element 460. The concave interlocking element 460 is generally V-shaped and is configured to receive the complementary convex interlocking element 459 of the junk ring 405. The concave interlocking element 460 comprises a relief cutout 461 at the base of the V to reduce the stress and likelihood of the material tearing. The rear surface 418 comprises a convex interlocking element 459. The convex interlocking element 459 has the same cross section as the convex interlocking element 459 of the junk ring 405 and is configured to be inserted in a complimentary concave interlocking element 462 of the inner seal 421, to be described in more detail later. The outer seal 407 may be made of any of the materials listed for outer seal 107 above.

The inner seal 421, shown in FIGS. 119-123, is generally ring shaped with an annular cutout 409 formed in its outer surface 410. The cutout 409 comprises a concave interlocking element 462 configured to receive the convex interlocking element 459 of the outer seal 407. The concave interlocking element 462 is the same as concave interlocking element 460 without the relief cutout 461. The cutout 409 forms a flange 411 at a front surface 412 of inner seal 421 that comprises the remaining outer surface 410. The cutout 409 extends between the flange 411 and a rear surface 413 of the inner seal 421 such that the front surface 412 of the inner seal 421 has a greater outer diameter than the rear surface 413 of the inner seal 421. The front and rear surfaces 412 and 413 of the inner seal 421 are joined by an inner surface 422 having V-shaped extrusions 423. The front surface 412 comprises a convex interlocking element 459.

The convex interlocking element 459 is generally V-shaped and is configured to be inserted in a complimentary concave interlocking element 462 of the lantern ring 404, to be described in more detail later. The convex interlocking element 459 is "offset" the same as the convex interlocking element 459 of the junk ring 405 as described above. The inner seal 421 may be made of any of the materials listed for inner seal 106 above.

Figure 111:
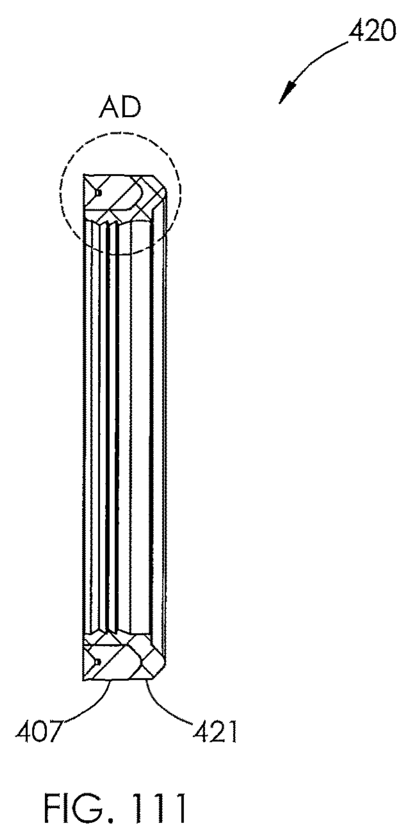
FIG. 111 is a cross-sectional view of the hybrid pressure seal shown in FIG. 110, taken along line AC-AC.
Figure 112:
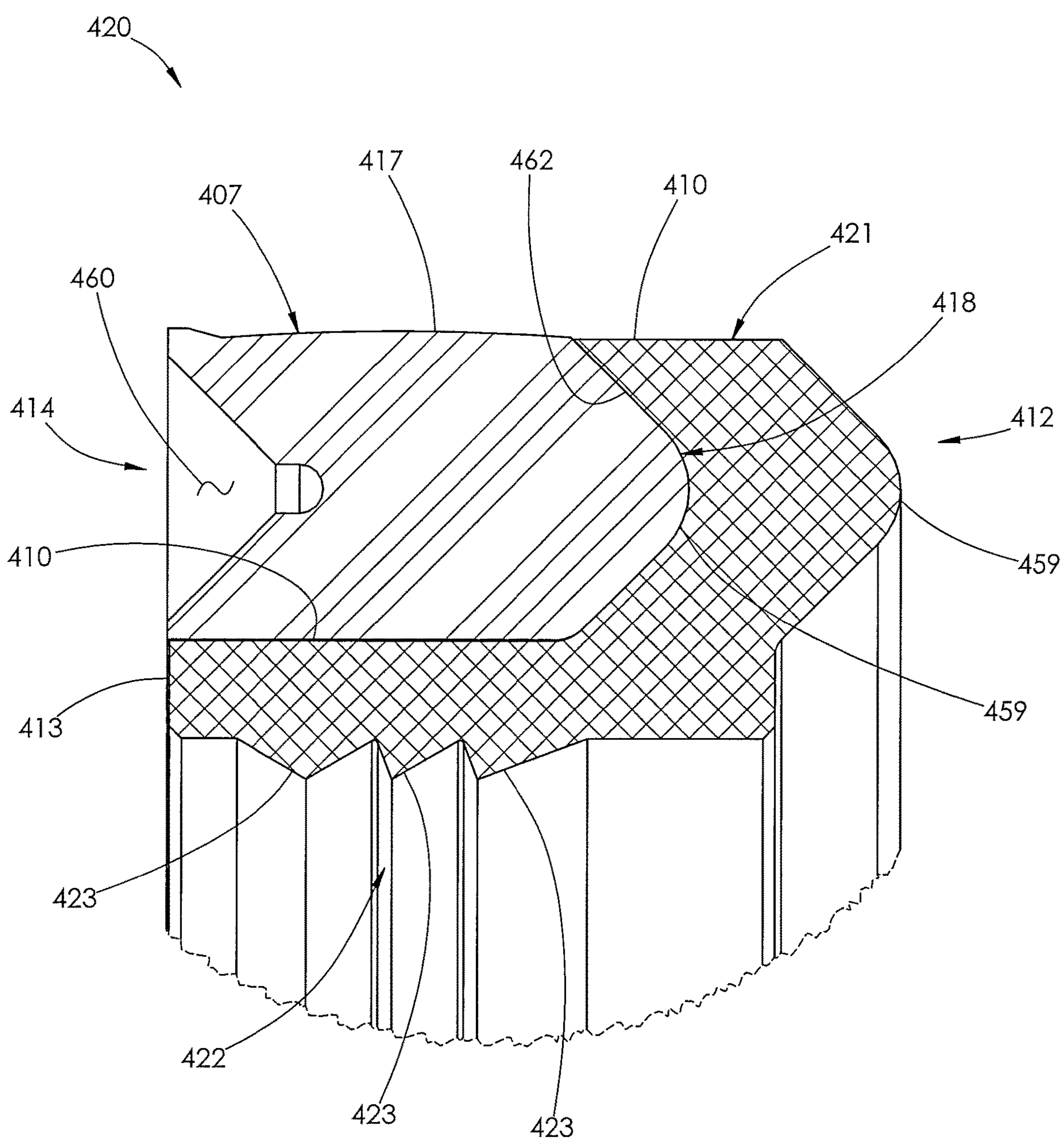
FIG. 112 is an enlarged view of area AD, shown in FIG. 111.
Figure 113:
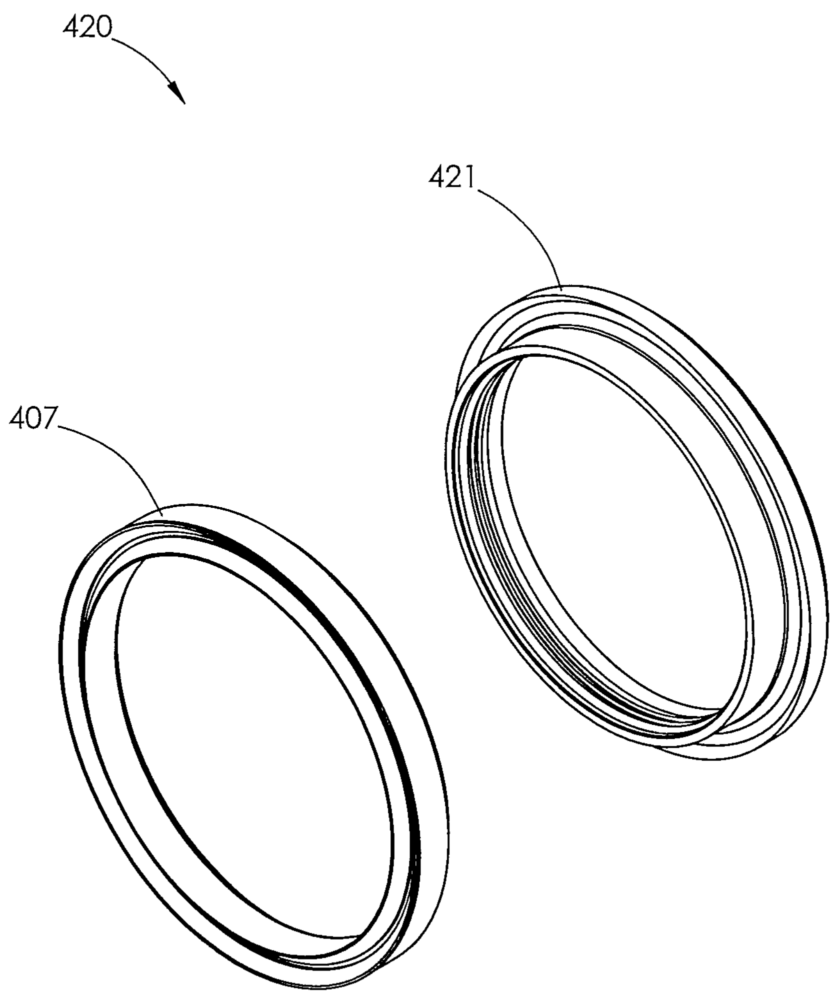
FIG. 113 is a front perspective and exploded view of the hybrid pressure seal shown in FIG. 108.
Figure 114:
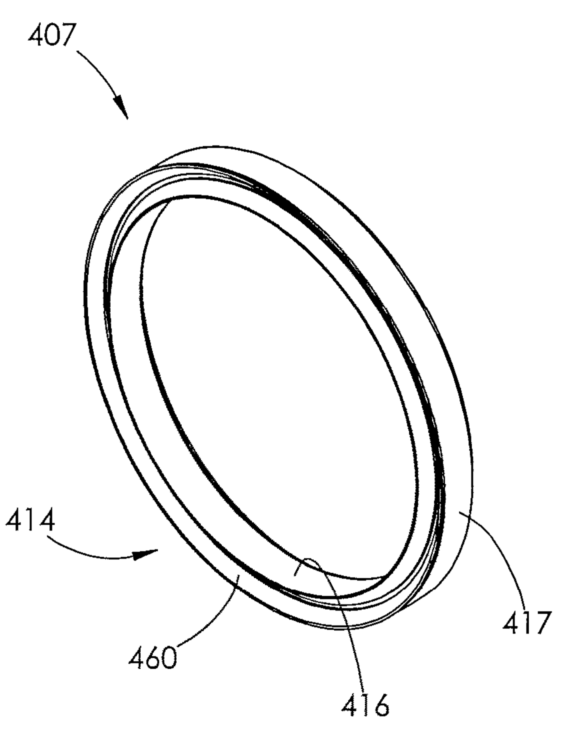
FIG. 114 is a front perspective view of the outer seal shown in FIG. 108.
Figure 115:
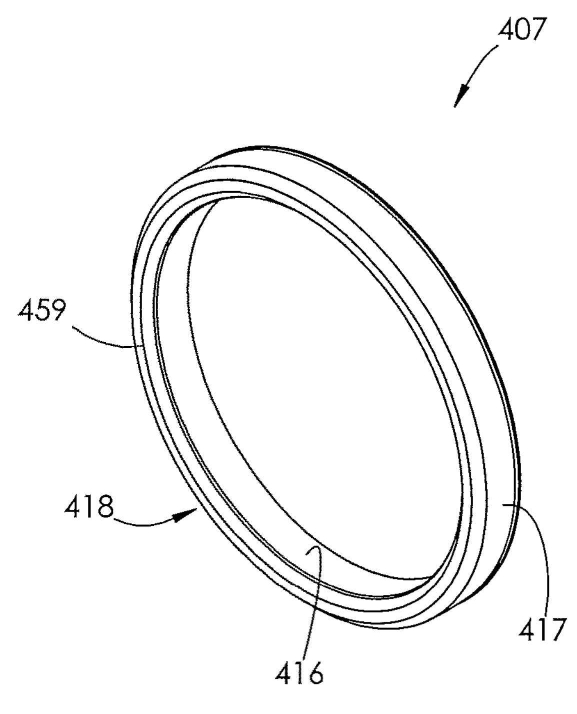
FIG. 115 is a rear perspective view of the outer seal shown in FIG. 114.
Figure 116:
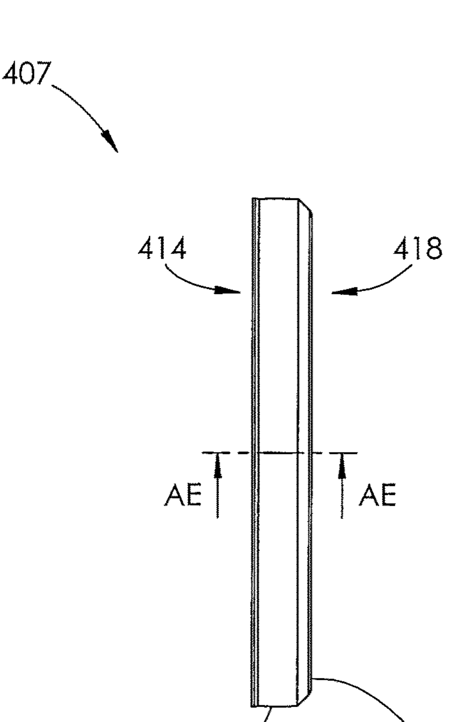
FIG. 116 is a top plan view of the outer seal shown in FIG. 114.
Figure 117:
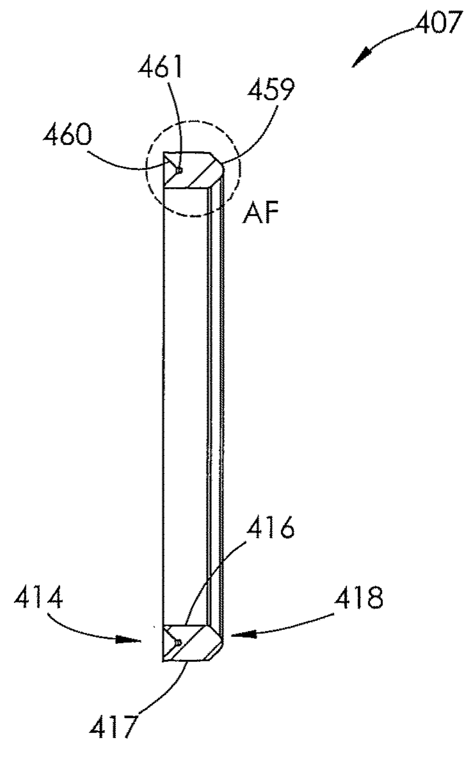
FIG. 117 is a cross-sectional view of the outer seal shown in FIG. 116, taken along line AE-AE.
Figure 118:
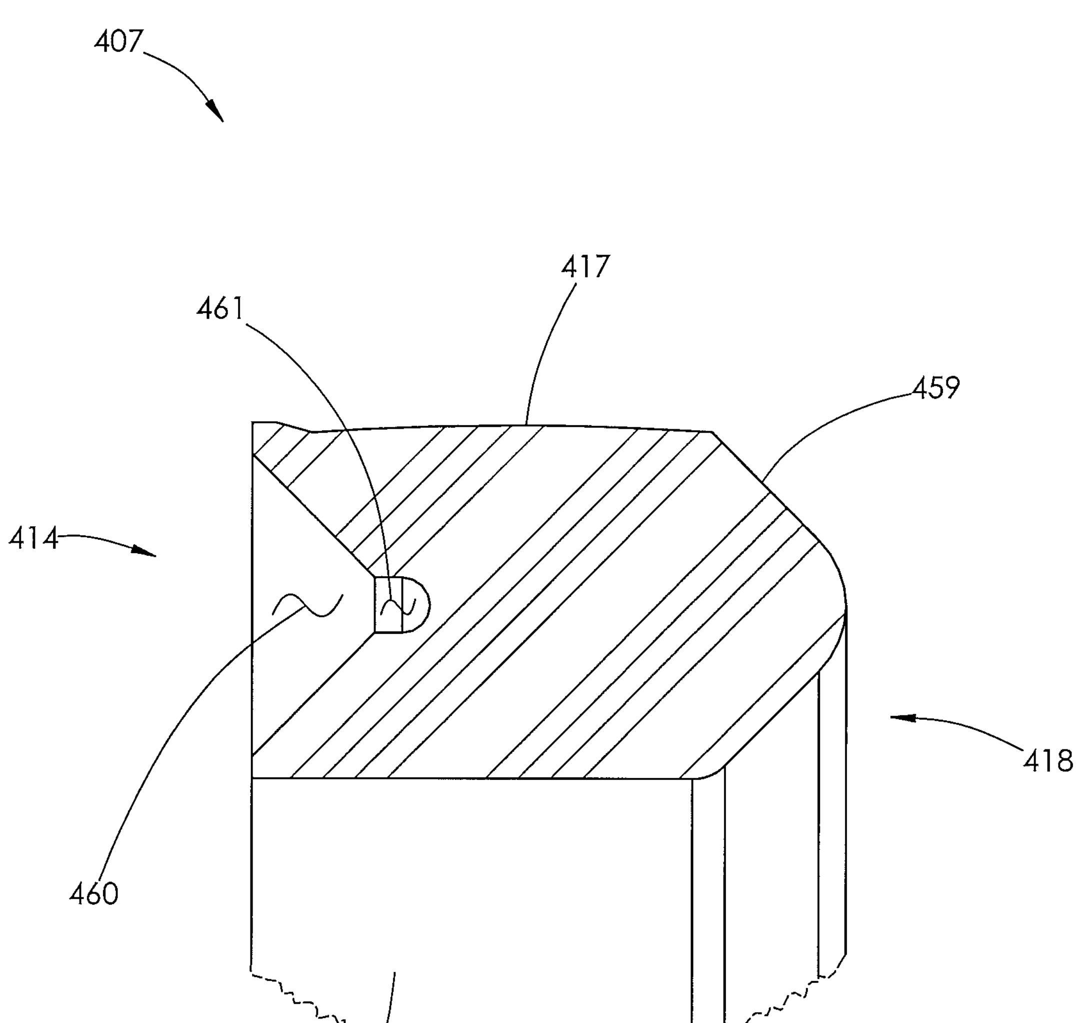
FIG. 118 is an enlarged view of area AF, shown in FIG. 117.
Figure 123:
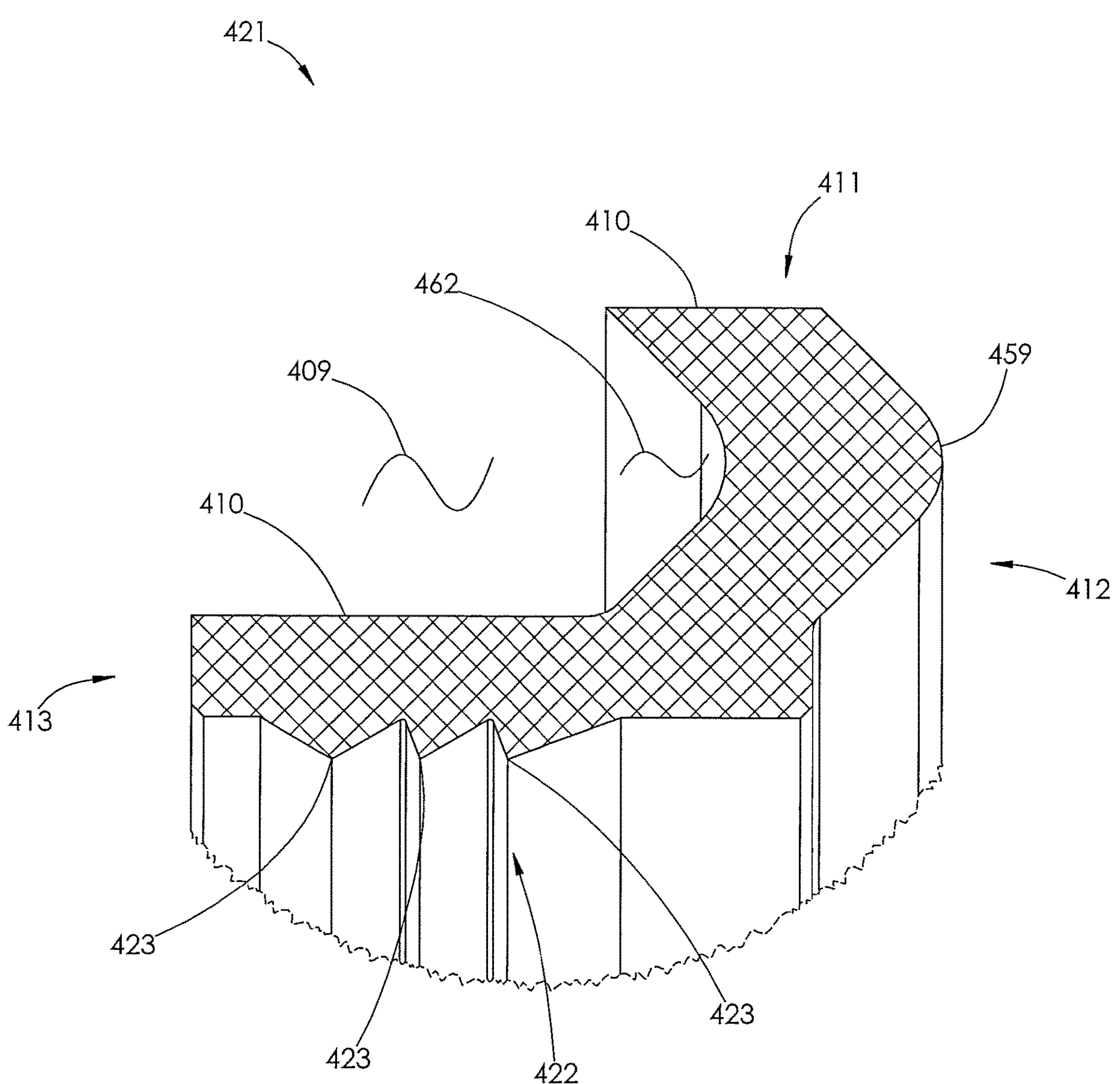
FIG. 123 is an enlarged view of area AH, shown in FIG. 122.
Figure 124:
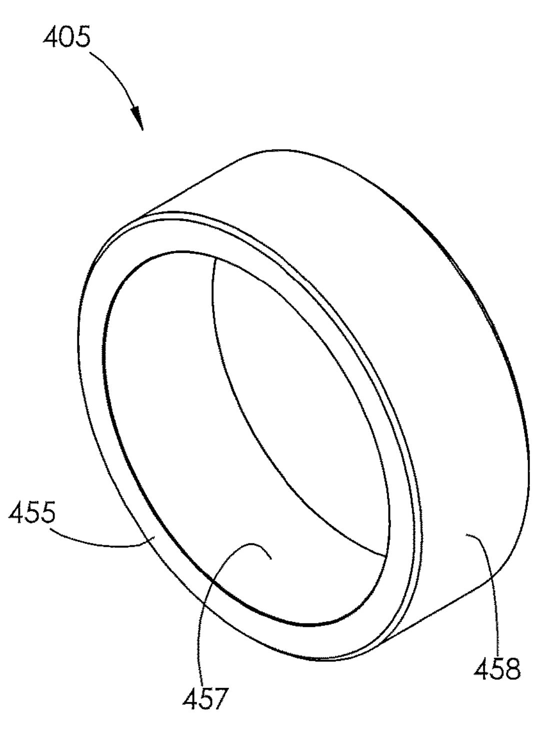
Figure 125:
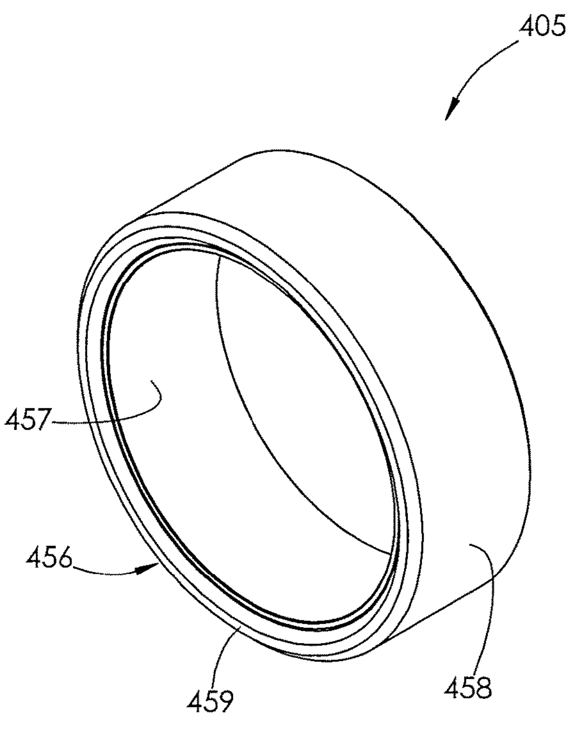
Figure 126:
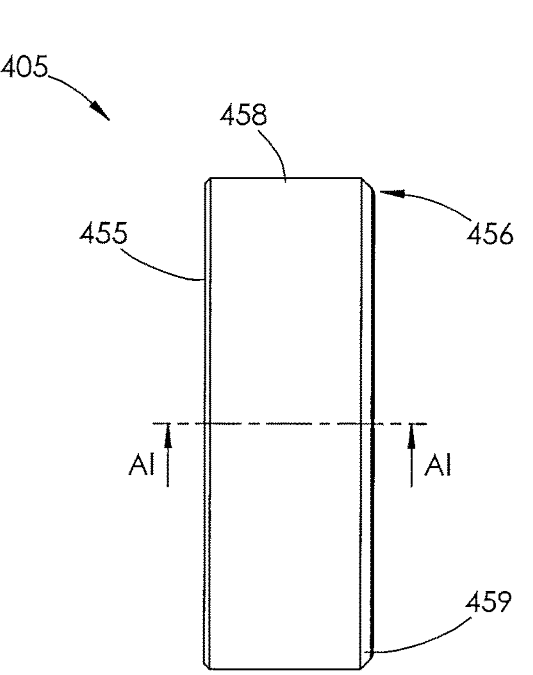
Figure 127:
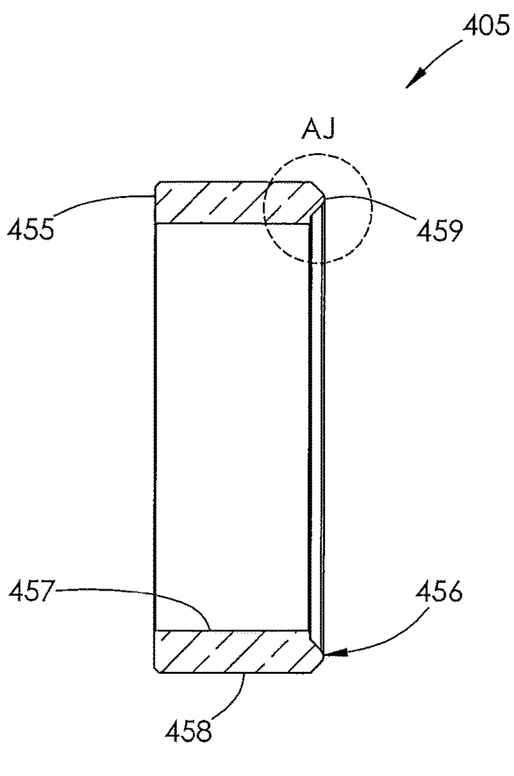

The hybrid pressure seal 420 is assembled by installing the outer seal 407 within the cutout 409 formed in the inner seal 421, as shown in FIGS. 111-112. When installed therein, the outer seal 407 surrounds at least a portion of the inner surface 422 of the inner seal 421. The outer seal 407 is sized to extend slightly past the outer and rear surfaces 410 and 413 of the inner seal 421, as shown in FIG. 112.

The inner and outer seals 421 and 407 may be manufactured individually and assembled. Alternatively, the inner seal 421 may be machined and the outer seal 407 overmolded or bonded directly to the inner seal 421.

Once the hybrid pressure seal 420 is assembled, it can be seen that the concave interlocking element 460 and the convex interlocking element 459 of the outer seal 407 are also "offset" the same as the other interlocking elements 459 and 462 of the other components 404, 405, and 421.

The lantern ring 404, shown in FIGS. 129-133, is the same as lantern ring 104 with the addition of an external locking element. The lantern ring 404 is generally ring shaped and comprises a front surface 437, a rear surface 438, an outer surface 439, an inner surface 440, and a plurality of lubrication through holes 441. The outer surface 439 comprises a lubrication groove 442 and a seal groove 463. The lubrication groove 442 has a smaller diameter than the outer surface 439 and is formed between the front surface 437 and the seal groove 463 without intersecting either. The seal groove 463 is formed between the lubrication groove 442 and the rear surface 438 without intersecting either.

The inner surface 440 comprises a lubrication groove 443. The lubrication groove 443 has a larger diameter than the inner surface 440. The width of the lubrication groove 443 may be the same as the width of the lubrication groove 442 and located at the same location axially.

The lubrication through holes 441 are radial bores connecting the outer surface 439 to the inner surface 440. The lubrication through holes 441 are located on the longitudinal axis such that they intersect both lubrication grooves 442 and 443. The lubrication through holes 441 may be spaced evenly circumferentially.

The front surface 437 comprises a concave interlocking element 462. The concave interlocking element 462 is generally V-shaped and is "offset" in the same manner as the convex interlocking element 459 in both the junk ring 405 and inner seal 421. The concave interlocking element 462 is configured to receive the complementary convex interlocking element 459 of the inner seal 421.

The rear surface 438 comprises a seal groove 464. In this embodiment the seal groove 464 is adjacent the inner surface 440 but may located anywhere between the inner and outer surfaces 440, 439 as long as the seal groove 464 does not intersect either.

Figure 105:
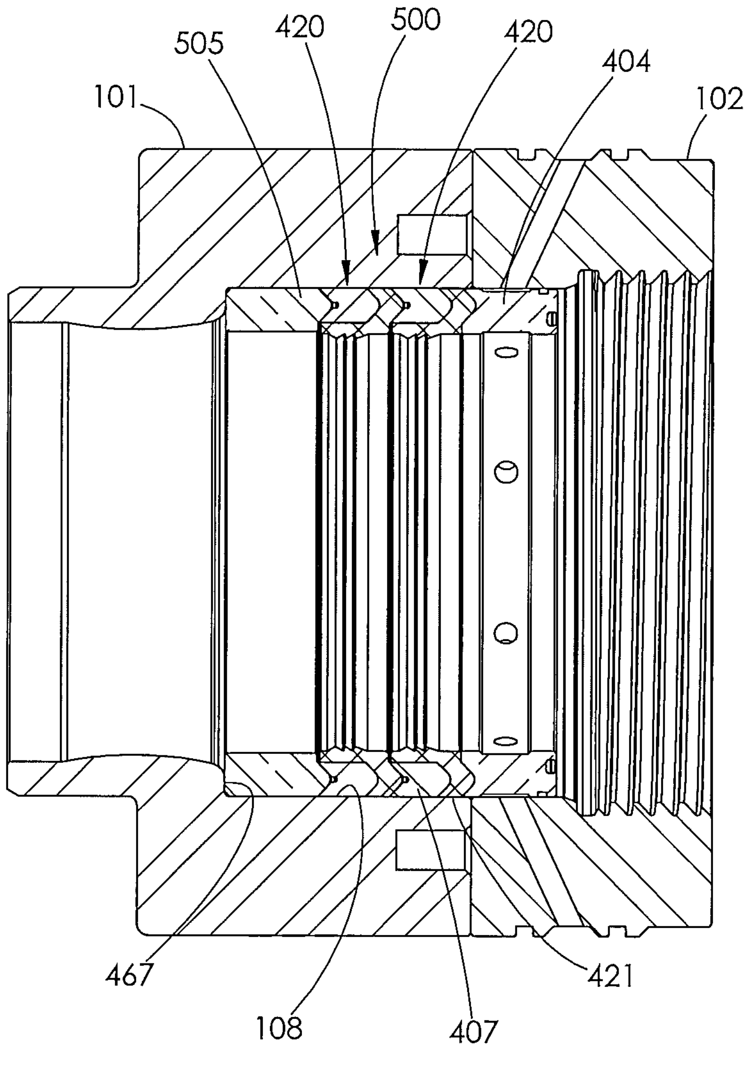
FIG. 105 is the cross-sectional view of the stuffing box and retainer shown in FIG. 104, but another embodiment of the plunger packing is shown installed therein.
Figure 106:
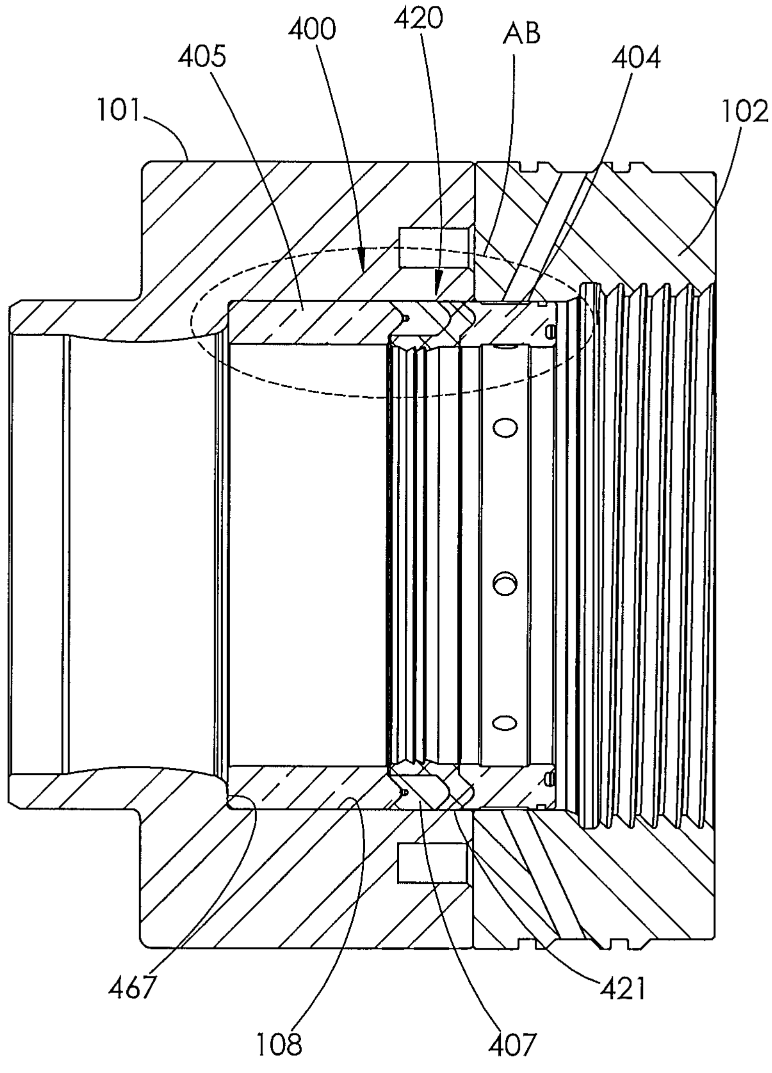
FIG. 106 is the cross-sectional view of the stuffing box and retainer shown in FIG. 104, but another embodiment of the plunger packing is shown installed therein.
Figure 107:
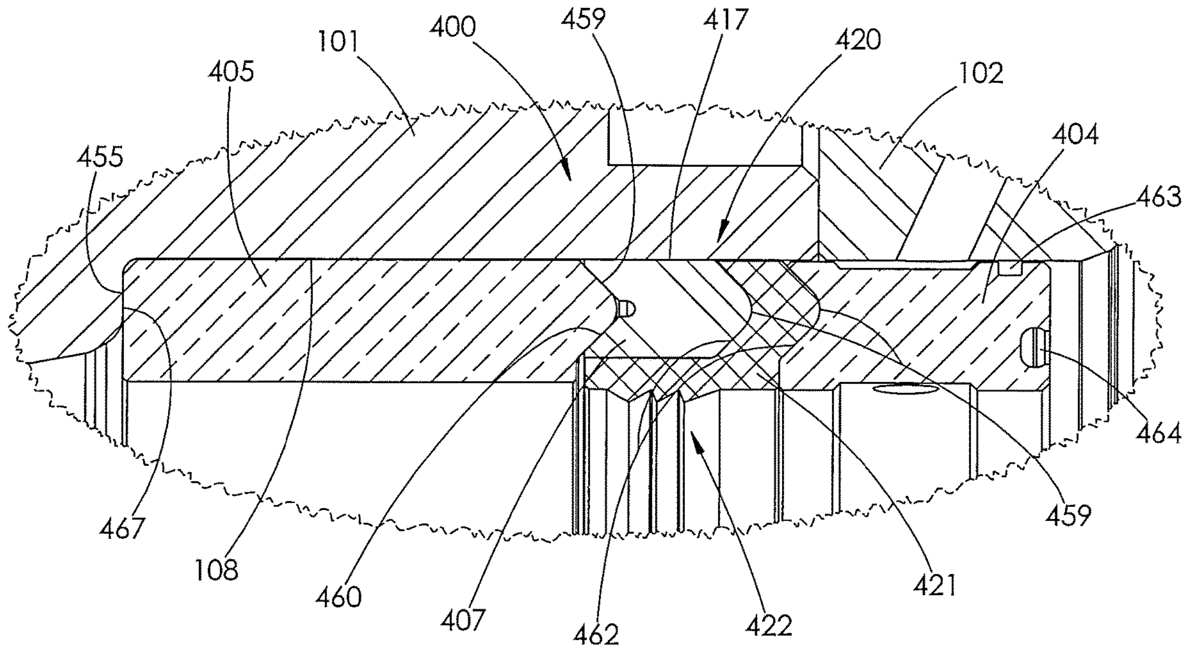
FIG. 107 is an enlarged view of area AB, shown in FIG. 106.
Figure 108:
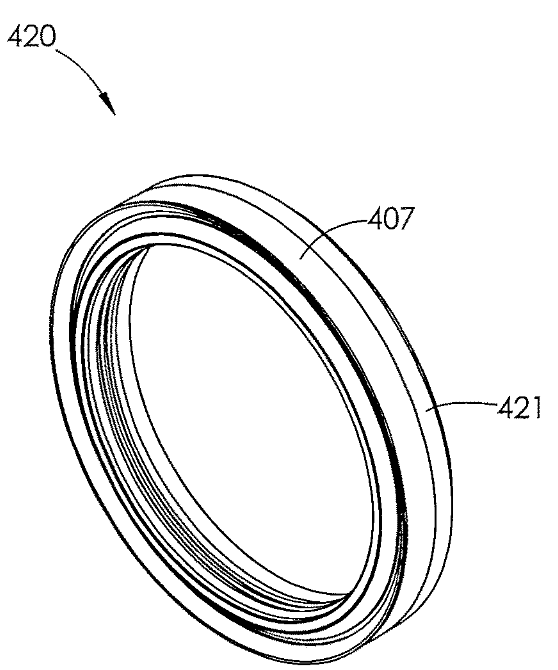
FIG. 108 is a front perspective view of the hybrid pressure seal shown in FIG. 107.
Figure 109:
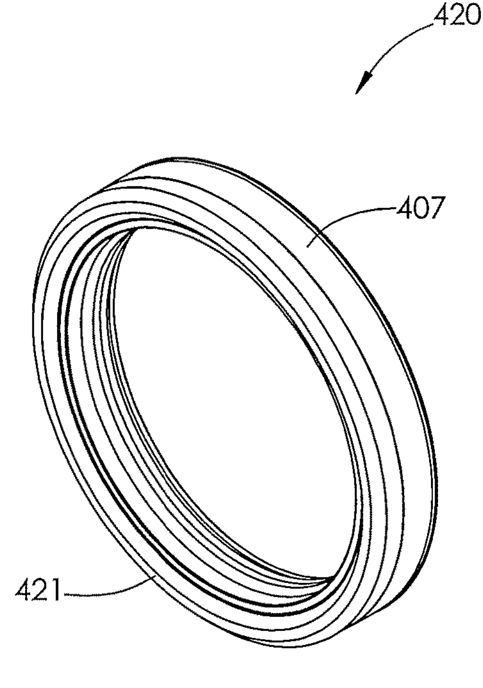
FIG. 109 is a rear perspective view of the hybrid pressure seal shown in FIG. 108.
Figure 110:
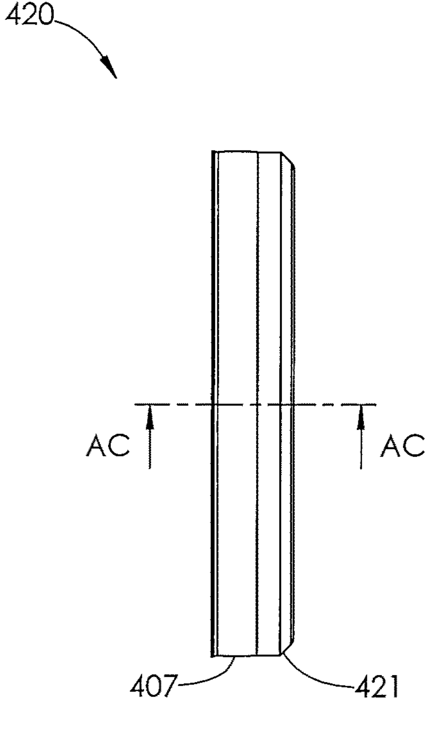
FIG. 110 is a top plan view of the hybrid pressure seal shown in FIG. 108.

Referring now to FIG. 105, another embodiment of plunger packing 500 is shown. Plunger packing 500 comprises another embodiment of a junk ring 505, a plurality of hybrid pressure seals 420, and a lantern ring 404. In this embodiment there are two hybrid pressure seals 420. As a result of the additional hybrid pressure seal 420 and the fact that the same space is available for the plunger packing 500 in the stuffing box 101 and retainer 102 the junk ring 505 is shortened as compared to the junk ring 405.

Figure 103:
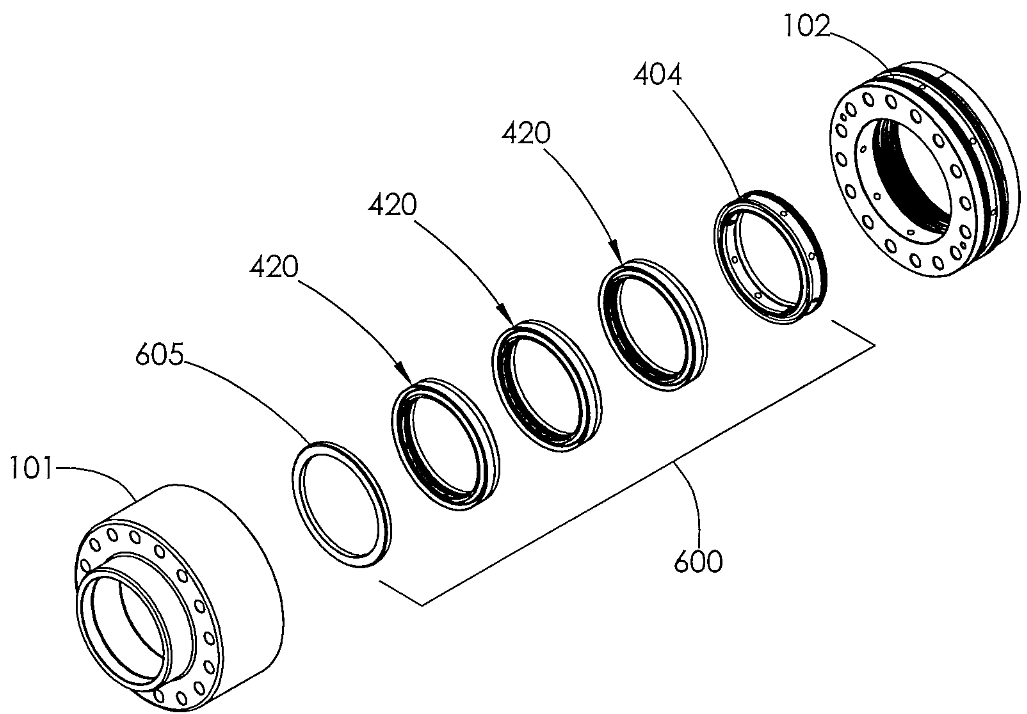
FIG. 103 is a front perspective and exploded view of another embodiment of the stuffing box, retainer, and plunger packing.
Figure 104:
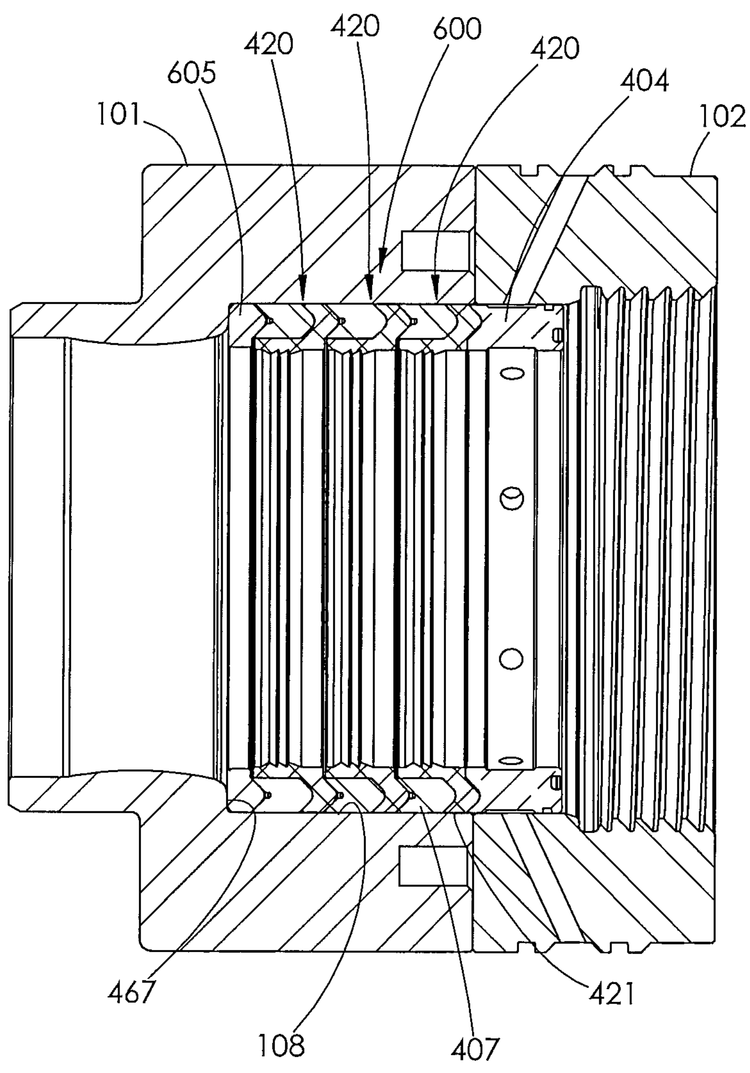
FIG. 104 is a cross-sectional view of the stuffing box and retainer shown in FIG. 103.

Referring now to FIGS. 103-104, another embodiment of plunger packing 600 is shown. Plunger packing 600 comprises another embodiment of a junk ring 605, a plurality of hybrid pressure seals 420, and a lantern ring 404. In this embodiment there are three hybrid pressure seals 420. As a result of the additional hybrid pressure seal 420 as compared to that of plunger packing 500 and the fact that the same space is available for the plunger packing 600 in the stuffing box 101 and retainer 102 the junk ring 605 is shortened as compared to the junk ring 505.

Assembly of plunger packing 400 is accomplished by first inserting the junk ring 405 in stuffing box 101 through the retainer 102 such that the front surface 455 abuts the shoulder 467 of the inner surface 108 of the stuffing box 101. Second, the hybrid pressure seal 420 is inserted into the stuffing box 101 through the retainer 102 such that the concave interlocking element 460 of the outer seal 407 will abut the convex interlocking element 459 of the junk ring 405.

Third, a seal (not shown) may be installed in the seal groove 463 on the outer surface 439 of the lantern ring 404. Fourth, the lantern ring 404 is inserted into the stuffing box 101 through the retainer 102 such that the concave interlocking element 462 of the lantern ring 404 abuts the convex interlocking element 459 of the hybrid pressure seal 420. Fifth, a seal (not shown) may be installed in the seal groove 464 of the front surface 437 of the lantern ring 404.

Sixth, a packing nut 145, shown in FIG. 101, is threaded into the retainer 102 compressing the plunger packing 400 along its longitudinal axis. Plunger packing 500 and 600 are assembled in the same manner with the substitution of the appropriate junk rings 505 and 606 and the addition of the appropriate number of hybrid pressure seals 420.

In operation, the force applied by the packing nut 145 along the longitudinal axis causes the convex interlocking elements 459 of the junk ring 405 and the inner seal 421 to attempt to "pry apart" the concave interlocking elements 460 and 462. This produces radial forces, both inward and outward, in the concave interlocking elements 460 and 462. The inward radial force is defined as a force along a radius toward the longitudinal axis. The outward force is defined as a force along a radius away from the longitudinal axis. Since the lantern ring 404 is made of steel, or other rigid material, the radial forces produced in its concave interlocking element 462 do not result in a noticeable displacement of the outer or inner surface 439, 440. However, the radial forces produced in the concave interlocking element 460 of the outer seal 407 do result in a displacement of both the inner and outer surfaces 416, 417 of the outer seal 407. The displacement of the outer surface 417 is constrained by the inner surface 108 of the stuffing box 101 thus providing a seal between the inner surface 108 of the stuffing box 101 and the outer surface 417 of the outer seal 407. The displacement of the inner surface 416 of the outer seal 407 is constrained by the outer surface 410 of the inner seal 421. While the inner seal 421 is harder than the outer seal 407 the inner surface 422 of the inner seal 421 will still be displaced, though not as much as the outer surface 417 of the outer seal 407, by the inwardly directed radial force. The displacement of the inner surface 422 is constrained by the plunger 147 thus providing a seal between the inner surface 422 of the inner seal 421 and the plunger 147.

Likewise, the convex interlocking element 459 of the outer seal 407 will apply radial forces to the concave interlocking element 462 of the inner seal 421. The displacement of the inner and outer surfaces 422, 410 of the inner seal 421 will be much less than the displacement of the of the outer surface 417 of the outer seal 407 but will be larger than without the interlocking elements 459 and 462.

As with other hybrid pressure seals described herein the inner seal 421 is made of a harder material than the outer seal 407. This allows the inner seal 421 to be more wear resistant during operation as it engages the reciprocating plunger 147. The outer seal 407 is made of a more elastomeric material than the inner seal 421, thereby allowing the outer seal 407 to create a fluid tight seal with the inner surface 108 of the stuffing box 101 or fluid bore 152 during operation. During operation, the hybrid pressure seal 420 provides improved sealing and stability as compared to traditional packing seals.

Additionally, during operation, the "offset" positioning of the interlocking elements 459, 460, and 462, result in the entire concave interlocking element 460 being located in the outer seal 407. If there were no "offset" a portion of the concave interlocking element 460 would be formed in the inner seal 421. The differences in the material of the inner and outer seals 421, 407 would result in an uneven application of forces to the inner and outer seals 421, 407. This uneven application of forces, particularly radial forces, would decrease the life of one or both seals 421, 407. If the seals 421, 407 were bonded the uneven application of forces would reduce the life of the bond.

Referring now to FIGS. 140-162, another embodiment of plunger packing 700 is shown. Plunger packing 700 comprises a junk ring 505, a plurality of another embodiment of hybrid pressure seals 720, and another embodiment of a lantern ring 704. In this embodiment there are two hybrid pressure seals 720 but as described in earlier embodiments there may be only one hybrid pressure seal 720 or more than two.

Hybrid pressure seal 720 comprises an outer seal 407 and an inner seal 721. Inner seal 721 is identical to inner seal 421 with the following exceptions. The front surface 712 comprises a convex interlocking element 759. The convex interlocking element 759 is generally V-shaped but with an additional protrusion 768 compared to convex interlocking element 459. Convex interlocking element 759 is configured to be inserted in a complimentary concave interlocking element 762 of the lantern ring 704, to be described in more detail later. Also, when more than one hybrid pressure seal 720 is used in a plunger packing 700, the convex interlocking element 759 is configured to be inserted in the concave interlocking element 460 of the adjacent outer seal 407. The convex interlocking element 759 is "offset" the same as the convex interlocking element 459 of the junk ring 405 as described above. The inner seal 721 may be made of any of the materials listed for inner seal 106 above.

Lantern ring 704 is identical to lantern ring 404 with the following exceptions. The front surface 737 comprises a concave interlocking element 762. The concave interlocking element 762 is generally V-shaped but with an additional relief cutout 761. The concave interlocking element 762 is "offset" in the same manner as the convex interlocking element 459 in both the junk ring 405 and inner seal 721. The concave interlocking element 762 is configured to receive the complementary convex interlocking element 759 of the inner seal 721.

Assembly of the plunger packing 700 is accomplished in the same manner as described for plunger packing 400 with the substitution of the appropriate junk ring 405, 505, or 605 and the addition of the appropriate number of hybrid pressure seals 720.

The plunger packing 700 operates in the same manner as described above for the other embodiments of plunger packing with the additional features listed below. The protrusion 768 and complimentary relief cutout 761 provide an interlocking feature to positively locate and/or align the hybrid pressure seals 720 with each other and with the lantern ring 704. The protrusions 768 and relief cutouts 761 also create a sealing point between stacked hybrid pressure seals 720 and the lantern ring 704 reducing radial leakage.

Alternative embodiments of the hybrid pressure seals 420 and 720 may include the application of the external interlocking features to the other embodiments of hybrid pressure seals described herein. For example, one alternative embodiment may be hybrid pressure seal 148 having concave interlocking element 460 added to the inner seal 106. The use of any hybrid pressure seals having external locking features may require the use of junk rings and lantern rings also having the external interlocking features.

Alternative embodiments of the plunger packings 400, 500, 600, and 700 may alter the shape of the interlocking features or use a plurality of different shaped interlocking features in a single plunger packing. Other alternative embodiments may comprise more than three hybrid pressure seals 420, 720 and may include other embodiments of hybrid pressure seals modified to have the interlocking features described herein.

While the description of assembly of the plunger packings 400, 500, 600, and 700 are described as being assembled in a stuffing box 101, the plunger packings 400, 500, 600 or 700 may be installed directly into a fluid bore 152, FIGS. 101-102.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A plunger packing comprising:
- a junk ring; and
- a monolithic piece, comprising:
  - a lantern ring; and
  - at least one hybrid seal, comprising:
    - an inner seal, the inner seal having an outwardly-facing annular cutout and an inner surface situated between a front surface and a rear surface, the inner surface configured to seal against a reciprocating plunger and comprising at least one non-linear protrusion situated in a spaced relationship from the front and rear surfaces; and
    - an outer seal, disposed in the outwardly-facing annular cutout of the inner seal, wherein the outer seal is comprised of a different material than the inner seal;
- in which the at least one hybrid seal of the monolithic piece is positioned adjacent to the junk ring.

2. The plunger packing of claim 1, in which the outer seal is made of an elastomeric material.

3. The plunger packing of claim 2, in which the inner seal comprises a polymer filled with aramid fibers.

4. The plunger packing of claim 1, in which a rear surface of the outer seal engages the junk ring.

5. The plunger packing of claim 1, in which the front surface of the inner seal engages the lantern ring.

6. The plunger packing of claim 1, in which:
- the inner seal comprises a first homogenous material; and
- the outer seal comprises a second homogenous material.

7. The plunger packing of claim 1 in which no portion of the inner seal is covered in fabric.

8. The plunger packing of claim 1, in which:
- a concave opening is formed in the outer seal;
- a convex front surface is formed on the junk ring;
- wherein the concave opening and the convex front surface are complementary.

9. The plunger packing of claim 1, in which:
- the front surface of the inner seal is convex; and
- a concave opening is formed on the lantern ring;
- wherein the concave opening and the convex front surface are complementary.

10. The plunger packing of claim 1 in which the outer seal comprises an O-ring.

11. The plunger packing of claim 1 in which the outer seal is elastomeric.

12. The plunger packing of claim 1 in which the at least one non-linear protrusion comprises a plurality of V-shaped extrusions formed on the inner surface of the inner seal.

13. The plunger packing of claim 1 in which the at least one non-linear protrusion is curved without a sharp angle.

14. The plunger packing of claim 1 wherein the at least one hybrid seal is characterized as a first hybrid seal, and further comprising:
- a second hybrid seal, disposed between the junk ring and the first hybrid seal, the second hybrid seal comprising:
  - a second inner seal, the second inner seal having an outwardly-facing annular cutout; and
  - a second outer seal, disposed in the outwardly-facing annular cutout of the second inner seal, wherein the second outer seal is comprised of a different material than the second inner seal.

15. The plunger packing of claim 14, in which:
- the outer seal of the first hybrid seal defines a concave cavity; and
- the second inner seal comprises a convex surface;
- in which the convex surface is installed within the concave cavity of the outer seal such that the first hybrid seal and the second hybrid seal are interlocked.

16. The plunger packing of claim 15, in which the convex surface of the second inner seal comprises a protrusion, corresponding to a relief cutout within the concave cavity of the outer seal of the first hybrid seal.

17. The plunger packing of claim 14, further comprising:
- a third hybrid seal, disposed between the junk ring and the second hybrid seal, the third hybrid seal comprising:
  - a third inner seal, the third inner seal having an outwardly-facing annular cutout; and
  - a third outer seal, disposed in the outwardly-facing annular cutout of the third inner seal, wherein the third outer seal is comprised of a different material than the third inner seal.

18. The plunger packing of claim 17 in which:
- at least a portion of an inner surface of the second inner seal comprises a plurality of V-shaped extrusions; and
- at least a portion of an inner surface of the third inner seal comprises a protrusion that is curved without a sharp angle.

19. The plunger packing of claim 17 in which:
- the second outer seal comprises an O-ring.

20. The plunger packing of claim 1 in which the inner seal comprises:
- a ring portion extending along a length of the inner seal from the front surface to the rear surface; and
- a flange portion extending outwardly from the ring portion;

wherein the outwardly-facing annular cutout is adjacent to the flange portion and extends from the flange portion to the rear surface.

21. The plunger packing of claim 1, in which the outer seal is over-molded to the inner seal.

22. The plunger packing of claim 1, in which the outer seal is bonded directly to the inner seal.

23. The plunger packing of claim 1, in which the lantern ring is made of a same material as the inner seal; and in which the lantern ring is made of a polymer.

24. The plunger packing of claim 1, in which the lantern ring is made of a polymer filled with aramid fibers.

25. The plunger packing of claim 1, in which the lantern ring is made of an ultra-high-molecular-weight polyethylene material with a glass filler.

26. The plunger packing of claim 1, in which the at least one hybrid seal is one and only one hybrid seal.

27. A fluid end, comprising:

a fluid end body comprising a fluid bore, the fluid bore configured to receive a plunger; and the plunger packing of claim 1;

in which an outer surface of the inner seal faces an inner wall of the fluid bore.

28. The fluid end of claim 27 further comprising a stuffing box disposed within the fluid end body, in which the plunger packing is disposed within the stuffing box.

29. The fluid end of claim 27, wherein:

a plunger is disposed within the fluid bore; and no portion of an inner-most wall of the outer seal engages any portion of the plunger.

30. A stuffing box configured for placement in a fluid bore of a fluid end body, the stuffing box configured to receive the plunger packing of claim 17.

* * * * *